US012175578B1

(12) United States Patent
Campbell

(10) Patent No.: US 12,175,578 B1
(45) Date of Patent: Dec. 24, 2024

(54) DYNAMIC ROADWAY SCENE RE-CREATION USING VIDEO ANALYTICS, METADATA AND INTERPOLATION

(71) Applicant: Waylens, Inc., Waltham, MA (US)

(72) Inventor: Jeffery R. Campbell, Warkworth (CA)

(73) Assignee: WAYLENS, INC., Waltham, MA (US)

( * ) Notice: Subject to any disclaimer, the term of this patent is extended or adjusted under 35 U.S.C. 154(b) by 218 days.

(21) Appl. No.: 17/953,638

(22) Filed: Sep. 27, 2022

Related U.S. Application Data

(63) Continuation-in-part of application No. 17/850,069, filed on Jun. 27, 2022, which is a continuation-in-part of application No. 17/213,291, filed on Mar. 26, 2021, now Pat. No. 11,417,098, which is a continuation-in-part of application No. 16/208,861, filed on Dec. 4, 2018, now Pat. No. 10,984,275, which is a continuation-in-part of application No. 16/106,777, filed on Aug. 21, 2018, now abandoned, and a continuation-in-part of application No. 15/591,459, filed on May 10, 2017, now Pat. No. 11,856,331, and a continuation-in-part of application No. 15/618,286, filed on Jun. 9, 2017, now Pat. No. 11,151,192.

(60) Provisional application No. 62/548,548, filed on Aug. 22, 2017.

(51) Int. Cl.
| | |
|---|---|
| *G06T 13/20* | (2011.01) |
| *G06T 7/70* | (2017.01) |
| *G06V 10/44* | (2022.01) |
| *G06V 20/56* | (2022.01) |

(52) U.S. Cl.
CPC ............... *G06T 13/20* (2013.01); *G06T 7/70* (2017.01); *G06V 10/44* (2022.01); *G06V 20/56* (2022.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 9,779,309 B1* | 10/2017 | Fink | ................... | G06F 16/7867 |
| 11,308,741 B1* | 4/2022 | Cardona | .............. | G08G 1/0137 |
| 2017/0187994 A1* | 6/2017 | Tatourian | ............ | H04L 67/1097 |
| 2020/0137351 A1* | 4/2020 | Bai | ......................... | H04N 7/12 |

* cited by examiner

*Primary Examiner* — Ricky Chin
(74) *Attorney, Agent, or Firm* — Maiorana Patent Law, PA

(57) ABSTRACT

A system comprising a database and a processor. The database may be configured to communicate with a plurality of capture devices, store metadata received from the plurality of capture devices and track characteristics of objects in the metadata received over time. The processor may be configured to determine animation details for the objects in response to the characteristics tracked over time in the metadata, re-create a scene in response to the animation details and an absolute location of objects in the metadata at a particular time range and generate an animation based on the scene. The metadata may be communicated by the capture devices without captured video. The animation may provide a visualization similar to the captured video using only the metadata.

20 Claims, 15 Drawing Sheets

DYNAMIC ROADWAY SCENE RE-CREATION USING VIDEO ANALYTICS, METADATA AND INTERPOLATION

This application relates to U.S. Ser. No. 17/850,069, filed on Jun. 27, 2022, which relates to U.S. Ser. No. 17/213,291, filed Mar. 26, 2021, which relates to U.S. Ser. No. 16/208,861, filed Dec. 4, 2018, which relates to U.S. Ser. No. 16/106,777, filed Aug. 21, 2018, which relates to U.S. Provisional Application No. 62/548,548, filed Aug. 22, 2017. U.S. Ser. No. 17/850,069 also relates to U.S. Ser. No. 15/591,459, filed May 10, 2017. U.S. Ser. No. 17/850,069 also relates to U.S. Ser. No. 15/618,286, filed Jun. 9, 2017. Each of the mentioned applications are hereby incorporated by reference in their entirety.

FIELD OF THE INVENTION

The invention relates to video capture generally and, more particularly, to a method and/or apparatus for implementing dynamic roadway scene re-creation using video analytics, metadata and interpolation.

BACKGROUND

Installing a dashboard camera on a vehicle is becoming increasingly common. The dashboard cameras capture detailed scenes of roadway events using high definition or even ultra-high-definition video. The encoded high or ultra definition video data are typically stored together with time synchronization to an onboard storage medium such as an SD card, CF card, internal memory, etc. In the event of an incident, the stored data can be exported and the video can be reviewed for post-incident analysis. Collisions involving vehicles are expensive, especially when death or injury occurs, with substantial financial repercussions to the individuals, companies and associated insurance providers involved.

Storage of video data generally occupies a large amount of storage capacity. For a dashboard camera video, continually capturing video results is a large storage burden (i.e., storing every frame of video captured even if processed with high efficiency encoding techniques such as H.265). Removable storage media, such as consumer-level SD cards might have a storage capacity range from 32 GB-1 TB. Even a 1 TB storage capacity will reach capacity when continually recording. Most dashboard cameras implement a circular buffer that effectively erases the oldest data with new incoming data periodically in order to ensure storage capacity for the latest recordings. If an event is flagged (either automatically, or through driver action, such as pushing an "event" button), the system can allocate a predetermined amount of capacity for the data before and after the event to preserve a video recording outside of the circular buffer.

In some scenarios, significant events may not be flagged (or understood by the system to be significant) until long after the video recording has been discarded. For example, a delivery company may be contacted by an irate customer with a complaint that the delivery truck had backed over a flower garden the previous day when the owner was not home. If the driver had no recollection of such an event and the system was not aware of any damage to the vehicle or property, then the event might not have been flagged for preservation. The truck may have had several cameras that recorded various points-of-view that could exonerate the company and driver, but the video and sensor data is no longer available.

In a vehicle fleet scenario, (i.e., a taxi service, a delivery service, a utility service, etc.) there is a preference to avoid accidents or other incidents altogether through an activity called driver coaching. Risky or accident-prone driver behavior can be flagged by the system and either preserved locally at the on-board storage or sent via RF transmission for analysis by a remotely located driving coach. The driving coach can review the incident and provide feedback to the driver on how to eliminate the risky behavior. Uploading large amounts of video data, and performing a manual, visual review of the driver behavior to flag undesired activity is time-consuming. The coach is unable to immediately notify the driver with corrective action, particularly in a high-risk scenario. For example, distracted driving is well known to severely heighten the risk of an accident. If the driver is found to be smoking, eating or texting during driving the fleet operation center would want to be notified immediately to contact the driver without delay to stop the activity before the driver can continue.

Sending video data in real-time during the event is burdensome at best, as even state of the art encoded video represents an enormous amount of data. The time and cost to transmit the video data over limited bandwidth networks available on the roadways is prohibitive. Wireless networks, especially outside of a home or corporate domain are notoriously bandwidth constrained and data bandwidth is expensive. Uploading minutes of HD or Ultra-HD video data is expensive and time consuming.

In the event of an automobile accident, providing accurate details as quickly as possible to the relevant stakeholders is important (i.e., correct description of the accident, insurance information, value of damages, etc.). Stakeholders may include local emergency services, police, insurance companies, among others. Even if the video data of the accident is available, manually flagging and communicating the video data is cumbersome.

It would be desirable to implement dynamic roadway scene re-creation using video analytics, metadata and interpolation.

SUMMARY

The invention concerns a system comprising a database and a processor. The database may be configured to communicate with a plurality of capture devices, store metadata received from the plurality of capture devices and track characteristics of objects in the metadata received over time. The processor may be configured to determine animation details for the objects in response to the characteristics tracked over time in the metadata, re-create a scene in response to the animation details and an absolute location of objects in the metadata at a particular time range and generate an animation based on the scene. The metadata may be communicated by the capture devices without captured video. The animation may provide a visualization similar to the captured video using only the metadata.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
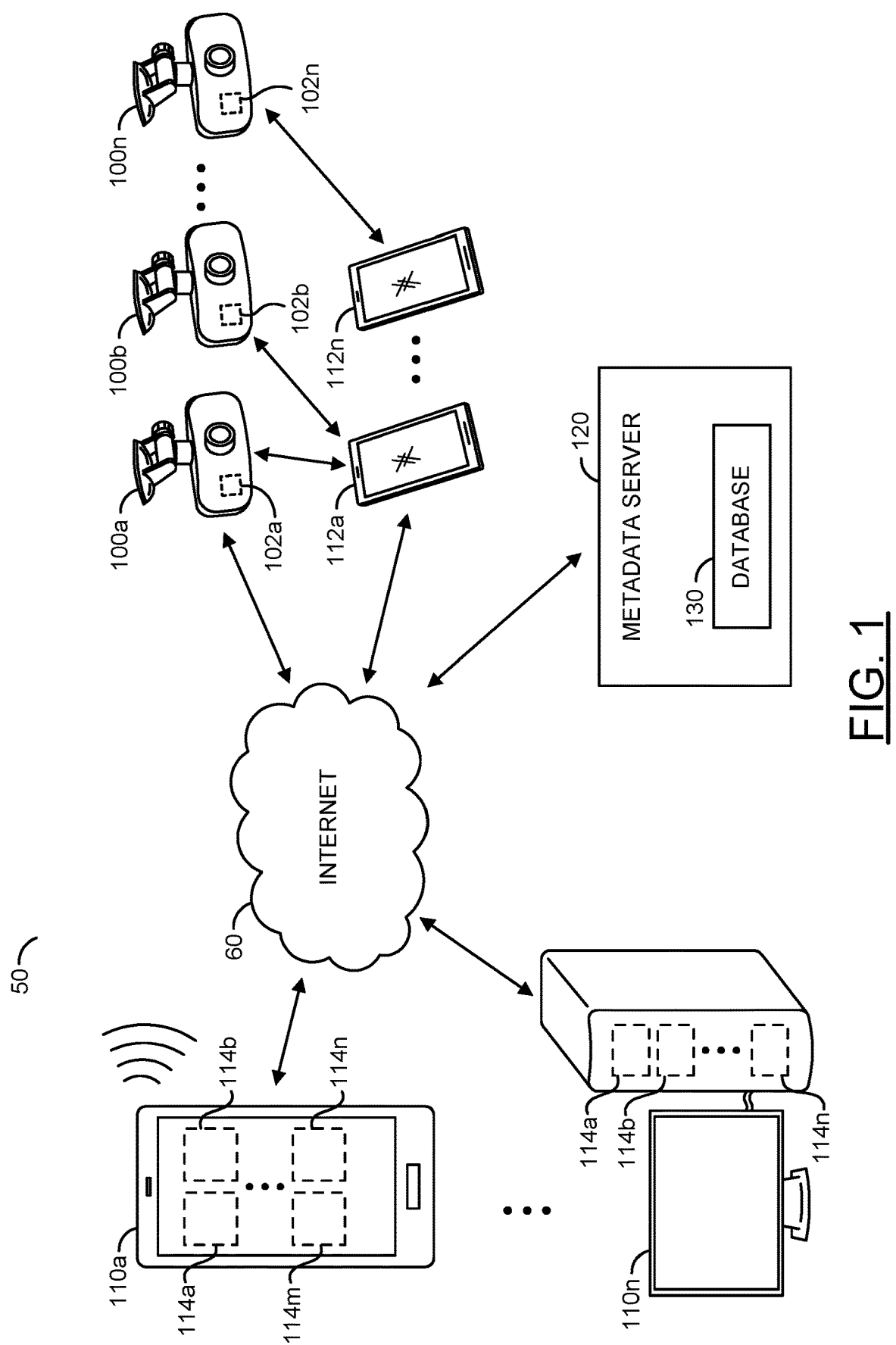
FIG. 1 is a diagram illustrating an example system in accordance with an embodiment of the present invention.

Embodiments of the present invention include providing dynamic roadway scene re-creation using video analytics, metadata and interpolation that may (i) implement vehicle-mounted cameras configured to perform local video analytics, (ii) generate metadata corresponding to captured video, (iii) store metadata about multiple vehicles, (iv) provide a searchable database of video metadata, (v) use a current location to determine an absolute location of objects in video, (vi) transfer metadata from a vehicle-mounted camera to a database via a user communication device without communicating video data, (vii) generate an animation representing information in video data, (viii) re-create a scene from captured video after the source video file is no longer available, (ix) provide alternate views in a re-created scene other than the point of view of the vehicle-mounted camera, (x) preserve space on a storage medium for metadata and/or (xi) be implemented as one or more integrated circuits.

Embodiments of the present invention may be configured to generate metadata in response to analyzing and detecting objects in captured video. The captured video may be generated using one or more camera systems mounted to a vehicle. In an example, a dashboard camera may be implemented as a forward facing camera that may capture a scene as high-quality video from a perspective similar to the perspective of a driver. In some embodiments, multiple cameras may be installed. In one example, the cameras may be configured with cabin viewpoints, which allow the occupants of the vehicle and the behavior of the occupants to be captured simultaneously with the forward viewpoint. In another example, the cameras may be installed at the sides of the vehicle, inside a cargo bay of a vehicle and at the back of a vehicle capturing the rearward view. Audio recording devices may also be employed to capture important auditory details inside or outside the cabin of the vehicle.

Embodiments of the present invention may be configured to capture data from an array of sensors (e.g., a sensor cluster) implemented in the camera system. Data from the sensor cluster may be recorded along with video data (e.g., HD video and/or Ultra HD video). In an example, the camera system may comprise sensors such as GPS/GNSS for real time location data, a magnetometer for direction, an accelerometer and gyroscope for positional data, rotational data, and acceleration data of the vehicle, etc. In some embodiments, the camera systems may be connected to the vehicle communication bus (e.g., a CAN bus) and capture state information from the vehicle (e.g., steering wheel position and movement, gas and brake pedal activation, service codes related to the vehicle engine state, tire inflation details, seatbelt engagement status, door ajar sensor warnings, etc.). The data from the sensor cluster, the vehicle communication bus input, and the encoded high-definition audio and video may be stored.

Embodiments of the present invention may be configured to perform real time video object detection and recognition. The object detection and/or recognition may be configured to determine relative and/or absolute positions of the objects detected. Characteristics of the objects may be determined (e.g., make/model/year of a vehicle, identifying features, a status of street lights, etc.). The identified objects, the positions of the objects and/or the characteristics of the objects may be stored as metadata separate from the video data. The metadata may be configured to provide a description of the information in the video data. The resulting data packets of the metadata may be used to replace the encoded video with codes that may adequately describe the object along with relative positions of the object with respect to the subject (e.g., ego) vehicle. The video data may be converted into objects, descriptions, and/or distances in the metadata. The metadata may be uploaded to a server and/or a remote computing device. The amount of data transferred by only transferring metadata may be less than the amount of data for transferring the video data. The remote computing device may analyze the metadata in order to generate an animation of the video data described by the metadata.

The camera systems may implement an edge device. The camera systems may be configured to perform real time video analytics at the edge (e.g., locally on the camera system instead of uploading to a cloud computing service for the video analytics). On-board computer processing may be configured to enable trained computer vision models to identify objects from video frames as part of the video processing pipeline. The objects may be identified before the video is encoded and/or stored. The information about the objects (e.g., the absolute locations accurately calculated with respect to the camera lens, the orientations, the characteristics, the statuses, etc.) may provide sufficient information about the objects such that the video data may not be necessary in order to re-create the events that occurred in the captured video in great detail at a later time. For example, the encoded pixel data may occupy a large amount of storage space and may include unnecessary details (e.g., details irrelevant to determining where vehicles are located, determining a cause of a crash, determining property damage, etc.) captured over a large number of video frames. The metadata may provide the important information about the objects captured in the metadata. In an example, the captured metadata may provide all important information concerning the objects from the scene using a much smaller storage space than storing video data of the scene.

Using the metadata generated, many details in the field of view of the camera systems may be identified and known without the need for the source video feed to be archived onboard the camera system and/or uploaded to a storage service. The video data may not need to be uploaded and/or recorded in real-time. The video data may not need to be transferred to a storage medium (e.g., when the vehicle arrives at a destination such as a fleet headquarters). The details about the objects determined from the video data, information in the encoded audio, the sensor data, and the vehicle state data may be recorded in the metadata. The metadata may be input into a system configured to reproduce the scene as an animation for review based on the metadata alone.

Embodiments of the present invention may be configured to generate the metadata with sufficient information to re-create the captured scene such that encoded video may no longer need to be archived. Since the encoded video data may occupy a larger capacity of memory than the metadata, by not storing and/or transmitting the video data, the cost of the system may be reduced (e.g., cost savings on bandwidth costs for transferring data and cost savings on data storage). For the camera system, a storage medium (e.g., an SD card) may be implemented with a smaller capacity (e.g., lower cost) if the encoded video data does not need to be stored. For example, a large capacity SD card may be used to archive large amounts of encoded video data. However, the metadata may provide a condensed version of the details of the objects in the video data. In one example, the smaller sized metadata may be transmitted in real time using internal buffers. In another example, the smaller sized metadata may be stored using a smaller sized SD card since less video data may be stored (or none at all).

Since the metadata may provide a condensed (or compressed or minimized) version of the information about the content in the video data, the bandwidth consumed for uploading flagged events or the entire data feed may be possible. On roadways in localities where wireless communication infrastructure is not ideal, the lesser bandwidth consumed by transmitting the metadata without the video data may facilitate communication. Since bandwidth is generally expensive and costs increase as the amount of data transmitted increases, transmitting the metadata alone may limit costs significantly.

The reduction in bandwidth resulting from embodiments of the present invention may enable the camera systems to be implemented without communication modules that implement expensive data communication protocols (e.g., LTE/5G radio components or even Wi-Fi). The amount of data in the metadata may be small enough that less expensive (e.g., slower speed) wireless components may be implemented (e.g., Bluetooth communication to a smartphone may communicate the metadata and the smartphone, which may have the faster communication protocols may forward the metadata to the remote computing device). In another example, a wired connection (e.g., USB) may be implemented to transmit the metadata directly to a smartphone. Once the data is transmitted to the smartphone, the smartphone and may archive the metadata and/or communicate the metadata to a remote computing device (e.g., cloud storage).

Since the amount of data in the metadata may be small, the metadata may be constantly uploaded to the remote computing device. Constantly uploading the metadata may ensure all the data is uploaded in the case of data loss on the camera system. For example, the storage medium (e.g., an SD card, an SSD, an HDD, onboard memory) may become corrupted or destroyed resulting in data loss. By uploading the small amount of data in real time, data preservation on the local storage medium may not be critical.

The video data may be discarded after being processed into the metadata. The metadata may comprise a smaller coding for the objects, positions, sensor cluster data and/or vehicle state information than the video data. In some embodiments, the camera systems may be implemented without a video encoder (e.g., further reducing costs).

Object details along with location information about the objects may be preserved at the dash camera and/or transmitted to a central location. A scene re-creation device may be implemented and configured to re-create details of a roadway incident using a rendered 3D animation. An end-user may interact with an interface that displays the 3D animation based on the re-created scene. The end-user may use the interface to alter a viewpoint of the rendered 3D animation to see the scene from different angles. The 3D animation may enable the end-user to view the scene from a perspective that may not necessarily be one of the perspectives of the camera systems that captured the video frames used to generated the metadata.

The re-creation device may be configured to utilize the video metadata from multiple target camera systems in order to render the scene in 3D and offer viewpoints from different angles. However, since one view of particular objects captured by one camera may not necessarily capture all the characteristics of an object (e.g., a rear view of a vehicle may not capture a cracked windshield), the re-creation device may aggregate metadata from multiple perspectives (e.g., metadata captured by different camera systems) in order to generate the 3D animation. Some details may not have been captured by a target camera vehicle but the details may be interpolated using other camera feeds or from details captured in the recent past. Aggregating data from different perspectives and/or using a temporal relationship between metadata captured about the same object at different times may involve an amount of uncertainty. The re-creation device may determine probabilities that indicate a confidence level of particular characteristics that may be applied to particular objects detected. The end-user may interact with an interface that provides selection options to add or remove characteristics that may have been detected based on a probability that the characteristic has been accurately detected.

For example, if a camera system is in a vehicle following a truck and an event occurs, the front of the truck may not be visible by the camera system. The geometry of the truck may be determined in response to an identified make and model and year. However, aftermarket additions (e.g., a flag on the grill, dents, bumper stickers, etc.) may not be in the camera data stream (e.g., not visible based on the perspective of the camera system). The database storing the metadata may uniquely identify the truck (e.g., uniquely identified by a plate number). Details about the uniquely identified truck may be maintained with confidence levels based on a time of identification. The details may be maintained over time and may be added to based on metadata captured by other camera systems (e.g., that may capture different perspectives of the same truck). The details stored in the metadata may be included in the rendered re-creation.

In some scenarios, the object being identified may be a standard object with known dimensions (e.g., a 2018 Ford Fiesta with a factory paint color). In other scenarios, the object identified may have aftermarket alterations, (e.g., dents, scratches, decals, custom paint, etc.) that differentiate the particular vehicle from other vehicles that may be of the same make, model, year and factory delivered color. In one example, a pickup vehicle may have truck balls added under the rear tailgate, or a Canadian flag embedded behind the front grill. In another example, a similar make/model/year of truck may have a "TRUMP 2024" bumper sticker, a large dent in the passenger door, and a cracked windshield. Depending on the confidence level for the various details, the two trucks may be rendered differently in the recreated scene (or similarly if there is not enough confidence in the details to distinguish the two trucks).

Each vehicle legally operating on the roadway may be uniquely identified with a license plate tag. The database may be configured to hold the details extracted from the metadata about each vehicle that has been observed by a fleet of camera systems. In an example, the database entries for roadway vehicles may have country, state and license plate alpha-numeric tags as a key identifier. Each license plate tag may be associated with a vehicle make, model, year, color and vehicle identification number (VIN). Each time any vehicle is captured in the video data by one of the camera systems on the roadway, GPS co-ordinates, time and date may be logged to the database. Other details may also be logged (e.g., direction of travel, speed, number of occupants, etc.). Generally, most encounters with other vehicles may result in no need for incident re-creation. However, the subtle details captured in the metadata may be recorded and stored in a database. The subtle details may comprise flags, decals, bumper stickers, damage, cleanliness, hubcaps, aftermarket accessories (e.g., roof racks, truck balls, mirror dice, etc.), etc. In the event of a roadway incident, the capturing dash camera device may accurately record the details of the movement, location, time and date of a target vehicle. By accessing the central database, the remaining specific details of each vehicle may be included in the rendering if there is sufficient probability that these details are accurate.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touch-screen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60. For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/

LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, ZigBee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-102n may identify objects (e.g., signs, pedestrians, street lights, etc.). The video data captured by the circuits 102a-102n may be stored by the capture devices 100a-100n. In one example, the circuits 102a-102n may implement a memory. In another example, the circuits 102a-102n may connect to an external memory (e.g., the capture devices 100a-100n may be configured to receive a flash memory such as a SD card, a microSD card, NAND memory, Compact Flash (CF) and/or an XD card).

The circuits 102a-102n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102a-102n may comprise a GPS unit to determine GPS coordinates, a magnetometer to determine direction of travel and/or a real time clock (RTC) circuit to determine time.

The circuits 102a-102n may be configured to detect license plates. License plates may be detected, and the alphanumeric characters and/or symbols on the license plate may be identified. The license plate alphanumeric characters and/or symbols may be extracted from the captured video data as the metadata. For example, the circuits 102a-102n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 102a-102n when the video was recorded. The circuits 102a-102n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, Javascript, PHP, SQL, AJAX applications, APIs, etc. The server 120 may be configured to distribute apps (e.g., one or more of the computer readable instructions 114a-114n) to the subscriber devices 110a-110n and/or the user communication devices 112a-112n. The server 120 may be configured to generate interfaces (e.g., graphical user interfaces) based on stored data for the subscriber devices 110a-110n. For example, the server 120 may generate data to implement an interface, the data may be sent to the subscriber devices 110a-110n, the subscriber devices 110a-110n may interpret the data to generate a user interface, the user may interact with the user interface to provide requests, the subscriber devices 110a-110n may transmit the requests to the server 120 and the server may process the requests. Similarly, the capture devices 100a-100n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 100a-100n. In an example, the database 130 may store the metadata. Search parameters may be transmitted by the subscriber devices 110a-110n and the database 130 may be searched based on the search parameters. For example, the database 130 may enable the metadata to be associated with the video data stored by (and located on) the capture devices 100a-100n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
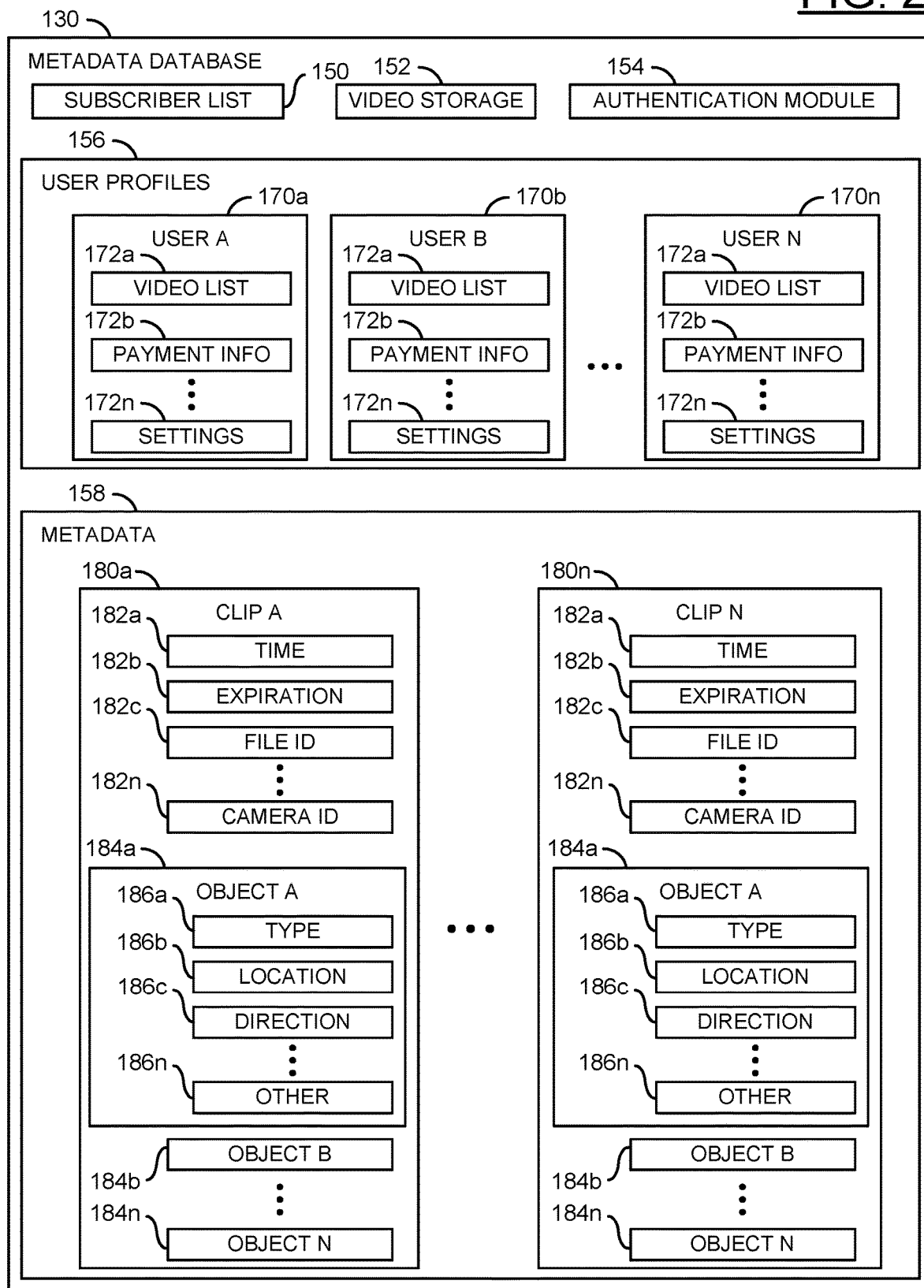
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 112a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172*a* may be used to send a request to the capture devices 100*a*-100*n* and/or the user communication devices 112*a*-112*n* to upload the recorded video data. In another example, the video list 172*a* may be used to provide a payment to the particular data provider that captured the requested video data. In an example, the data set 172*b* may store payment information. The payment information 172*b* may associate credit card, electronic payment (e.g., PayPal, Bitcoin, Apple Pay, Google Wallet, etc.) and/or bank information with a particular one of the data provider users. The payment information 172*b* may be used to facilitate payments to the data provider that has uploaded a requested recorded video.

In some embodiments, the data provider may receive one of the capture devices 100*a*-100*n* in exchange for providing the payment information 172*b* and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 100*a*-100*n* free of charge and be able to use the camera as a regular dashcam as well as for providing data for the system 50. In one example, the data provider may not be charged for one of the capture devices 100*a*-100*n* for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172*b* may be stored to charge a penalty fee to encourage the data provider to provide data.

In an example, the data set 172*n* may comprise user settings. The user settings 172*n* may provide a configuration and/or preferences for each of the data providers 170*a*-170*n*. The data sets 172*a*-172*n* may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172*a*-172*n* of each of the data provider profiles 170*a*-170*n* may be varied according to the design criteria of a particular implementation.

The metadata 158 may store information about various captured videos (e.g., video clips) 180*a*-180*n*. The video clips 180*a*-180*n* may not be the actual video data (e.g., the actual video data may be stored with the video storage 152). The video clips 180*a*-180*n* may comprise information about the video clips and/or information about objects detected in the video clips by the capture devices 100*a*-100*n*.

In some embodiments, each video clip metadata 180*a*-180*n* that is captured and/or uploaded by the capture devices 100*a*-100*n* may be stored by the database 130. The video data associated with the video clip metadata 180*a*-180*n* may be stored in the video storage 152. Generally, the video data in the video storage 152 may be stored temporarily. For example, video data may have a relatively large file size and storing video data indefinitely may be impractical. However, the video clip metadata 180*a*-180*n* may have a much smaller file size than the video data. The video clip metadata 180*a*-180*n* may be configured to provide sufficient information about the video data to re-create the positioning of various objects in the video data even after the video data is no longer available.

Every time video data is uploaded to the database 130, the corresponding video metadata 180*a*-180*n* may be stored by the database 130. The video metadata 180*a*-180*n* may be stored long-term compared to the video data. In some embodiments, the metadata 158 may be organized by detected objects instead of the video clip metadata 180*a*-180*n*. In one example, where the objects detected are license plates, each time a license plate is detected a new metadata entry may be created. For example, each of the license plate entries may comprise the associated clips 180*a*-180*n*. The clips 180*a*-180*n* may comprise metadata entries for each time a license plate has been read by one of the capture devices 100*a*-100*n*. For example, each time a license plate is detected, a new one of the clips 180*a*-180*n* may be appended to the corresponding one of the license plate entries. Similarly, if the objects detected are vehicles then the video clips 180*a*-180*n* may be associated with a particular vehicle. The arrangement of the metadata 158 may be varied according to the design criteria of a particular implementation.

Each video clip 180*a*-180*n* is shown comprising metadata 182*a*-182*n*. The clip metadata 182*a*-182*n* may comprise the data extracted by the capture devices 100*a*-100*n* from the video recorded by the capture devices 100*a*-100*n* and/or data associated with the video recorded by the capture devices 100*a*-100*n*. The video clip metadata 182*a*-182*n* may be configured to provide useful information about the video clips that have been uploaded.

In one example, the video clip metadata 182*a* may comprise a time. The time 182*a* may indicate a date and/or time of day when the corresponding video was recorded (e.g., a timestamp). The time 182*a* may be used to find recorded video that occurred at a particular time. In another example, the video metadata 182*b* may comprise an expiration flag. The expiration flag 182*b* may indicate whether or not the recorded video is still available (e.g., stored in the memory of the capture device, stored in the video storage 152, has not been overwritten, etc.). For example, the expiration flag 182*b* may have a particular value (e.g., a logical one value) if the video has been overwritten. If the expiration flag 182*b* indicates that the recorded video is no longer available, the video clip metadata 180*a*-180*n* may still provide useful information. The video clip metadata 182*c* may provide a file ID. The file ID 182*c* may be used to associate the video clip metadata 180*a*-180*n* to a particular stored video file (e.g., either in the video storage 152 and/or in the memory of the cameras 100*a*-100*n*). For example, if the expiration flag 182*b* indicates the video data is still available then the file ID 182*c* may be used to retrieve the video data. The video clip metadata 182*n* may provide a camera ID. The camera ID 182*n* may be used to associate the video clip metadata 180*a*-180*n* to a particular one of the cameras 100*a*-100*n* (e.g., the camera that captured the video data associated with the metadata). The camera ID 182*n* may enable the video data to be retrieved from the capture devices 100*a*-100*n* (if the video is still available) and/or to enable the data provider to be contacted for more information (or provide payment to the data provider user). The number and/or type of video clip metadata 182*a*-182*n* available may be varied according to the design criteria of a particular implementation.

The video clip metadata 180*a*-180*n* may comprise a number of objects 184*a*-184*n*. The objects 184*a*-184*n* may correspond to each object detected using the video analysis performed by the capture devices 100*a*-100*n*. In one example, the object 184*a* may be a particular vehicle detected in the video data. In another example, the object

184*b* may be a particular pedestrian detected in the video data. In yet another example, the object 184*c* may be a license plate detected in the video data. In still another example, the object 184*n* may be a particular sign and/or landmark detected in the video data. The number and/or types of objects 184*a*-184*n* stored with the video clip metadata 180*a*-180*n* may be varied according to the design criteria of a particular implementation.

Each of the objects 184*a*-184*n* may have associated object information 186*a*-186*n*. In an example, the object information 186*a* may correspond to an object type (e.g., a person, a vehicle, a building, a sign, a billboard, a license plate, etc.). The object type 186*a* may provide details about the associated objects 184*a*-184*n*. In one example, if the object is a vehicle, the object type 186*a* may indicate the make, model, year, color, license plate, number of passengers, distinctive markings, etc. The object information 186*b* may correspond to a location. The location 186*b* may comprise GPS coordinates corresponding to the object in the recorded video. The location 186*b* may be used to find recorded video that was captured at a particular location (e.g., at an intersection at a particular time). In some embodiments, the location 186*b* may comprise an absolute location of the objects 184*a*-184*n*. For example, the absolute location 186*b* may be determined by the video analysis performed by the capture devices 100*a*-100*n* to determine the actual coordinates of the objects detected instead of merely the GPS coordinates of the capture devices 100*a*-100*n*. In some embodiments, the location 186*b* may be the location of the object within the video frame (e.g., the distance of the object from the camera lens determined by the capture devices 100*a*-100*n* using video analysis).

The object information 186*c* may comprise a direction. In some embodiments, the direction 186*c* may indicate the direction of travel of the objects 184*a*-184*n* (or if the objects 184*a*-184*n* are stationary). For example, the direction 186*c* may be determined by the capture devices 100*a*-100*n* analyzing a sequence of video frames to determine where the object is moving over time. In some embodiments, the direction 186*c* may be the direction that the capture device 186*a*-186*n* was facing when the video data was captured. For example, the information from the location 186*b* and the direction 186*c* may be combined to determine the absolute location coordinates of the objects 184*a*-184*n*. Other types of metadata 186*n* may be stored about the objects 184*a*-184*n*. The types and/or amount of object information 186*a*-186*n* may be varied according to the design criteria of a particular implementation.

The information stored about the video clips 180*a*-180*n* may be used to identify vehicles, times, locations and/or other data about the recorded videos. The video clip metadata 180*a*-180*n* may be the data checked by the database 130 to determine results for a search query from the subscriber users. The video metadata 180*a*-180*n* may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102*a*-102*n* may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition).

The circuits 102*a*-102*n* may be configured to determine roadway data in real time. In one example, the object information 186*a*-186*n* may store information corresponding to a type of vehicle detected (e.g., color of a car, make of a vehicle, model of a vehicle, year of a vehicle, speed of a vehicle, etc.). In another example, the object information 186*a*-186*n* may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180*a*-180*n*. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182*a*-182*n* for the clip 180*a* may comprise information such as id="1", lp="5SAM333", date="20170307", time="14:30", alt="141.46354", lat="37.804440" and/or lng="−122.422874". In another example, the video metadata 182*a*-182*n* for the clip 180*i* may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database 130 may implement one file for each license plate to avoid parsing all stored data in order to filter out license plate results in real time.

Figure 3:
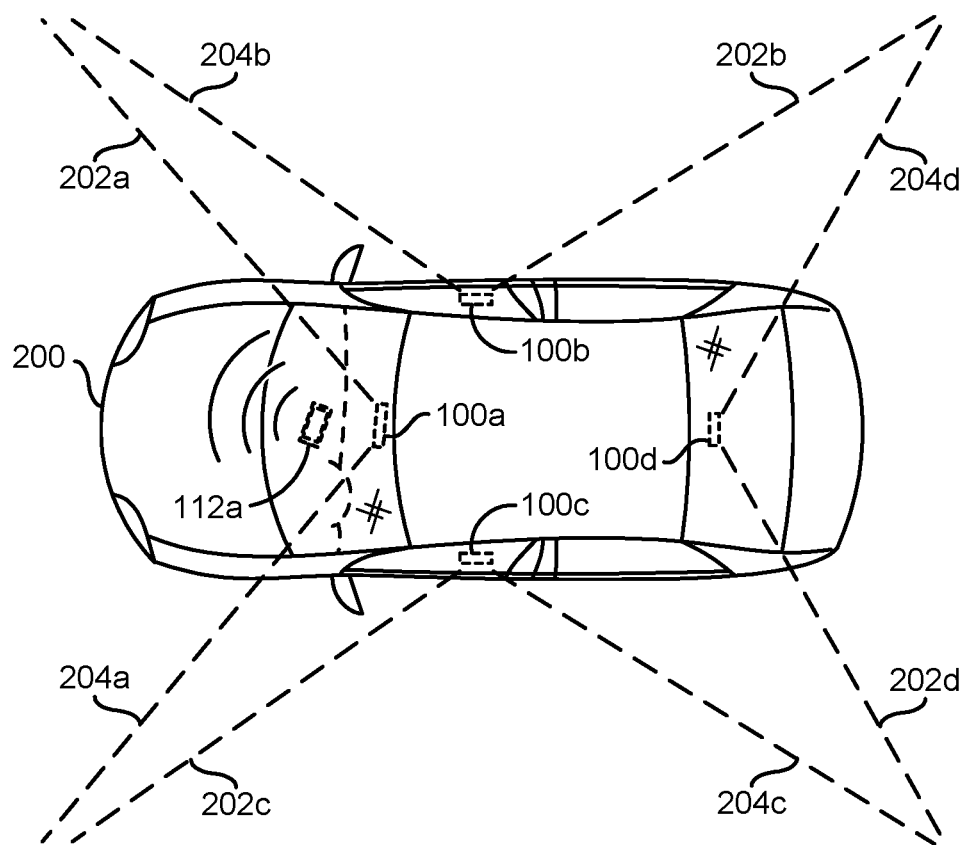
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100*a*-100*n*. In the example shown, the capture device 100*a* may be installed facing the direction of travel of the vehicle 200, the capture device 100*b* may be installed directed away from a passenger side of the vehicle 200, the capture device 100*c* may be installed directed away from a driver side of the vehicle 200 and the capture device 100*d* may be installed directed facing opposite from the direction of travel of the vehicle 200.

The user communication device 112*a* is shown in the vehicle 200. In the example shown, the user communication device 112*a* may be a smartphone communicating to the network 60 (e.g., via a 3G/4G/LTE/5G wireless connection). For example, each of the installed cameras 100*a*-100*d* may communicate with the smartphone 112*a* (e.g., creating a local network) and the smartphone 112*a* may communicate with the external network 60. In the example shown, the capture devices 100*a*-100*d* may be positioned on the windows of the front, side and back of the vehicle 200 (e.g., suction cupped from the inside of the vehicle 200). The number, installation and/or locations of the capture devices 100*a*-100*n* in a vehicle may be varied according to the design criteria of a particular implementation and/or a preference of the data provider.

A line 202*a* and a line 204*a* are shown extending from the capture device 100*a*. The line 202*a* and the line 204*a* may represent a field of view captured by the capture device 100a. The field of view of the capture device 100a may record video of a view from the front of the vehicle 200 (e.g., from a perspective of a front of the vehicle 200). A line 202b and a line 204b are shown extending from the capture device 100b. The line 202b and the line 204b may represent a field of view captured by the capture device 100b. The field of view of the capture device 100b may record video of the view from the right of the vehicle 200 (e.g., from a perspective of a passenger side of the vehicle 200). A line 202c and a line 204c are shown extending from the capture device 100c. The line 202c and the line 204c may represent a field of view captured by the capture device 100c. The field of view of the capture device 100c may record video of the view from the left of the vehicle 200 (e.g., from a perspective of a driver side of the vehicle 200). A line 202d and a line 204d are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
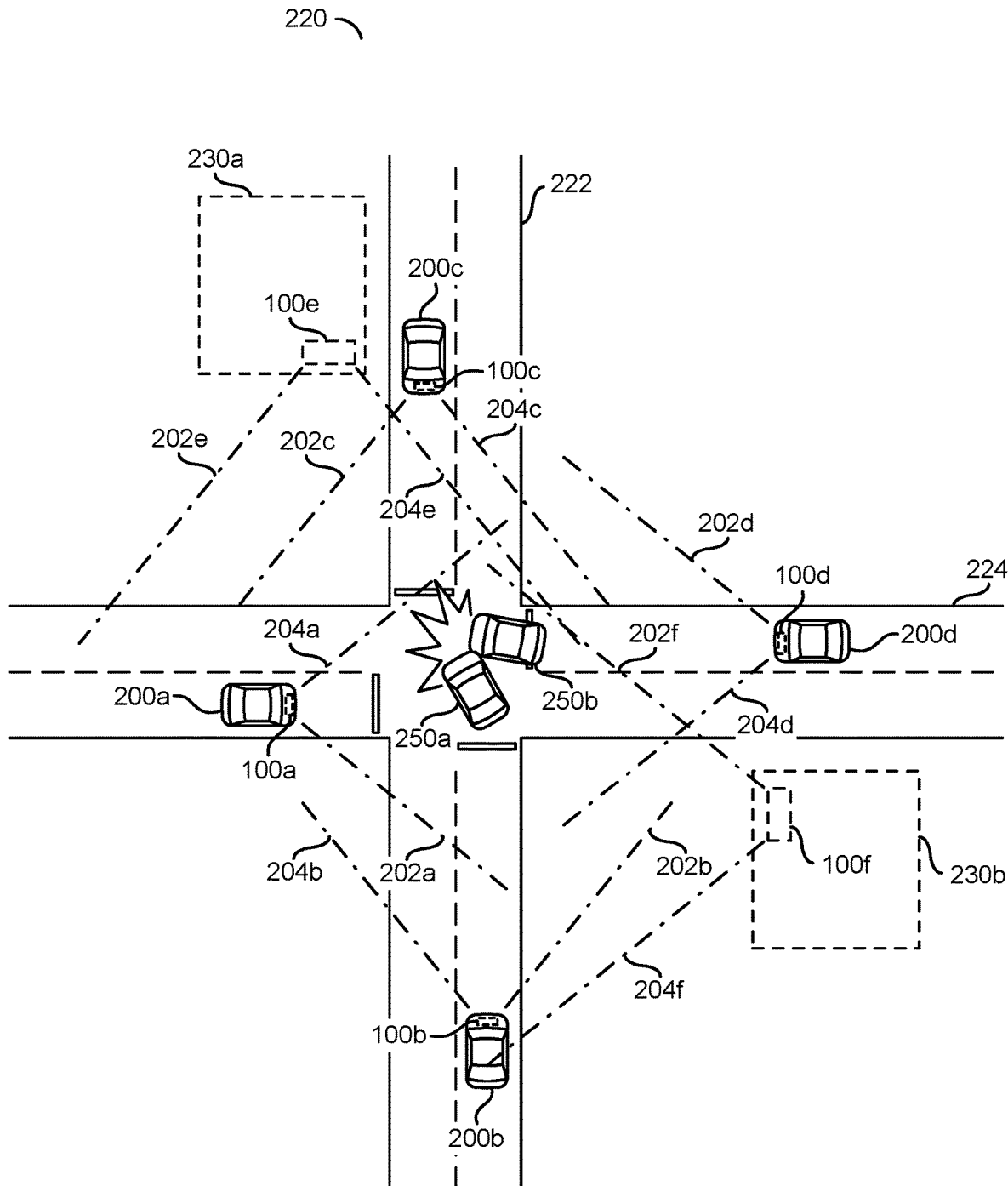
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250a captured by the capture device 100b and associated with the video clip 180b. The subscriber users may use the subscriber devices 110a-110n (e.g., via the app and/or web interface 114a) to search the metadata 184a-184n to view any videos that may have been captured of the event 220.

In some embodiments, the capture devices 100a-100n may implement Wi-Fi communication (e.g., to transmit the metadata and/or the recorded videos to the network 60). Implementing the Bluetooth communication to transfer data between the capture devices 100a-100n and the user communication devices 112a-112n may be useful in the vehicles (e.g., 200a-200d) to forward metadata and/or recorded videos to the network 60. In some embodiments, the capture devices 100a-100n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100a-100n could be placed to face out a window of a home and/or business (e.g., similar to a consumer IP camera). Connecting the capture devices 100a-100n to a Wi-Fi access point may enable the cameras 100a-100n to operate like a consumer IP Camera but additionally provide the video clip metadata 180a-180n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100a-100n in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video clips 180a-180n in the database 130, a list of videos of the event 220 may be provided. If the subscriber user decides to request a video recording of the event, the server 120 may send a request to one or more of the capture devices 100a-100n (or the associated user communication device 112a-112n). The circuits 102a-102n may set a flag for the requested video in response to the request from the server 120. Setting the flag for the requested video may be used to preserve the requested video recording (e.g., prevent the video from being over-written). The capture devices 100a-100n and/or the user communication devices 112a-112n may upload the video data to the server 120. In some embodiments, the associated video may be preserved for all data points that may be returned as search results of a search query. For example, the server 120 may send the request to one or more of the capture devices 100a-100n (or the associated user communication device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100a-100n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100a-100n in the vicinity may start preserving data. In one example, if the VIP event is happening presently, the video data being currently recorded may be preserved. In another example, the video data currently residing in the memory of the capture devices 100a-100n associated with the time of the event may be preserved (e.g., a crime is reported after the event occurs and later an interrupt request is provided to the capture devices 100a-100n to preserve potential evidence).

In some embodiments, the video metadata 182a-182b and/or the object information 186a-186n associated with each of the objects 184a-184n may enable the event 220 to be re-created, even if the video data is no longer available (e.g., expired, over-written, etc.). For example, the object information 186a-186n may be used for each of the objects 184a-184n of each of the video clips 180a-180n associated with the event 220 (e.g., based on a timestamp and/or general location) to determine the absolute location of each of the vehicles 200a-200d and/or the colliding vehicles 250a-250b. Even if the video data is no longer available, the object information 186a-186bn may provide detailed absolute coordinate information over a sequence of time. For example, the detailed absolute coordinate information may be used to indicate where each of the colliding vehicles 250a-250b were before, during and after the event 220. For example, by analyzing the absolute location coordinates over a sequence of time, the speed, direction of travel, the timing of the event 220 and/or other information about the colliding vehicles 250a-250b may be determined to re-create the event 220.

Figure 5:
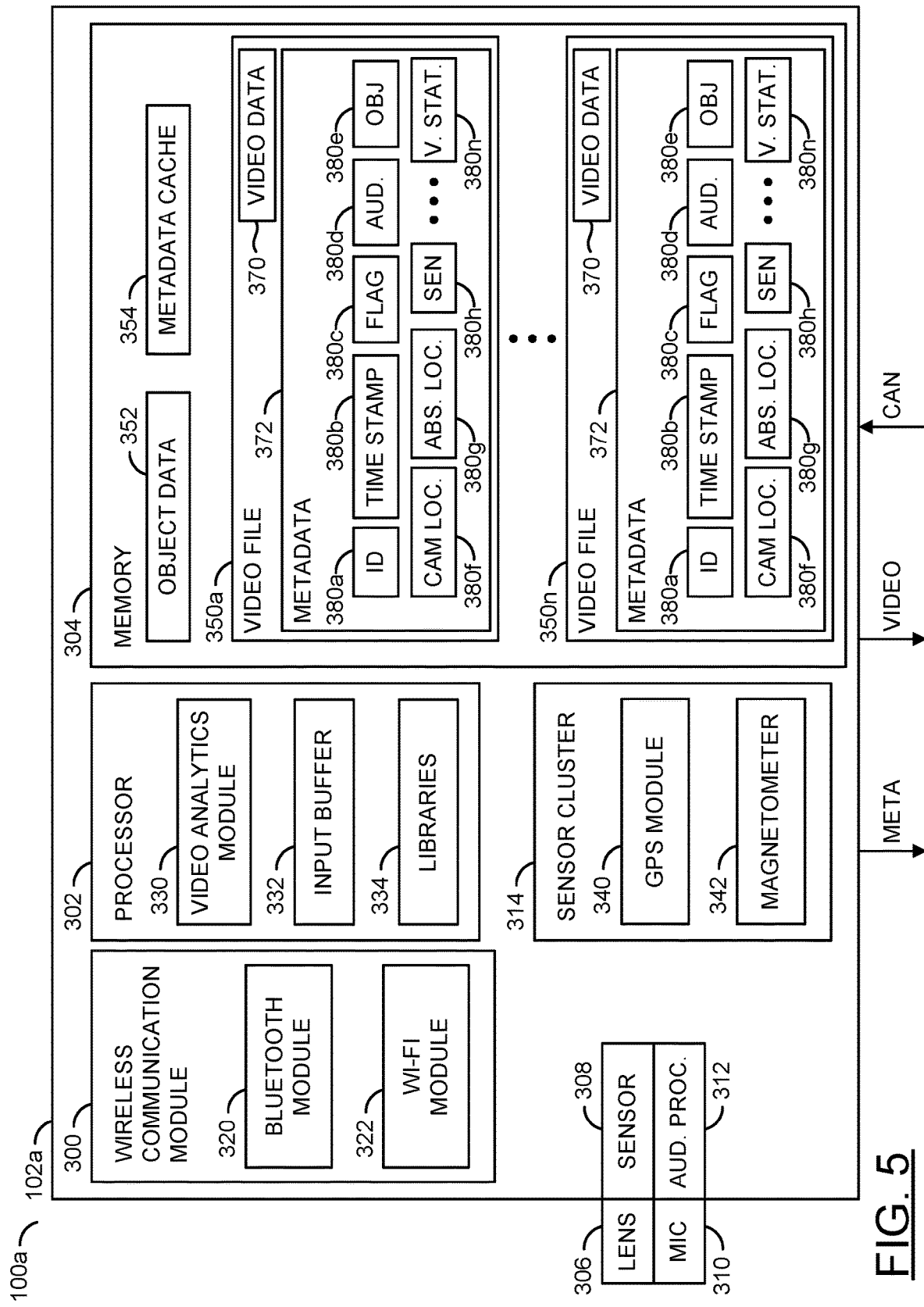
FIG. 5 is a block diagram illustrating an example implementation of circuit for performing the functionality of a vehicle-mounted camera.

Referring to FIG. 5, a block diagram illustrating an example implementation of the circuit 102a configured to perform the functionality of a vehicle-mounted camera 100a. The capture device 100a may be a representative example of one of the capture devices 100a-100n. The capture device 100a may comprise the circuit 102a. In some embodiments, the circuit 102a may be a main printed circuit board for the capture device 100a. In some embodiments, the circuit 102a may comprise various circuit boards, daughter boards and/or modules. For example, the circuit 102a may comprise multiple printed circuit boards connected using cables. In another example, the circuit 102a may comprise input/output slots configured to connect to drop in components (e.g., off-the-shelf components). Generally, the circuit 102a may be designed to fit a space and/or heat dissipation specification for the capture device 100a.

The circuit 102a may comprise a block (or circuit) 300, a block (or circuit) 302, a block (or circuit) 304, a block (or circuit) 306, a block (or circuit) 308, a block (or circuit) 310, a block (or circuit) 312 and/or a block (or circuit) 314. The block 300 may implement a wireless communication module. The block 302 may implement a processor. The block 304 may implement a memory. The block 306 may implement a lens module. The block 308 may implement a camera sensor module. The block 310 may implement a microphone. The block 312 may implement an audio processor. The block 314 may implement a sensor cluster. The circuit 102a may comprise other components (not shown). For example, the circuit 102a may comprise a firmware, input/output ports, memory expansion slots, a battery, a power adapter (for connection to an external power supply), etc.

The components of the circuit 102a may be varied according to the design criteria of a particular implementation.

The circuit 102a is shown presenting a signal (e.g., META) and a signal (e.g., VIDEO). The circuit 102a is shown receiving a signal (e.g., CAN). The circuit 102a may present the signal META to a corresponding one of the user communication devices 112a (e.g., a paired wireless communication device). The circuit 102a may present the signal VIDEO to a video processing pipeline. The circuit 102a may receive the signal CAN from a communication bus of the vehicle 200a (e.g., a CAN bus).

The wireless communication module 300 may be configured to implement one or more wireless communication protocols. The wireless communication module 300 may be configured to transmit data and/or receive data. For example, the wireless communication module 300 may enable the circuit 102a to communicate with one or more of the user communication devices 112a-112n and/or the network 60. In the example shown, the wireless communication module 300 may comprise a block (or circuit) 320 and/or a block (or circuit) 322. The block 320 may implement a Bluetooth module. The block 322 may implement a Wi-Fi module. The wireless communication module 300 may comprise other components (not shown). For example, the wireless communication module 300 may comprise a module configured to implement 3G/4G/LTE/5G communication. The implementation of the wireless communication module 300 may be varied according to the design criteria of a particular implementation.

The Bluetooth module 320 may be configured to implement Bluetooth communication. For example, the Bluetooth module 320 may be configured to pair the circuit 102a with the user communication device 112a. The Bluetooth module 320 may enable a transfer of the video data and/or the metadata from the circuit 102a to the user communication device 112a. The Bluetooth module 320 may enable a short-range and/or low-power communication.

The Wi-Fi module 322 may be configured to implement Wi-Fi communication. In some embodiments, the Wi-Fi module 322 may be configured to connect to a local and/or wide area network. In some embodiments, the Wi-Fi module 322 may be configured to create a local network and other devices (e.g., the user communication device 112a) may connect to the Wi-Fi module 322. The Wi-Fi module 322 may enable wireless communication of the video data and/or the metadata. In some embodiments, the Wi-Fi module 322 may be configured implement a mesh network with other Wi-Fi modules. For example, the Wi-Fi module 322 implemented in the capture device 100a may form a mesh network with other nearby Wi-Fi module(s) 322 in the capture devices 100b-100n. Implementing a mesh network may enable the circuits 102a-102n to communicate using an ad-hoc Wi-Fi network as vehicles move around. For example, one or more of the data provider users may have a desired connectivity to the network 60 (e.g., sufficient upload bandwidth, sufficient data quota with the service provider, an unlimited data plan, etc.). Other data provider users that do not have the desired connectivity to the network 60 may use the mesh network to utilize the connectivity to the network 60 of data provider users that do have the desired connectivity to the network 60. The mesh network may help more of the data provider users to have reliable access to the network 60.

In some embodiments, the circuit 102a may be implemented without the Wi-Fi module 322. For example, since the signal META may be transmitted to the user communication device 112a without the video data, the circuit 102a may have a low bandwidth requirement. The small amount of data communicated in the signal META may enable a lower cost communication protocol (e.g., the Bluetooth module 320) to be implemented. The circuit 102a may rely on the user communication device 112a to communicate with the network 60. Using a low cost communication protocol to communicate with the user communication device 112a and relying on the user communication device 112a to communicate with the network 60 may enable the circuit 102a to be implemented at a low cost.

The processor 302 may be configured to read, write and/or process data, perform calculations and/or execute computer readable instructions. The processor 302 may implement one or more processing cores to enable parallel processing. The processor 302 may be implemented using various architectures (e.g., x86/x64, ARM, RISC-V, etc.). In some embodiments, the processor 302 may be a Tensor processing unit configured for deep machine learning. The processor 302 may be configured to perform various types of operations (e.g., a general purpose processor). In some embodiments, the processor 302 may implement various hardware modules configured to implement specific tasks. In the example shown, the processor 302 may comprise a block (or circuit) 330 a block (or circuit) 332 and/or a block (or circuit) 334. The block 330 may implement a video analytics module. The block 332 may implement an input buffer. The block 332 may comprise an input buffer. The block 334 may implement a detection libraries module. The processor 302 may comprise other types of modules such as a video encoding module, an image encoding module and/or other modules (not shown). For example, the processor 302 may further comprise an encryption module. The implementation of the processor 302 may be varied according to the design criteria of a particular implementation.

The video analytics module 330 may be configured to perform real-time video analytics on the captured video data. The video analytics module 330 may be configured to perform the real-time video analytics on the video data captured by multiple installed camera systems in parallel (e.g., all of the camera systems 100a-100d configured to provide an all-around view as shown in association with FIG. 3). The video analytics module 330 may be configured to extract the metadata in response to the video analytics. The video analytics module 330 may be configured to scan visual data present in each video frame captured by the capture device 100a. In some embodiments, the video analytics module 330 may implement optical character recognition. In some embodiments, the video analytics module 330 may be configured to detect and/or classify objects detected in the video data. For example, the video analytics module 330 may compare features of the captured video frames to known features (e.g., templates) to identify an object captured in the video frame as a particular type of object (e.g., identify a vehicle as a particular make, model and year of a vehicle). The type of video analytics performed by the video analytics module 330 may be varied according to the design criteria of a particular implementation.

In some embodiments, the analytics performed by the video analytics module 330 may comprise determining characteristics of roadway features and/or objects. The metadata generated by the video analytic module 330 may be used as training data sets for machine learning. In one example, the capture devices 100a-100n may be implemented as dashboard cameras (e.g., dashcams) and the images captured may comprise various roadway data. The video analytics module 330 may analyze many images of various roadways and/or obstacles (e.g., curves, lane markings, curbs, street signs, traffic lights, license plate styles, road markings, pedestrians, vehicle types, vehicle makes, vehicle models, road hazards (e.g., snow, ice, flooding, chemical spills, etc.), construction barriers, etc.). The large amounts of metadata produced by the video analytics module 330 may provide many sample images and/or metadata of roadway data and/or object data. The data generated by the video analytics module 330 may be used to generate feature templates to improve detection when video analytics is performed (e.g., provide a greater data set to compare against). In an example, the metadata generated by the video analytics module 330 may be combined with data from other sensors (e.g., LIDAR, GPS and/or other sensors used to gather roadway data) for machine learning for autonomous driving.

In some embodiments, the analytics performed by the video analytics module 330 may comprise determining a distance of various detected objects from the lens 306. The video analytics module 330 may be configured to compare the sizes of objects detected in the video data with known object sizes. The video analytics module 330 may be configured to determine a region of a license plate, and compare the detected plate characters with the size of the license plate characters for the detected region (e.g., or vehicle type for vehicles such as motorcycles that have smaller plates). The video analytics module 330 may be configured to detect the corners of objects (e.g., such as the corners of a license plate) to determine a size of the detected object.

In some embodiments, the analytics performed by the video analytics module 330 may be configured to account for (e.g., normalize) objects that are at an angle to determine the size of the detected objects. For example, relationships between various portions of an object may be analyzed to determine an orientation of an object (e.g., rotated, at an angle, slanted, skewed, etc.). The video analytics module 330 may be configured to correct distortion caused by the lens 306. For example, de-warping may be performed to correct distortions caused by a wide (e.g., fisheye) lens.

The video analytics module 330 may utilize a number of libraries provided by the detection libraries module 334. Each of the libraries may be configured to recognize various types of objects. Each of the libraries may be specialized and/or customized for detecting specific types of objects. In one example, one of the libraries may be configured to detect and/or identify vehicles in the captured video frames. In another example, one of the libraries may be configured to recognize street signs. In yet another example, one of the libraries may be configured to perform OCR for license plate reading. The libraries may be third party modules for recognizing objects that may be divided into discrete tasks. Different libraries may be provided by different vendors (e.g., each vendor may specialize in a particular area of object detection). The different libraries may run sequentially or in parallel and operate on different parts of the video frame stored in the input buffer 332.

The input buffer 332 may be a memory configured to provide temporary storage for newly captured video data. The video data may be in the input buffer 332 while the video analytics module 330 performs the video analysis in real time and/or video encoding is performed to store the video data in the memory 304. The input buffer 332 may be configured to limit the amount of spatial data used from an input video frame as input to the buffer used for video analytics. By limiting the amount of spatial data input to the working buffer the inherently limited system resources of the real time system may allocated more efficiently.

The detection libraries module 334 may comprise a computer vision model comprising features of various objects for the video analytics module 330 to detect. For example, the various objects detected by the video analytics module 330 may be determined in response to a comparison with the data in the detection libraries module 334. The detection libraries module 334 may be updateable. For example, as various feature libraries are loaded into the detection libraries module 334, the video analytics module 330 may detect different types of objects and/or characteristics. In an example, one detection library may provide features for identifying vehicles, another detection library may provide features for identifying pedestrians, another detection library may provide features for identifying traffic signals, etc. Details of various library data implemented by the detection libraries module 334 may be described in U.S. application Ser. No. 16/156,254, filed on Oct. 10, 2018 and U.S. application Ser. No. 17/568,746, filed on Jan. 5, 2022, appropriate portions of which are incorporated by reference.

The library (or libraries) implemented by the detection libraries module 334 for each of the camera systems 100*a*-100*n* may be determined based on a type of vehicle used or the type of service provided by the vehicle (e.g., details that may be important to one type of driver or property owner may not be important to another driver or property owner). In an example, for a regular commuter, the libraries implemented may be configured to detect details about traffic accidents (e.g., vehicles, traffic signals, pedestrians, etc.). In another example, for a delivery vehicle, the libraries implemented may be configured to detect details about property damage (e.g., to provide proof that the delivery truck did not cause damage). In yet another example, for a municipal traffic enforcement vehicle, the libraries may be configured to detect parking locations and/or parking violations. The types of libraries implemented by the libraries module 334 may be varied according to the design criteria of a particular implementation.

The lens module 306 may be configured to focus light onto the camera sensor 308. The lens module 306 may comprise mechanisms for zooming, panning, tilting, focusing, adjusting a DC iris, etc. The camera sensor 308 may be configured to convert the light from the lens module 306 into images. The images generated by the camera sensor 308 may be the video frames of the captured video data. The video frames generated by the camera sensor 308 may be processed by the processor 302 to generate the captured video.

The microphone 310 may be configured to capture sound in the environment near the vehicle 200*a*. In some embodiments, the microphone 310 may be located on the device 102*a*. In some embodiments, the microphone 310 may be part of the vehicle 200*a*. The location of the microphone 310 may be varied according to the design criteria of a particular implementation.

The audio processor 312 may be configured to perform various operations on the sound captured by the microphone 310. In an example, the audio processor 312 may be configured to encode and/or compress the captured sound into an audio file. The audio file generated by the audio processor 312 may be associated with the captured video data (e.g., to synchronize the audio data with the video data). In some embodiments, the audio processor 312 may be configured to perform audio analytics. For example, the audio processor 312 may be configured to implement speech recognition and/or speech-to-text. The audio processor 312 may be configured to generate a text reproduction of the sound captured (e.g., provide a transcription of words spoken by occupants of the vehicle 200a, provide a transcription of pedestrians near the vehicle 200a, provide a text description of sounds heard (e.g., crashes, tires squealing, engines revving, etc.). In the example shown, the audio processor 312 is shown as a separate module from the processor 302. In some embodiments, the functionality of the audio processor 312 may be performed by the processor 302.

The sensor cluster 314 may comprise various input sensors implemented by the device 102a. The sensor cluster 314 may be configured to generate sensor data that may be added to the metadata. The sensor cluster 314 may be configured to perform sensor fusion to interpret data from and/or make decisions based on disparate sources of data that would not be achievable using one data source alone. The sensor cluster 314 may be configured to perform various measurements (e.g., temperature, humidity, wind speed, acceleration, rotation, etc.). In the example shown, the sensor cluster 314 may comprise a block (or circuit) 340 and/or a block (or circuit) 342. The circuit 340 may implement a location device. The circuit 342 may implement a magnetometer. The sensor cluster 314 may comprise other components (not shown). The number, type and/or arrangement of the sensors implemented by the sensor cluster 314 may be varied according to the design criteria of a particular implementation.

The location device 340 may be configured to calculate the location coordinates of the vehicle 200a. In an example, the location device 340 may be a GPS/GNSS module. The location device 340 may be configured to communicate with GPS/GNSS satellites, receive data from the GPS/GNSS satellites and/or perform calculations on the data from the GPS/GNSS satellites to determine the current location of the capture device 100a. The current location of the capture device 100a determined by the location device 340 may be stored as part of the metadata.

The magnetometer 342 may be configured to calculate a direction of travel and/or a direction the capture device 100a is facing. The direction of travel and/or direction the capture device 100a is facing may be a numerical representation of a direction and/or angle. The direction of the capture device 100a determined by the magnetometer 342 may be stored as the location coordinates, which may be part of the metadata. In some embodiments, if the magnetometer 342 is not available the previous GPS coordinates may be used to infer the direction of travel.

The memory 304 may be configured to store data. The memory 304 may comprise a solid state memory (e.g., NAND flash). In some embodiments, the memory 304 may comprise memory onboard the circuit 102a and/or external memory (e.g., a microSD card). The memory 304 may comprise blocks (or circuits) 350a-350n, a block (or circuit) 352 and/or a block (or circuit) 354. The blocks 350a-350n may each implement storage of a video file. The block 352 may implement object data. The block 354 may implement a metadata cache. The memory 304 may comprise other data (not shown). For example, the memory 304 may further comprise a firmware. The type of memory implemented by the data arrangement of and/or the data stored by the memory 304 may be varied according to the design criteria of a particular implementation.

The video files 350a-350n may comprise the captured/recorded video and/or other information associated with the video. Each of the video files 350a-350n may comprise storage locations for a video clip (e.g., a discrete video recording and/or a video segment). In some embodiments, the video files 350a-350n may represent video clips having a same length (e.g., 2 minute video clips). In some embodiments, the video files 350a-350n may represent video clips (or segments) having different lengths (e.g., based on a storage size of each video file). Each video file storage location 350a-350n may comprise a corresponding one of a block (or circuit) 370 and/or a block (or circuit) 372. The block 370 may comprise video data. The block 372 may comprise metadata. For example, the metadata 372 may be associated with the corresponding video data 370. The metadata 372 may each comprise blocks (or circuits) 380a-380n. The blocks 380a-380n may comprise various data sets of the metadata 372. The block 380a may comprise the video ID. The block 380b may comprise a time stamp. The block 380c may comprise a flag. The block 380d may comprise audio data. The block 380e may comprise object information. The block 380f may comprise location coordinates and/or a direction. The block 380g may comprise absolute locations. The block 380h may comprise sensor data. The block 380n may comprise vehicle status information. The video files 350a-350n may comprise other data (not shown). The type of data stored and/or the arrangement of data stored in the video files 350a-350n may be varied according to the design criteria of a particular implementation.

The video data 370 may comprise the viewable captured video. The video data 370 may be the data transmitted in response to a request from the subscriber user (e.g., one of the subscriber devices 110a-110n). The video data 370 may be encoded before the video data 370 is created and stored. In some embodiments, the video data 370 may not be stored (e.g., only the metadata 372 may be stored and the video data 370 may be discarded after the video analytics is performed).

The video ID 380a may comprise an identification for the video files 350a-350n. The video ID 380a may be implemented as a data string comprising alphanumeric characters (e.g., a hash). The video ID 380a may represent a portion of the metadata 372 associated with the video files 350a-350n. The video ID 380a may be used by the database 130 to locate and/or match the metadata clips 180a-180n to a particular one of the video files 350a-350n on the devices 100a-100n.

The time stamp 380b may comprise an indication of when the video files 350a-350n have been recorded. The time stamp 380b may comprise a data string. For example, the time stamp 380b may indicate a year, a month, a date, a day of the week, an hour, a minute, seconds, fractions of a second, etc. The time stamp 380b may represent a portion of the metadata associated with the video files 350a-350n. The time stamp 380b may be used by the processor 302 to determine which of the video files 350a-350n is the oldest. The time stamp 380b may be used by the processor 302 to determine an order that the video files 350a-350n were recorded, based on time. The time stamp 380b may be used by the processor 302 to correlate the captured video data 370 and/or extracted metadata 372 with the location coordinates 380f.

The flags 380c may be used to indicate whether the video data 370 may be overwritten. The flags 380c may represent one or more preservation bits for the video files 350a-350n. In one example, when one of the flags 380c is set (e.g., to indicate the file should be preserved) by the capture devices 100a-100n, the corresponding video data 370 of one of the video files 350a-350n may not be overwritten. In another example, when one of the flags 380c is not set (e.g., to indicate the file should not be preserved), the corresponding video data 370 of one of the video files 350a-350n may be made available to be overwritten (e.g., by a new video file).

In some embodiments, the flags 380c may be implemented using a single bit. In some embodiments, multiple bits may be used for each of the flags 380c. In one example, when using multiple bits for the flags 380c, a condition for determining how long to preserve the video data 370 may be set (e.g., an amount of time, a particular date, an occurrence of an event, etc.). In another example, when multiple bits are used for the flags 380c, different lengths of time to preserve the video data 370 may be set based on a reason for preserving the video data 370 (e.g., preserve video files for 3 days if a video is the result of a subscriber search, preserve video files indefinitely if the video is evidence, preserve video files one week if an event was captured, etc.). In yet another example, when multiple bits are used for the flags 380c, the bits may represent an amount of time to preserve the video data 370 based on a value of a subscriber user and/or subscription tier (e.g., a subscriber user paying a higher fee may result in a value of 5 being stored for the flags 380c to indicate preservation for 5 days, a subscriber user paying a lower fee may result in a value of 2 being stored for the flags 380c to indicate preservation for 2 days, etc.). Generally, a user that does not have a subscription to access the database 130 (e.g., a user that is not a subscription user) may not receive search results from the database 130 (e.g., the database 130 may not generate search results and/or may not allow a search query if a user is not one of the subscriber users). In some embodiments, the processor 302 may use the flags 380c to decide when to overwrite the video data 370 (e.g., compare the creation date of the video files 350a-350n plus the flag value to the current date). The implementation of the flags 380c may be varied according to the design criteria of a particular implementation.

The audio data 380d may comprise audio information corresponding to the video data 370. In some embodiments, the audio data 380d may comprise compressed audio generated by the audio processor 312 (e.g., sound information compressed into an .mp3 file, a .flac file, a .aac file, a .ogg file, etc.). For example, since sound information may be relatively smaller than the video data 370, the sound information captured by the microphone 310 may be preserved even if the video data 370 is not. In some embodiments, the audio processor 312 may perform audio analytics to transcribe sounds captured in the audio data (e.g., speech-to-text, describe sounds such as crashes and car horns, etc.) and the transcribed sounds may be stored as the audio data 380d. Audio transcribed as text may be relatively smaller than storing sound information.

The object data 380e may comprise information about the objects detected in response to the video analytics performed by the video analytics module 330. In an example, the object data 380e may be comprised of relative coordinates of each object detected (e.g., a distance and/or direction from the lens 306, an X/Y coordinate position, etc.). In another example, the object data 380e may comprise a classification of the objects detected (e.g., vehicles, people, signs, street lights, etc.). In yet another example, the object data 380e may comprise characteristics of the objects detected (e.g., make/model/year of vehicle, color of vehicle, identifying markers on the vehicle (e.g., scratches, truck balls, bumper stickers, etc.), description of pedestrians, status of traffic lights, license plate information, text on signs, condition of roads, etc.). The type of data stored about the objects detected in the object data 380e may be varied according to the design criteria of a particular implementation.

The location coordinates 380f may comprise the location coordinates determined by the sensor cluster 314 determined at the time the corresponding video files 350a-350n were created. The location coordinates 380f generally correspond with the location and/or direction of travel of the capture device 100a. For example, the location of the capture device 100a may be used as a proxy for the location and/or direction of travel of the vehicle 200a. The location coordinates 380f may comprise a sequence of values (e.g., to track the location of the capture device 100a as the vehicle 200a moves over the duration of the recording). The location coordinates 380f may comprise longitude values, latitude values, altitude values and/or the alternate coordinates (e.g., location information from the user communication devices 112a-112n) generated by the location module 340. The location coordinates 380f may further comprise the direction of travel determined by the magnetometer 342 in the sensor cluster 314. The direction of travel may correspond to the direction that the capture device 100a was facing when while the corresponding video files 350a-350n were recorded. The direction may be a sequence of values (e.g., to track the direction of the capture device 100a as the associated vehicle 200a moves over the duration of the recording).

The absolute location 380g may comprise the actual location of each of the objects in the object data 380e identified by the video analytics module in the video data 370. The absolute coordinates 380g may be determined based on the location coordinates 380f (e.g., location and direction of the capture devices 100a-100n) and the distance of the detected objects from the capture devices 100a-100n. The distance of the objects may be determined by the video analytics module 330. The absolute locations 380g may be a sequence of values associated with a particular detected object (e.g., each object detected may have a corresponding array of values). The sequence of values for the absolute locations 380g may indicate where the detected object is over time (e.g., to track each of the detected objects over the duration of the recording). In some embodiments, the absolute locations 380g may comprise a distance with reference to the capture device 100a (e.g., how far the object is from the capture device 100a). In some embodiments, the absolute locations 380g may comprise real-world location values without reference to the capture device 100a (e.g., latitude, longitude, altitude, etc.).

The sensor data 380h may comprise the other sensor data generated from the sensor cluster 314. The sensor data 380h may comprise sensor data that may have been captured alongside the video data 370. In an example, the sensor data 380h may comprise acceleration information generated by an accelerometer, positional, rotational and/or acceleration information generated by a gyroscope, temperature information generated by a thermometer, etc. In one example, the thermometer may measure a temperature of the environment near the vehicle 200a. In another example, the thermometer may measure a temperature of the processor 302 (e.g., when the temperature of the processor 302 reaches a high threshold, various operations may be scaled back such as real-time video analytics in order to prevent damage to the processor 302). The sensor data 380h may provide information about the environment associated with the time that the video data 370 has been captured. The type of information stored in the sensor data 380h may be varied according to the design criteria of a particular implementation.

The vehicle status information 380n may comprise information about the vehicle 200a. The vehicle status information 380n may be data generated by various systems of the vehicle 200a. In an example, the vehicle status information 380n may be communicated over a communication bus (e.g., a CAN bus) of the vehicles 200a-200n. The vehicle status information 380*n* may be received as the input signal CAN. In an example, the vehicle status information 380*n* may comprise steering wheel position and movement, gas and brake pedal activation, service codes related to the vehicle engine state, tire inflation details, seatbelt engagement status, door ajar sensor warnings, etc. The type of information stored in the vehicle status information 380*n* may depend on the communication and/or sensor capabilities of each individual one of the vehicles 200*a*-200*n*. The number and/or types of data stored in the vehicle status information 380*n* may be varied according to the design criteria of a particular implementation.

The object data 352 may comprise information about known objects. The information about known objects may be used to identify, detect, and/or compare objects in the video data 370. In one example, the object data 352 may comprise a database of vehicle makes, models, years, colors, sizes, dimensions, etc. In another example, the object data 352 may comprise regional information about license plates (e.g., shape, size, font, character size, design for each state/country, etc.). In yet another example, the object data 352 may comprise information about signs, billboards, buildings, cell towers, and/or other objects (trees, lane dividers, pylons, pedestrians, animals, etc.). The object data 352 may be used in order to provide various information for the object data 380*e*.

The video analytics module 330 may be configured to compare the objects detected in the video data 370 with the known object data 352. The comparison may be used to determine the distance of the detected object from the capture device 100*a*. For example, if the detected object is a 2018 Ford F-150, the known dimensions of a 2018 Ford F-150 in the stored in the object data 352 may be compared with the dimensions of the detected 2018 Ford F-150. Based on a size comparison of the known and detected dimensions, the distance of the 2018 Ford F-150 from the capture device 100*a* may be determined. In another example, if a license plate is detected as a Michigan license plate, the size of the alphanumeric plate characters may be compared to the known size of characters for Michigan license plates to determine the distance of the license plate from the capture device 100*a*. The types of objects and/or information about objects stored in the object data 352 may be varied according to the design criteria of a particular implementation.

In some embodiments, the object detection may be performed in real-time and the distance calculations for the detected objects may be performed later. In an example, the object data 352 may not have the capacity to store known characteristics of all objects. For example, if the dimensions of the 2018 Ford F-150 are not currently stored in the known object data 352, the size comparison may be delayed. In an example, the capture device 100*a* may send a request to the user communication device 112*a* to retrieve dimensions for the 2018 Ford F-150. When the information becomes available to the capture device 100*a*, the size comparison may be performed.

The metadata cache 354 may be configured to store the metadata extracted by the video analytics module 330 and/or any other metadata corresponding to the captured video data 370. The metadata cache 354 may provide temporary storage. In some embodiments, the metadata 372 may not be stored long-term by the memory 304. For example, the metadata 372 may be deleted after being successfully stored by the database 130 as the metadata 158. Temporarily storing the metadata may increase an amount of the memory 304 available for storing the video data 370. Some of the metadata 372 may be stored long-term by the memory 304 (e.g., the video ID 380*a* and/or the time stamp 380*b*). The metadata cache 354 may provide storage for the metadata 372 until the metadata 372 is uploaded to the database 130. In some embodiments, when the database 130 communicates that the metadata 372 for a particular one of the video files 350*a*-350*n* has been successfully stored, the metadata cache 354 may purge the corresponding metadata 372. Generally, the metadata files may be created in the metadata cache 354, filled with metadata, compressed, encrypted, transferred to the user communication devices 112*a*-112*n*, and then deleted from the metadata cache 354 (e.g., after a confirmation of successful upload to the database 130 has been received). In some embodiments, the metadata cache 354 may provide an output buffer for the metadata 372 that may be uploaded to the database 130 and the metadata 372 stored with the video files 350*a*-350*n* may be stored long-term.

The signal META may comprise the data that may be stored by the database 130 as the metadata 158 extracted from the captured video by the processor 302. The signal META may comprise the metadata stored by the metadata cache 354. The signal META may be generated by the metadata cache 354 and transmitted to the database 130 for storage and/or indexing. The wireless communication module 300 may implement a short-range, inexpensive and/or low power consumption communications protocol (e.g., Bluetooth) to communicate with the user communication device 112*a*. The user communication device 112*a* may forward the signal META from the circuit 102*a* to the network 60. The network 60 may transmit the signal META to the server 120 for storage in the database 130.

The signal VIDEO may comprise the video data 370 recorded by the capture device 100*a* and/or the circuit 102*a*. The signal VIDEO may be generated by the wireless communication module 300 and transmitted to the server 120 and/or one of the subscriber devices 110*a*-110*n*. The wireless communication module 300 may implement a short-range, inexpensive and/or low power consumption communications protocol (e.g., Bluetooth) to communicate with the user communication device 112*a*. The user communication device 112*a* may forward the recorded video to the network 60.

Transmitting the video data 370 to the subscriber users may be a low-priority data transfer. One of the flags 380*c* corresponding to the video file 350*a*-350*n* being transferred may be set to ensure the video file 350*a*-350*n* is preserved at least until the data transfer is completed. Generally, the transfer of the signal VIDEO may not be initiated by the circuit 102*a* until the subscriber user requests the video. For example, if a user does not request a recorded video, the video file may eventually be overwritten by the capture device 100*a*. Since the recorded video is not transmitted until requested, unnecessary transfer and/or storage of data may be reduced.

The signal CAN may comprise the vehicle status information generated by the vehicle 200*a*. In an example, the signal CAN may comprise an input presented by the CAN bus of the vehicle 200*a*. The information from the signal CAN may be used to generate the vehicle status information 380*n* for the metadata 372.

The metadata 158 stored in the database 130 may comprise the video ID 380*a* of the corresponding video 350*a*-350*n* and/or store data used to derive the video ID 380*a* and/or the capture device 100*a*-100*n* that stores the corresponding video file 350*a*-350*n*. For example, the metadata 158 may store the time stamp 380*b* as the time 182*a* (e.g., when the first entry is inserted to the video files 350*a*-350*n*), a user ID as the camera ID 182*n* (e.g., to identify the user communication device 112*a*-112*n* corresponding to the capture device 100*a*-100*n* that captured the corresponding video files 350*a*-350*n*), a sequence number (e.g., a sequential number incrementing from 0 to 1029 and then looping back to 0). In one example, the metadata 158 may be a filed named "DATA-2017-03-07-14-30-00-00-01-0099.txt" (e.g., corresponding to the first timestamp and/or GPS entry deposited Mar. 7, 2017 at 2:30:00 PM by Driver ID #0001 and a sequence number of video file 0099). The contents of the file for the video clip metadata 180*a*-180*n* may comprise a sequence of lines of data. Each line of data may comprise at least a time stamp entry, a latitude and/or a longitude (e.g., 2017-03-07 14:30:00, 37.804440, −122.422874, 2017-03-07 14:30:20, 37.804440, −122.422874, etc.). Some lines of data may comprise a video file name and/or status of the video file (e.g., FILE DELETED: VIDEO-2017-03-06-14-30-00-0001-0022.MP4, FILE CREATED: VIDEO-2017-03-07-14-31-40-0001-0052.MP4, etc.). The video file names of the metadata 180*a*-180*n* may correspond with the names of the video files 350*a*-350*n*. The format of the metadata clips 180*a*-180*n* stored in the database 130 may be varied according to the design criteria of a particular implementation.

The processor 302 may be configured to receive captured images from the sensor 308 and/or perform video analytics using the video analytics module 330 to extract the metadata. In some embodiments, the processor 302 may be further configured to encode the captured video and/or store the encoded video data 370 as the video files 350*a*-350*n* in the memory 304. The video files 350*a*-350*n* may be created in the memory 304 to implement a loop recording. The loop recording implementation may create new video files 350*a*-350*n* in available (e.g., free) space in the memory 304. For example, if the memory 304 has free space available, the newest encoded video data may be stored in the free space of the memory 304 (e.g., previously stored data may not be overwritten). When the memory 304 is filled (e.g., stored to capacity), the memory 304 may overwrite previously stored data with the new data.

Generally, a loop recording default storage implementation may overwrite the oldest data (e.g., the video data 370 having the oldest/lowest time stamp 380*b*) first. For example, if the video data 370 of the video file 350*a* is written into the memory 304 first and the video data 370 of the video file 350*i* is written into the last of the available free space (e.g., video files 350*a*-350*i* take up all the available free space), then the video data 370 for the next video file 350*j* may overwrite the video data 370 of the video file 350*a* (e.g., and subsequently the video data 370 of the video files 350*b*, 350*c*, etc. may be overwritten by new video data) but the metadata 372 may be preserved. The loop recording default storage implementation may enable the video data 370 of the video files 350*a*-350*n* to be stored in the memory 304 as portions of a continuous recording (e.g., the video data 370 may be continuously captured as the vehicle 200 is being driven and the video files 350*a*-350*n* may be the continuous video segmented into shorter clips).

The flags 380*c* may be configured to override the loop recording default storage implementation. The flags 380*c* may indicate that the video data 370 of one or more of the video files 350*a*-350*n* should be preserved even if the video data 370 of the video file would be the next (e.g., oldest) file to be overwritten in the loop recording default storage implementation. For example, if the video data 370 of the video file 350*a* is written into the memory 304 first and the flag 380*c* is set, the video data 370 in the video file 350*b* is written into the memory 304 second and the flag 380*c* is not set and the video data 370 of the file 350*i* is written into the last of the available free space (e.g., video data 370 of the video files 350*a*-350*i* take up all the available free space), then the next video file 350*j* may overwrite the video data 370 of the video file 350*b* instead of the video data 370 video file 350*a* (e.g., and subsequently the video files 350*c*, 350*d*, etc. may be overwritten unless a respective one of the flags 380*c* has been set) but not the corresponding metadata 372. Generally, the processor 302 may store the next portion of the captured video (e.g., the newest created video file 350*a*-350*n*) in an empty storage location of the memory 304 when free space is available (e.g., one or more storage locations of the memory 304 are empty), and in one of the storage locations of the memory 304 that stores the oldest portion of the captured video (e.g., overwrite the video data 370 of one of the video files 350*a*-350*n* having the oldest time stamp 380*b*) that does not have the flag 380*c* set if there are no empty storage locations in the memory 304.

The flags 380*c* may be modified to enable the video data 370 of the video files 350*a*-350*n* to be preserved in case that one of the subscriber users decides to request the video data 370 of one of the video files 350*a*-350*n*. The flags 380*c* may be implemented to strike a balance between preserving the video data 370 that may be potentially requested, and ensuring that the memory 304 may have space available for recording new video data 370 as well as the associated metadata 372.

In some embodiments, the flags 380*c* may be set to preserve the corresponding video data 370 of one of the video files 350*a*-350*n* when the database 130 selects the corresponding one of the video clips 180*a*-180*n* as the search result(s) in response to a search query from the subscriber users (e.g., sent using the app 114*a* on the subscriber devices 110*a*-110*n*). For example, from the search results of the query, the database 130 may identify the video ID(s) and/or the ID of the capture device(s) 100*a*-100*n* for the video clips 180*a*-180*n* based on the metadata 158. The database 130 may transmit a signal to the capture device(s) 100*a*-100*n* corresponding to the ID of the capture device stored in the metadata 158. The signal may identify the video IDs 380*a* corresponding to the search result. When the signal is received by the corresponding one of the circuits 102*a*-102*n*, the processor 302 may match the video IDs 380*a* with the video data 370 of the video files 350*a*-350*n* stored in the memory 304 and set (e.g., modify) the corresponding one of the flags 380*c* to preserve the video. The flags 380*c* may be set to preserve the video data 370 of the video files 350*a*-350*n* when the metadata 158 corresponds to the search result determined by the database 130 (e.g., a request for the video files 350*a*-350*n* may not be needed for preservation). By preserving the video data 370 of the video files 350*a*-350*n* in response to a match to a search query by the subscriber user, the system 50 may preserve the video data 370 of the video files 350*a*-350*n* in the event that the subscriber user later decides to request the video file. In some embodiments, the preserved video data 370 of the video files 350*a*-350*n* may not be requested and to prevent any unnecessary use of data (e.g., data usage limits imposed by internet and/or cellular communication providers) the signal VIDEO may not be uploaded until formally requested by the subscriber user. The video data 370 of the video files 350*a*-350*n* may be requested by the subscriber users using the app 114*a*.

In some embodiments, the flags 380*c* may be set to preserve corresponding video data 370 when an event has been determined to have occurred within a range of the capture devices 100*a*-100*n*. When an event has been determined to occur (e.g., a pre-scheduled notification to the system 50, a notification from police, a notification from news reporters, notifications from insurance investigators, etc.), the location and/or a time may be presented to the database 130 (e.g., similar to a search query from the subscriber users). In an example, when the event is pre-scheduled, the processor 302 may store the recorded video data 370 of the video files 350a-350n that correspond to the event with the flags 380c set to preserve. In another example, when the event is determined after the event has occurred, the database 130 may search the metadata 158 to determine the clips 180a-180n that match the event (e.g., a location, a time, a person of interest, a vehicle of interest, etc.). When the clips 180a-180n that match the event are found, the database 130 may find the video ID and/or the ID of the capture devices 100a-100n that potentially captured the event. A signal may be sent to the capture devices 100a-100n that potentially captured the event, and the flags 380c may be modified (e.g., set) for the video files 350a-350n that match the video IDs 380a of the request signal. The flags 380c may be set to preserve the video data 370 of the video files 350a-350n when the metadata 158 corresponds to the event, even if the video data 370 has not been requested. By preserving the video data 370 of the video files 350a-350n in response to a match of the event, the system 50 may preserve the video data 370 in case that the video files 350a-350n are requested later.

In some embodiments, the event may be conditions used for machine learning for autonomous driving (e.g., deep learning). For example, to provide training data for machine learning, particular situations, environments and/or circumstances may need to be analyzed. The processor 302 may be configured to identify particular situations, environments and/or circumstances. For example, if more training data is requested for blizzard (or flooding, or hail) conditions, the event may be when there is a blizzard (or flood, or hail) outside. In another example, if more training data is requested for identifying a type of animal, the event may be when an animal is detected. In yet another example, if more training data is requested for particular types of roadways, the event may be when pre-determined road conditions are detected. The conditions for an event may be varied according to the design criteria of a particular implementation.

When the flags 380c are modified to preserve the video data 370, the video data 370 of one or more of the video files 350a-350n may be preserved for a pre-determined amount of time. For example, when the flags 380c are implemented as a single bit, the single bit may represent the pre-determined amount of time (e.g., one week). In another example, when the flags 380c are implemented as multiple bits, the multiple bits may represent an amount of time to preserve the video (e.g., the bits may be encoded to represent time). Limiting the amount of time that the video data 370 may be preserved may ensure that memory space is available for recording new the video data 370 and the associated metadata 372 (e.g., if too many videos are preserved, new videos may not be recorded). Limiting the amount of time that the video data 370 may be preserved may prevent against malicious attacks and/or spam bots (e.g., prevent attacks that request all videos to prevent new data from being recorded).

In some embodiments, the pre-determined amount of time for preserving the video data 370 may be configured to comply with local legislation. For example, privacy laws may limit data retention. In some embodiments, the processor 302 may determine a location of the capture device 100 and adjust the length of time for preservation based on the legislation of the region. The pre-determined amount of time for preserving the video data 370 may be configured to be updated. For example, as legislation is adjusted, introduced and/or repealed and/or new court decisions are provided, the pre-determined amount of time may be updated to comply with the latest legislation. The pre-determined amount of time may be varied according to the design criteria of a particular implementation. In some embodiments, the video files 350a-350n (e.g., the video data 370 and/or the metadata 372) may be purged to comply with the law. In some embodiments, the video data 370 may have a default amount of time set to purge the data from the memory 304. The default amount of time to purge the data may be selected arbitrarily and/or based on the design criteria of a particular implementation.

In some embodiments, the system 50 may be implemented to aid in one or more of asset recovery (e.g., locating an asset with a large number of GPS data points from the metadata 158), roadway investigation (e.g., video evidence for post mortem analysis of roadway events), motor vehicle theft (e.g., real time location of stolen vehicles), locating a person of interest and/or providing roadway video for deep learning and autonomous driving training. In an example, when locating a person of interest, a person may be located based on a large number of GPS data points (e.g., the metadata 158) corresponding to the vehicle of the person of interest (e.g., often individuals are within one thousand feet of the vehicle the individual drives). In an example of providing roadway video, self-driving car developers train machine learning techniques (e.g., for deep learning) by collecting video and/or sensor streams of various scenarios and then annotate the streams (e.g., manually and/or automatically outlining and labeling various objects in each frame). In another example of providing roadway video data, an event recorded in the video files 350a-350n may comprise a particular road and/or weather type (e.g., the event may be defined as a hail storm that occurs within city boundaries, approaching a traffic signal during night, etc.). In some embodiments, the video analytics module 330 may have the ability to distinguish objects and the database 130 may be searched for video streams with particular characteristics (e.g., the hail storm). The hail storm may only last a few minutes, but assuming a large number of drivers are collecting data during the hail storm event, there may be a significant number of video streams available for download that match the criteria of a hail storm. The content of the video data 370 may be determined based on the information stored in the metadata 372, even if the video data 370 is no longer available.

In some embodiments, the video data 370 of the video files 350a-350n may not be stored long term. For example, the metadata 372 may provide a sufficient amount of detail for the metadata server 120 to re-create the scene that was captured in the video data 370. The metadata server 120 may use all the data sets 380a-380n in the metadata 372 in order to generate an animation that represents the content of the video data 370. Relying on the metadata 372 for providing an animation that represents the content of the video data 370 may reduce an amount of storage in the memory 304 since the metadata 372 may occupy less space than the video data 370. For example, the amount of data stored for the metadata 372 in order to re-create a scene similar to the content of the video data 370 may be less than the amount of data stored for the scene in the video data 370.

Figure 6:
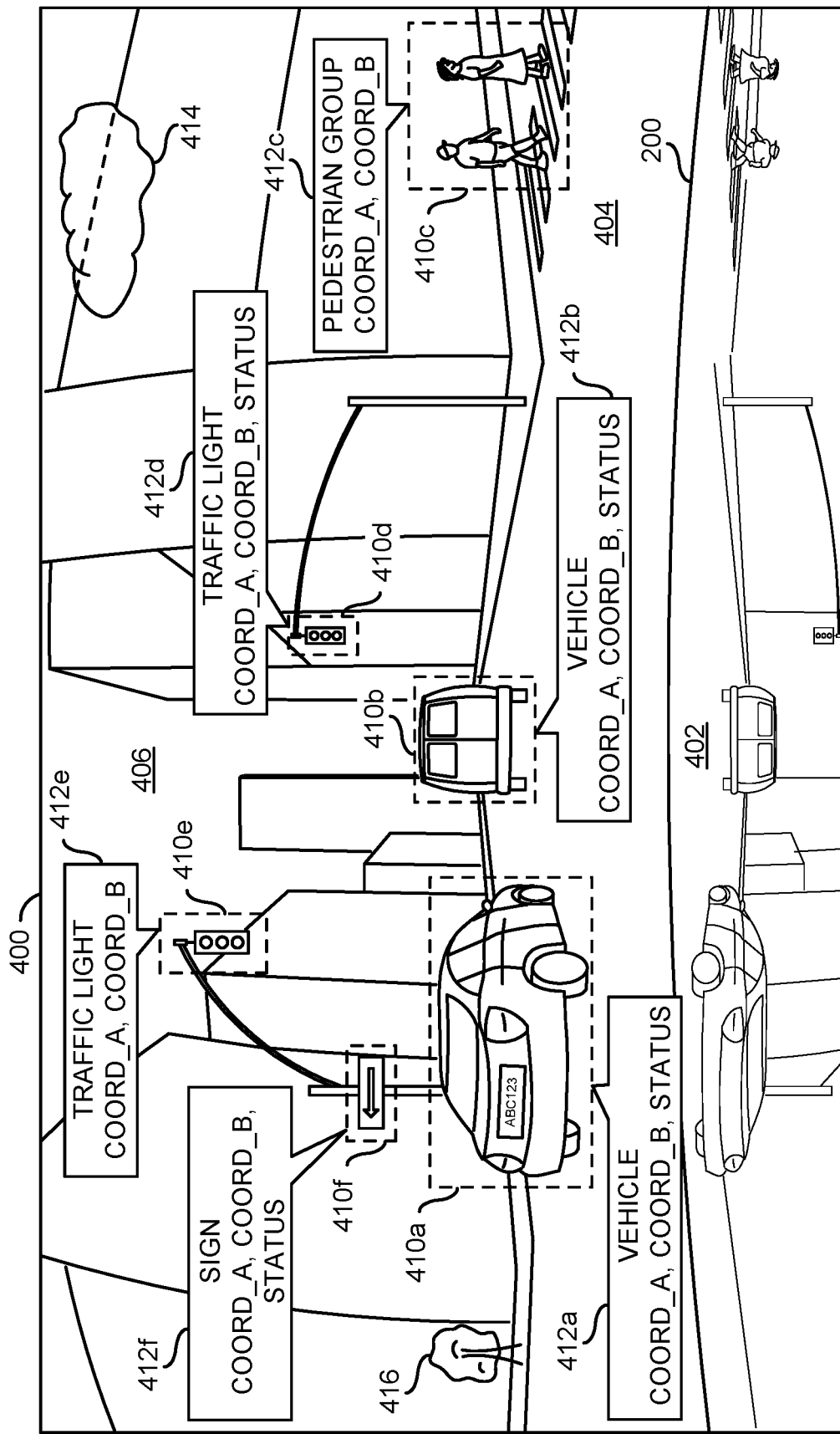
FIG. 6 is a diagram illustrating video analysis performed on an example video frame captured by the camera.

Referring to FIG. 6, a diagram illustrating video analysis performed on an example video frame captured by the camera is shown. An example video frame 400 is shown. The example video frame 400 may be an example of a video frame captured by one of the capture devices 100a-100n and/or stored as part of the video data 370. In the example shown, the video frame 400 may comprise a captured view of an urban area.

The vehicle 200 is shown in the example video frame 400. For example, one of the capture devices 100a-100n (e.g., 100a) may be a dash-mounted camera located within the vehicle 200 directed towards the windshield of the vehicle 200. The portion of the vehicle 200 shown may be a hood 402. Generally, the dashcam 100a may be mounted in a static position with respect to the vehicle 200. Since the location of the dashcam 100a may not move (or may have minimal movement) with respect to the vehicle 200, the hood 402 may be located in the same space of each captured video frame.

The example video frame 400 may comprise the hood 402, a middle section 404 and an upper section 406. The hood 402 may be located at a bottom edge of the video frame 400. Generally, the middle section 404 may comprise roadway. Generally, the upper section 406 may comprise the sky and buildings.

Various objects 410a-410f are shown in the example video frame 400. The various objects 410a-410f may be detected by the video analysis module 330. As an illustrative example, boxes are shown around the detected/recognized objects 410a-410f. In the example shown, the object 410a may be a vehicle, the object 410b may be a vehicle (e.g., a utility van), the object 410c may be a group of pedestrians, the objects 410d-410e may be stop lights, and the object 410f may be a road sign (e.g., a one-way sign). Other objects may be detected such as curbs, street markings, buildings, billboards, lampposts, sidewalks, lane markers, etc. The number and/or type of objects detected by the video analysis module 330 may be varied according to the design criteria of a particular implementation.

Status captions 412a-412f are shown. The status captions 412a-412f may be associated with the detected objects 410a-410f. The status captions 412a-412f may represent some of the information that the video analysis module 330 may tag for the detected objects 410a-410f. In the example shown, the status caption 412a may indicate that the object 410a has been identified as a vehicle, is located at a particular coordinate in the video frame 400 (e.g., an X coordinate, a Y coordinate location and depth/distance from the camera system 100) and/or status information about the detected object 410a may be stored (e.g., make/model of vehicle, whether the object is moving or stationary, color, size, license plate number, presence of decorations such as bumper stickers and/or truck nuts, etc.). In another example, for the detected object 410e, the object may be detected as a traffic light and the status may indicate that the light is green. In yet another example, for the detected object 410f, the object may be detected as a street sign and the status may indicate that the sign is a one-way street sign. Generally, the information in the status captions 412a-412f may correspond to the information stored in the metadata 158 (in the database 130) and the object data 380e (in the metadata 372 stored on the camera 100a).

In some embodiments, the location in the status captions 412a-412f may be a GPS location. In one example, the GPS location may be acquired by the location module 340. In another example, the GPS location may be acquired from the user device 112a (e.g., the smartphone 112a may comprise a GPS module and provide the location to the camera 100a and/or the smartphone 112a may add to the metadata before uploading). In yet another example, the GPS location may be received from an OBD device of the vehicle 200 capable of determining GPS coordinates (e.g., stored as the vehicle status information 380n and received by the signal CAN). In some embodiments, the camera 100a may be configured to determine more granular location coordinates based on the location of the camera 100a that captured the video frame 400 and using video analysis to determine distances to the detected objects 410a-410f as described in U.S. patent application Ser. No. 16/106,777, filed Aug. 21, 2018, appropriate portions of which are hereby incorporated by reference.

Generally, the status captions 412a-412f and/or the boxes shown around the detected objects 410a-410f may not appear in the example video frame 400 when stored as a recording (e.g., when the video data 370 is played back using a playback device). The boxes around the detected objects 410a-410f and/or the status captions 412a-412f may be illustrative examples indicating the types of objects detected by the video analysis module 330 and/or the type of information stored as the object data 380e in the metadata 372 that may be uploaded to the database 130 as the metadata 158. In some embodiments, for testing purposes (e.g., in a debug mode), the boxes around the objects 410a-410f and/or the status captions 412a-412f may be shown overlaid on the video frame 400.

An unimportant object 414 and a potentially important object 416 are shown. In the example shown, the unimportant object 414 may be a cloud and the potentially important object 416 may be a shrub. In the example shown, there may be one unimportant object 414 and one potentially important object 416. However, the number of unimportant objects 414 and/or potentially important objects 416 may be varied according to particular circumstances and/or the settings of the computer vision model implemented by the library module 334.

Generally, the unimportant object 414 may be a classification of one or more objects by the video analytics module 330. The unimportant object 414 may be an object determined by the processor 302 to be irrelevant to re-creating the scene in the video frame 400 (e.g., unimportant visual information). For example, if the video frame 400 corresponds to an event that may be later re-created using the system 50, the presence or absence of the unimportant object 414 may be irrelevant. In the example shown, where the unimportant object 414 is a cloud, an animation that illustrates the video data 370 in the video frame 400 may not be affected by the presence of the cloud. Generally, locations of vehicles, buildings, pedestrians, animals, signs, traffic lights, trees, road markings, etc. may be important in re-creating a scene. The unimportant object 414 may be a trivial detail. For example, the presence or absence of the unimportant object may not affect a driving behavior of the vehicle 200, the detected vehicles 410a-410b, the pedestrians 410c, etc. The types of objects determined to be the unimportant objects 414 may be determined according to the object detection libraries implemented by the detection libraries module 334. Which types of the objects are the unimportant objects 414 may be determined through machine learning and/or from input from experts (e.g., insurance investigators may provide input about which types of objects and/or obstacles are likely to contribute to a vehicle accident). In some embodiments, information about the unimportant objects 414 may not be included in the metadata 372. In some embodiments, information about the unimportant objects 414 may be used for general information (e.g., the metadata 372 may include information that the video data 370 corresponds to a cloudy day based on the unimportant cloud detected), but not necessarily record the location information about the unimportant objects 414. The types of the unimportant objects 414 may be varied according to the design criteria of a particular implementation.

The potentially important object 416 may be a classification of one or more objects by the video analytics module 330. The potentially important object 416 may be an object determined by the processor 302 to be irrelevant to re-creating the scene in the video frame 400 in some circumstances (e.g., the unimportant visual information) and relevant to re-creating the scene in the video frame 400 in other circumstances (e.g., desired visual information). Often times the potentially important object 416 may be a trivial object. In the example shown, the potentially important object 416 may be a shrub on the sidewalk. In some scenarios, the presence or absence of an object like a shrub may not affect an event (e.g., the shrub may not have significant value, the shrub may not cause damage to vehicles, the shrub may not provide insight as to why an event occurred, etc.). However, in some scenarios, the potentially important object 416 may be important and/or relevant. In an example, the shrub may be expensive flowers and may be part of the damages caused by a vehicle accident.

Whether the potentially important object 416 is used for re-creating the scene in the video data 370 (e.g., whether the information about the potentially important object 416 is included in the metadata 372) may be determined according to the computer vision model implemented by the detection libraries module 334. Each of the cameras 100a-100n may implement different video analytics libraries. Some of the cameras 100a-100n may be configured to ignore the potentially important object 416, while other of the cameras 100a-100n may be configured to extract the object data 380e about the potentially important object 416. In one example, a police vehicle implementing one of the cameras 100a-100n may perform the video analytics using a detection library that does not bother to detect landscaping details, but a homeowner may install one of the cameras 100a-100n (e.g., as a home security camera) that may perform the video analytics using a detection library that does detect the landscaping details. Since the metadata server 120 may store the metadata 158 received from multiple sources, the re-created scene may comprise the details about the potentially important object 416 if at least one of the cameras 100a-100n recorded the metadata 372 about the potentially important object 416. The potentially important objects 416 that are determined to be unimportant may be treated as the unimportant objects 414. Which of the potentially important objects 416 are determined to be relevant to scene re-creation and which of the potentially important objects 416 are determined to be irrelevant to scene re-creation may be varied according to the design criteria of a particular implementation.

In some embodiments, the cameras 100a-100n may be configured to generate automated incident reports. In one example, the video analytics module 330 may be configured to flag an event (e.g., a collision such as the collision between the vehicle 250a-250b as shown in association with FIG. 4). In another example, the driver may manually flag an event by providing an input to the camera 100a (e.g., by pressing a button on the camera 100a and/or using the smartphone 112a connected to the camera 100a). In yet another example, the sensor cluster 314 may comprise an accelerometer and/or gyroscope that may detect an abrupt speed and/or direction change that may be flagged. In response to flagging the event, the cameras 100a may preserve the video data 370 corresponding one of the video files 350a-350n (e.g., including a pre-determined amount of time before and after the event, such as 30 seconds before and 30 seconds after). The camera 100a (e.g., via the smartphone 112a) may communicate the video data 370 associated with the event and the metadata 372 (e.g., including the sensor data 380h from the vehicle 200 and/or the camera 100a) to the metadata server 120. In some embodiments, the metadata 372 alone may provide sufficient information to enable the metadata server 120 to generate an animation that may be used for the incident report.

In some embodiments, the metadata server 120 may overlay the metadata 158 on the video corresponding to the event. In some embodiments, the processor 302 may be configured to overlay the metadata on the video corresponding to the event before communicating the video file to the metadata server 120. The data overlay may be similar to the status captions 412a-412f. For example, the automated incident report may comprise the location and/or speed data as well as showing other vehicles and/or pedestrians that may have been involved (e.g., to indicate which party may have crossed illegally, signaled incorrectly and/or behaved improperly). The annotated data of the status captions 412a-412f may provide additional information to insurance investigators and/or police to see the status of the traffic light 410e, license plates and/or make/model of the vehicle 410a, determine an identity of the pedestrians 410c (e.g., potential witnesses), etc. In an example, the camera 100a may be configured to generate a file (e.g., a PDF file) as the incident report that may reside in the memory 304 (e.g., an expandable SD-type card slot) and/or be downloaded to the user device 112a) to enable the incident report to be communicated later when internet connectivity is available.

In the example shown, most of the objects 410a-410f may be located in the middle section 404 of the video frame 400. For example, the vehicle 410a, the vehicle 410b, the pedestrians 410c, the street light 410d and/or the sign 410f may be on, or slightly above the roadway in the middle section 404. Two objects (e.g., the traffic light 412e and the cloud 414) may be located in the upper section 406. No objects may be detected in the portion of the video frame 400 corresponding to the hood 402. In the example shown, the hood 402 may comprise reflections (e.g., of the objects 410a-410c). If the video analysis module 330 interprets the reflections on the hood 402 as objects, the results of the object detection and/or the associated metadata may be incorrect and/or misleading.

The video analysis module 330 may be configured to perform hood detection. For example, one of the library modules for object detection may be configured to detect where the hood 402 is located in the video frame 400. The video analysis module 330 may dynamically determine the location of the hood 402 in video frames in the input buffer 332 based on hood detection. For example, the cameras 100a-100n may be installed by the consumer and the field of view captured by each camera 100a-100n may be slightly different based on the installation. A varying amount of hood and sky may be present in the field of view of the cameras 100a-100n for each installation.

In some embodiments, the hood detection may be performed by the video analytics module 330 (e.g., on-camera). In some embodiments, the hood detection may be performed through cloud (or distributed) processing. For example, after the camera 100a is installed, a series of photos (e.g., video frames) may be captured and transferred to the cloud processing service. The video frames may be analyzed on the cloud server side to detect where the view of the hood starts in the video frame. Generally, the field of view does not change after installation. In one example, a still image may be captured and sent periodically to audit if the field of view has changed (e.g., and the location of the hood 402).

In some embodiments, general statistics may be collected from each of the cameras 100a-100n in the system 50 and/or by the processor 302. The statistics may be analyzed to learn and/or understand how many license plates and/or other objects are typically collected for each time period and general location. For example, if the number of objects detected dramatically falls, then the cameras 100a-100n may generate an alert along with a still image or video file information for an automated (e.g., hood detection) and/or manual analysis. For example, the alert may be used to determine if one or more of the cameras 100a-100n have been damaged or has become dislodged so that the field of view is no longer aligned to position the location of the hood 402 to a particular area of the frame buffer 332.

Metadata extraction from video generated from one of the dash cameras 100a-100n may take advantage of inherent characteristics of the scene to limit the amount of spatial data used from the input video frame 400 as input to the input frame buffer 332 used for video analytics. By limiting the amount of spatial data input to the working buffer 332 the inherently limited system resources of the real time system may be allocated more efficiently.

A typical scene captured from the dash cameras 100a-100n may have about 15% to 25% hood surface captured as well as 15% to 25% sky. The hood 402 is typically unimportant for the collection of roadway data. The reflections off the hood surface 402 may further complicate any analysis that is using the bottom of the video frame 400 to look for relevant objects. The sky region may have decreasing importance for roadway data as the top of the video frame 400 is reached. Details of the detection libraries for the video analytics module and/or hood detection may be described in association with U.S. patent application Ser. No. 16/156,254, filed on Oct. 10, 2018 and U.S. patent application Ser. No. 17/568,746, filed on Jan. 5, 2022, appropriate portions of which are incorporated by reference.

Figure 7:
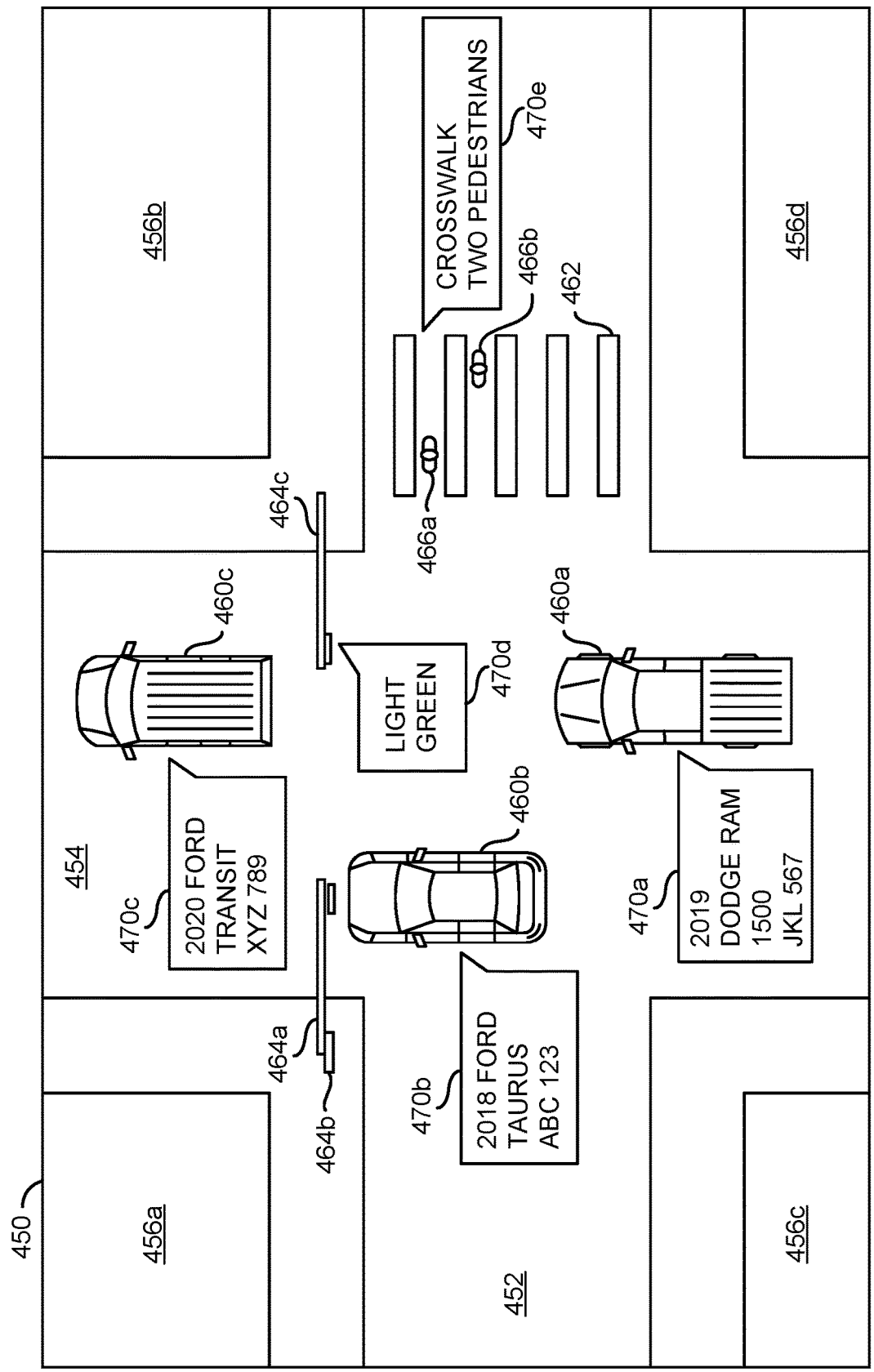
FIG. 7 is a diagram illustrating an example animation generated in response to a scene re-creation based on metadata.

Referring to FIG. 7, a diagram illustrating an example animation generated in response to a scene re-creation based on metadata is shown. A re-created scene 450 is shown. The re-created scene 450 may be a still image of an animation created by the metadata server 120. The re-created scene 450 may be generated in response to the metadata 158 stored in the database 130. The metadata 158 may be stored in the database 130 in response to the cameras 100a-100n uploading the metadata 372 associated with the video files 350a-350n via the signal META.

In the example shown, the re-created scene 450 may comprise an overhead view. The overhead view in the re-created scene 450 may be re-created from the metadata associated with the video frame 400 shown in association with FIG. 6. Using only the metadata 158 (e.g., without any of the video data 370), the metadata server 120 may generate an animation of the re-created scene 450 that may provide information similar to the visual data in the video frame 400. Since the metadata 158 stored in the database 130 is not video data, the re-created scene 450 may provide an alternate perspective than the source video frame 400 or the same perspective as the source video frame 400. In the example shown, metadata server 120 may have created the overhead view in the re-created scene 450 from the first-person perspective of the video frame 400. In some embodiments, the re-created scene 450 may be generated in response to the metadata 372 generated in response to the video data 370 captured by the multiple camera systems 100a-100d (e.g., the trawl mode that captures the video data 370 all around the vehicle 200, as shown in association with FIG. 3). Generally, the re-created scene 450 may be generated based on the information in the metadata 158, regardless of the perspective of the cameras that captured the video data 370 that was used to generate the metadata 372.

The cameras 100a-100n may be configured to recognize the various objects of interest and convert the information about the objects detected into the metadata 372. For example, the metadata 372 may comprise the absolute location data 380g that may be calculated based on the known sizes of license plates, characteristics of the vehicles detected (e.g., a 2010 Ford F150 tailgate may have a known size), etc. The metadata 372 may be communicated to the metadata server 120 as the signal META and stored as the metadata 158. The metadata server 120 may generate the re-created scene 450 and/or a sequence of scenes (e.g., an animation) in response to the metadata 158 received over time.

The re-created scene 450 may comprise a road 452 and a road 454 that may form an intersection and buildings 456a-456d. The roads 452-454 and/or the buildings 456a-456d may be generated based on the roadway in the middle section 404 of the video frame 400. Information about the roads 452-454 and/or the buildings 456a-456d may be part of the metadata 372 generated by the cameras 100a-100n. In some embodiments, the metadata server 120 may retrieve roadway and/or structure information based on a third-party mapping service (e.g., Google Maps, a GPS/GNSS service, etc. may provide location information about the locations of roads and buildings).

The re-created scene 450 may comprise re-created vehicles 460a-460c, re-created road markings 462, re-created traffic signals 464a-464c and/or re-created pedestrians 466a-466b. The re-created vehicles 460a-460c may be generated from the vehicle 200 and/or the objects 410a-410b in the video frame 400. The re-created road markings 462 may be detected on the roadway in the video frame 400. The re-created traffic signal 464a may correspond to the detected traffic light 410e, the re-created traffic signal 464b may correspond to the detected street sign 410f and the re-created traffic signal 464b may correspond to the detected traffic light 410d in the video frame 400. The re-created pedestrians 466a-466b may be re-created from the pedestrian group 410c detected in the video frame 400.

The various re-created objects (e.g., the vehicles 460a-460c, the road markings 462, the traffic signals 464b and/or the pedestrians 466a-466b, etc.) may be generated in response to the metadata 372 captured. For example, the re-created objects may be placed in the re-created scene 450 based on the information in the status captions 412a-412f (which corresponds to the metadata information 380a-380n), which may define the various characteristics of the re-created objects. The re-created scene 450 may exclude the unimportant objects 414 and/or any of the potentially important objects 416 that were determined not to be important. In the example re-created scene 450, the cloud (e.g., the unimportant object 414) and the shrub (e.g., the potentially important object 416) have not been re-created.

Captions 470a-470e are shown. The captions 470a-470e may provide an illustrative example of details that may be shown for the re-created objects in the re-created scene 450. In the example shown, the caption 470a may indicate that the re-created vehicle 460a (e.g., the vehicle 200) may be a 2019 Dodge Ram 1500 with license plate JKL 567, the caption 470b may indicate that the re-created vehicle 460b (e.g., the vehicle 410a) may be a 2018 Ford Taurus with license plate ABC 123, the caption 470c may indicate that the re-created vehicle 460c (e.g., the vehicle 410b) may be a 2020 Ford Transit with license plate XYZ 789, the caption 470c may indicate that the re-created traffic signal 464c (e.g., the traffic light 410d) may have been a green light at the time of capture of the video frame 400, and the caption 470e may indicate that the re-created pedestrians 466a-466b (e.g., the pedestrian group 410c) may be two pedestrians crossing the road 452 at a crosswalk. The captions 470a-470e may be configured to provide the details about the objects detected and stored in the metadata 372 at the time that the video data 370 was captured.

In some embodiments, the re-created scene 450 may display the re-created objects with the details in the captions 470a-470e. For example, the re-created vehicle 460a may appear in the animation as the 2019 Dodge Ram 1500 (e.g., the re-created vehicle 460a may look similar to the 2019 Dodge Ram 1500). In some embodiments, the re-created scene 450 may comprise generic blocks representing the re-created objects (e.g., a wireframe view, generic polygon models, etc.). For example, the information in the captions 470a-470e may be displayed as a pop up caption when a user hovers over the various objects with a mouse cursor. In some embodiments, the captions 470a-470e may be displayed as a separate window with only a text presentation of the data (e.g., so the captions 470a-470e do not cover the re-created scene 450).

The placement of the re-created objects (e.g., the re-created vehicles 460a-460c, the re-created road markings 462, the re-created traffic signals 464a-464c, the re-created pedestrians 466a-466b) may be determined based on the absolute location data 380g in the metadata 372. The captions 470a-470e may comprise all of the metadata 372 (e.g., the object data 380e, the sensor data 380h, the vehicle status information 380n, etc.). The re-created scene 450 may further comprise other information about the environment (e.g., weather information such as 'party cloud'). In some embodiments, the unimportant objects 414 and/or the potentially important objects 416 may be analyzed to provide general details (e.g., the clouds and shrubs may not be important to show in the re-created scene 450 but may be used for a general description such as, "cloudy, heavily landscaped region"). Various details of the re-created object may be enhanced based on known data about the objects (e.g., details of the roadway may be identified based on third-party map information, a size of street signs may be based on known attributes of street signs, road markings may be determined based on regional practices for marking roads, etc.).

A combination of the timestamp data 380b and the absolute location data 380g in the metadata 372 extracted by the video analytics module 330 may enable the absolute locations of each of the re-created objects to be determined from moment to moment. In the example shown, the re-created scene 450 may be one still image. However, using the absolute locations of the detected objects over time, the re-created scene 450 may comprise an animation that follows the absolute locations at each timestamp. In an example, a user viewing the re-created scene 450 may play, pause, fast forward and/or rewind the re-created scene 450 similar to viewing video data. The playback of the animation of the re-created scene 450 may update the absolute locations of the re-created objects based on the timestamp data 380b (e.g., the absolute locations data 380g and/or the other metadata 372 may be updated at each timestamp, and each timestamp may be similar to a video frame when playing back video data). For example, playing back the animation of the re-created scene 450 "frame-by-frame" may update the re-created scene at each available timestamp from the metadata 372. Playing back the re-created scene 450 timestamp by timestamp (e.g., using the metadata received over time) may provide the animation.

The re-created objects in the re-created scene 450 may be implemented as 3D rendered geometry. The object dimensions and/or characteristics of the detected objects may be well defined in order to accurately represent the detected objects as 3D rendered geometry to provide a visualization similar to the captured video 370. Many objects viewed on and/or from the roadway have a standardized shape, form, geometry, etc. In an example, a California license plate may have a specific size (e.g., with letters of a given font and size). The license plate may have an approximate location on a vehicle that has a finite subset of makes, models, years, and colors. In an example, the video analytics module 330 may identify, with a high amount of accuracy, a red 2020 Ford Explorer LX with California license plate 7FVV019. Since the geometry particular to the detected vehicle may be known, along with the license plate size and/or location, a precise relative location from the camera system 100 may be derived. Using the onboard GPS system 340, the absolute location 380g of the detected vehicle in the video data 370 may also be derived. The metadata server 120 may generate the re-created object as a 3D rendered object in the re-created scene based on the known data about the particular vehicle (e.g., the dimensions of the object based on the specifications of the make/model/year of the vehicle).

Since the re-created scene 450 may comprise 3D rendered geometry, the re-created scene 450 may be viewed from various perspectives. In an example, a user may view the re-created scene 450 and zoom and pan around the re-created scene (e.g., similar to a free-floating camera that may be moved around to provide a desired perspective of the re-created scene 450). In one example, if the vehicle 200a that implements the camera system 100a that provided the metadata 372 for the re-created scene 450 is following directly behind the Ford Taurus vehicle 410a (e.g., the re-created vehicle 460b), then the video data 370 may capture a perspective from the camera system 100a with only the back side of the vehicle 410a visible. However, in the re-created scene 450, the user may be able to zoom and pan around to view the front of the re-created vehicle 460b and see an alternate perspective. For example, the re-created vehicle 460b may comprise more details in the re-created scene than would be available in the video data 370 alone.

The re-created scene 450 may comprise the 3D rendered geometry corresponding to the detected objects. However, since one of the camera systems 100a-100n may not capture all the details of a vehicle (e.g., if the 2018 Ford Taurus is only captured from behind), the metadata server 120 may be configured to interpolate one or more details of the object when creating the 3D rendered geometry. For example, the color and/or the factory details of the front of the vehicle may be interpolated (e.g., estimated based on known data about an object). However, the captured vehicle may have specific and/or unique details (e.g., scratches, dents, bumper stickers, etc.) on the front that may not be part of the known object data. In some embodiments, the interpolated details may be displayed with placeholder information (e.g., the re-created scene 450 may draw interpolated portions of the detected objects with hatched and/or diagonal lines instead of solid colors of the unknown details). The placeholder information may provide a visual communication to a user that particular details may be interpolated. In some embodiments, the metadata 372 uploaded by other of the camera systems 100a-100n may be used to fill in the information.

For example, multiple of the camera systems 100a-100n may each provide different perspectives of the same scene at the same timestamp and the metadata server 120 may fill in details for the re-created objects by aggregating the object data 380e from multiple sources (e.g., the vehicle 200a implementing the camera system 100a may capture details about the re-created object 460b from the rear while the vehicle 200b implementing the camera system 100b may capture details about the re-created object 460b from the front at the same time).

In some embodiments, the camera system 100a may track the same objects over time to continually fill in details about the detected objects. In an example, a license plate number may be partially obscured by a trailer hitch at one timestamp, but at a later timestamp, the vehicle 200 may have moved to enable the camera system 100a to capture a perspective that shows the previously obscured license plate number. By tracking the objects over time, the video analytics module 330 may fill in details that may be missing at one timestamp with the details captured at another timestamp (e.g., the details may be accumulated over time). In another example, the camera system 100a may provide the video data 370 of the vehicle 200b from behind (e.g., would not provide details about a bumper sticker on the front of the vehicle and a cracked windshield). Eventually the camera system 100a may pass the vehicle 200b and capture the bumper sticker and cracked windshield. The camera system 100a may extract the metadata 372 from the view of the front of the vehicle 200b to fill in the details about the bumper sticker and cracked windshield in the object data 380e. A level of confidence may be associated with details tracked over time (e.g., an indication of certainty about whether the details belong to the same object or a different object). The visual placeholder for interpolation may be adjusted based on the level of confidence (e.g., yellow hatched lines for a medium level of confidence and red hatched lines for a low level of confidence). The level of confidence may decrease the greater the time difference between the captured data (e.g., a higher confidence level for the captured data that is a few seconds or minutes apart and a lower level of confidence for the captured data that is a day or a week apart).

Figure 8:
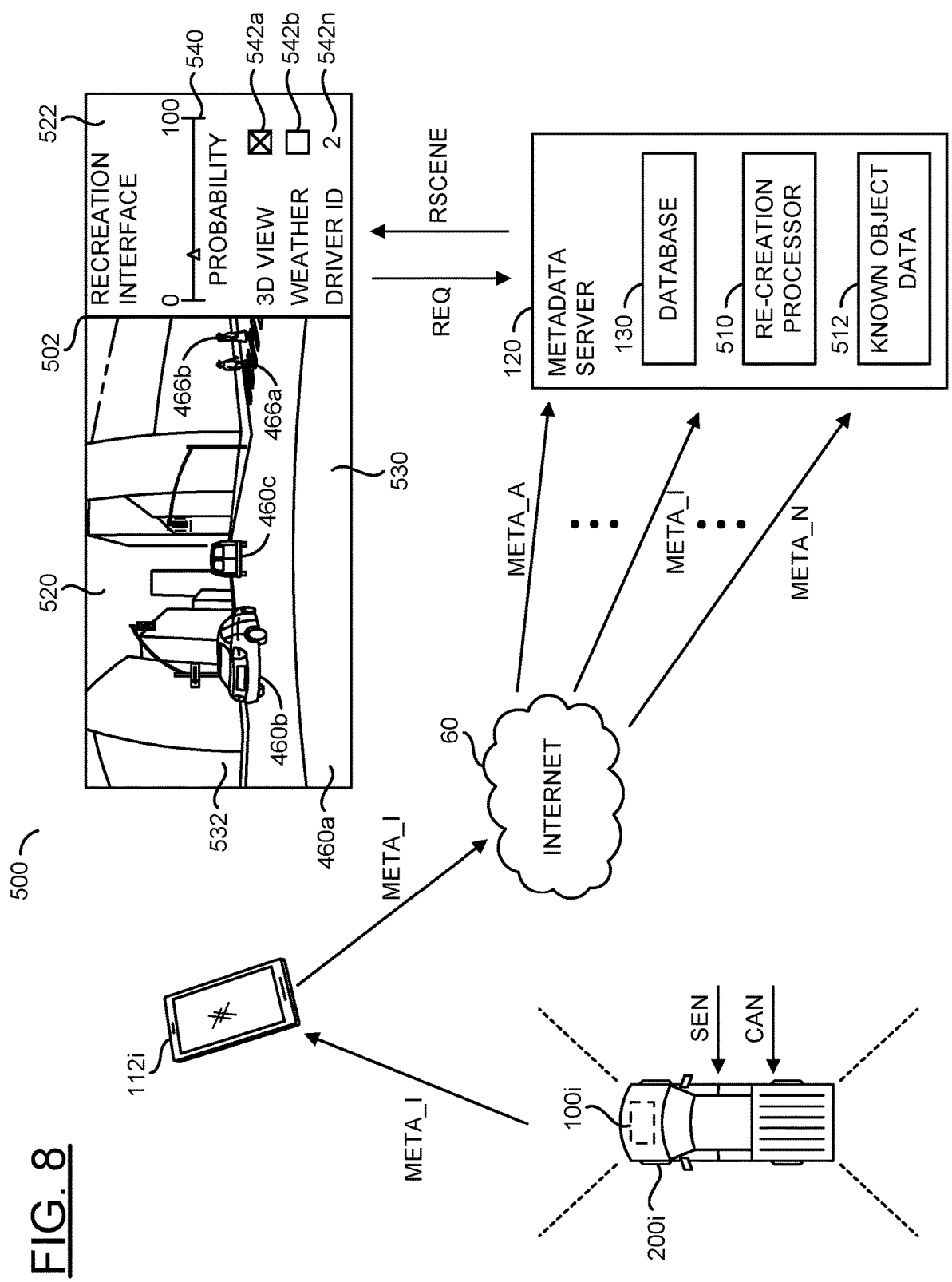
FIG. 8 is a diagram illustrating a scene re-creation interface generated in response to data provided by a scene re-creation database.

Referring to FIG. 8, a diagram illustrating a scene re-creation interface generated in response to data provided by a scene re-creation database is shown. A communications dataflow 500 is shown. The communications dataflow 500 may comprise the network 60, the user device 112i, the metadata server 120, the vehicle 200i implementing the camera system 100i and a re-creation interface 502. The communications dataflow 500 may comprise other devices and/or nodes (not shown). In an example, more than one of the camera systems 100a-100n and/or more than one of the users devices 112a-112n may be implemented. The number, type and/or arrangement of the devices and/or nodes in the communications dataflow 500 may be varied according to the design criteria of a particular implementation.

The camera system 100i is shown capturing the video data 370 of the environment near the vehicle 200i. In the example shown, the camera system 100i may capture multiple views around the vehicle 200i. In one example, the camera system 100i may comprise a 360 degree camera configured to generate an all-around view (e.g., capture video data in all directions around the vehicle 200i). In another example, the camera system 100i may comprise multiple cameras that may each capture a different direction around the vehicle 200i. The camera system 100i is shown receiving a signal (e.g., SEN) and the signal CAM. The signal SEN may be the sensor data generated by the sensor cluster 314. The signal SEN and the signal CAN are shown for illustrative purposes. Generally, the signal CAN and the signal SEN may be internal to the vehicle 200i and/or the circuit 102i.

The camera system 100i may generate the metadata 372 and communicate the metadata 372 via the signal META_I. Since the amount of data in the signal META_I may be small (e.g., small compared to communicating the video data 370), the signal META_I may be communicated to the user device 112i. In an example, the signal META_I may be transmitted via Bluetooth (or another short-range, low-power communications protocol). In the example shown, the user device 112i may be a smartphone. The smartphone 112i may forward the signal META_I to the network 60. The smartphone 112i may communicate with the network 60 via a higher power communications protocol than the communications protocol between the camera system 100i and the user device 112i. In an example, the camera system 100i may be implemented without Wi-Fi to keep costs low for the camera system 100i, and the user device 112i may use Wi-Fi to communicate with the network 60.

The metadata server 120 may receive the metadata signal META_I generated by the camera system 100i via the network 60. The metadata server 120 may receive the metadata 372 from each of the metadata signals META_A-META_N. For example, each of the camera systems 100a-100n implemented in the vehicles 200a-200n (not shown) may independently generate the metadata 372. The metadata 372 from the camera systems 100a-100n may provide different perspectives of a same location and time and/or metadata corresponding to the video data 370 captured at different times and/or different locations. The signals META_A-META_N may be generated by the camera systems 100a-100n, respectively. The metadata server 120 may store the metadata 372 generated by each of the camera systems 100a-100n in the database 130 as the metadata 158 (as shown in association with FIG. 2).

The metadata server 120 may comprise the database 130, a block (or circuit) 510 and/or a block (or circuit) 512. The circuit 510 may implement a re-creation processor. The circuit 512 may implement known object data. The metadata server 120 may comprise other components (not shown). In an example, the metadata server 120 may comprise memory, communication devices, hardware acceleration processors (GPUs), etc. that may be used in combination with the re-creation processor 510. The number, type and/or arrangement of the components of the metadata server 120 may be varied according to the design criteria of a particular implementation.

The re-creation processor 510 may be configured to re-create various scenes from the metadata 158 without using the video data 370. In an example, the database 130 may only store the metadata 158 and the re-creation processor 510 may only have access to the metadata 158. In an example, the re-creation processor 510 may generate the re-created scene 450 shown in association with FIG. 7.

The re-creation processor 510 may be configured to generate the 3D geometric rendering of a re-created scene and/or an animation (or generate data that may be usable by another device to create the 3D geometric rendering). The re-creation processor 510 may interpret the information in the metadata 158 in order to re-create a scene for particular timestamps at a particular location. In some embodiments, the re-creation processor 510 may re-create a scene in response to the metadata 372 from one of the camera systems 100a-100n. For example, the re-creation processor 510 may generate one re-created scene from the metadata 372 communicated by the camera system 100a in the signal META_A, another re-created scene from the metadata 372 communicated by the camera system 100b in the signal META_B, another re-created scene from the metadata 372 communicated by the camera system 100c in the signal META_C, etc.

In some embodiments, the re-creation processor 510 may be configured to aggregate all the metadata 158 to generate the re-created scenes based on multiple sources of metadata. For example, each re-created scene may correspond to a particular location at a particular time. The timestamp data 380b and the absolute location data 380g may be used to determine which of the metadata clips 180a-180n are applicable to a particular time and location. By aggregating the metadata clips 180a-180n from multiple sources, the re-creation processor 510 may fill out all of the available details in the re-created scene. For example, one of the camera systems 100a may only capture a partial view of a scene, but by using the metadata from the camera system 100b, the re-creation processor 510 may fill in any blanks (or gaps) in information using a different partial view of the same scene. Generally, the more metadata from different of the camera systems 100a-100n available to the re-creation processor 510, the more detailed the re-created scene generated by the re-creation processor 510 may be. For example, the re-creation processor 510 may be configured to generate a re-created scene comprising animation details received from the metadata 372 from multiple of the camera systems 100a-100n that would not be visible from a single perspective (or viewpoint) of one of the camera systems 100a-100n alone.

The re-creation processor 510 may generate a signal (e.g., RSCENE). The signal RSCENE may comprise the re-created scene generated in response to the metadata signals META_A-META_N. The metadata server 120 may communicate the signal RSCENE to an end user. The end user may interact with the re-creation interface 502 (e.g., displayed on a desktop computer, a laptop computer, a smartphone, etc.). The re-creation processor 510 may generate the signal RSCENE in response to a signal (e.g., REQ). The signal REQ may be a request sent from the end user using the re-creation interface 502. For example, the signal REQ may comprise a time and/or an absolute location and the re-creation processor 510 may generate the signal RSCENE in response to the metadata 158 that corresponds to the absolute location and/or time in the signal REQ.

The known object data 512 may be configured to store known information about various types of objects. The known object data 512 may provide data for the re-creation processor 510 to create the 3D rendered geometry of the objects in the metadata 158. The known object data 512 may comprise information about sizes, shapes and/or other features of various objects that may be detected. In an example, the known object data 512 may store information about a size and shape of various makes, models and years of vehicles. For example, when the metadata 158 indicates that a 2018 Ford Taurus is located at a particular absolute location, the known object data 512 may provide information about a width and length of the 2018 Ford Taurus to enable the re-creation processor 510 to generate the 3D rendered geometry that provides a model of the 2018 Ford Taurus in the re-created scene 450. For example, the video data 370 may capture a rear end of the 2018 Ford Taurus and the video analytics module 330 may determine that the 2018 Ford Taurus is located at a particular absolute location without having a visual captured of the front end of the 2018 Ford Taurus (or being able to provide details about the length and width of the detected vehicle). The known object data 512 may be used to fill in the details (e.g., unavailable metadata such as missing measurement data) that is not present in the metadata 158 based on the stored parameters about the known objects.

The known object data 512 may comprise generic information about the known objects. For example, the known object data 512 may enable the 3D rendered geometry generated by the re-creation processor 510 to appear the same for every 2018 Ford Taurus (or possibly with different colors) in the re-created scene. Details in the metadata 158 may override the generic information in the known objects data 512. For example, the metadata 158 may indicate the red, 2018 Ford Taurus is at a particular location, and the re-creation processor 510 may use the generic information about the 2018 Ford Taurus to render a 3D model version of a generic red, Ford Taurus in the re-created scene. The metadata 158 may further indicate that the detected vehicle has a scratch on the passenger side and a bumper sticker. The details about the scratch and the bumper sticker may be unique to the particular vehicle detected by the video analytics module 330. The re-creation processor 510 may add the unique scratch and bumper sticker to the generic model of the 2018 Ford Taurus from the known object data 512 based on the information in the metadata 158 for the one particular vehicle (e.g., another detected Ford Taurus may use the generic information from the known object data 512).

In some embodiments, the known object data 512 may be provided by a third-party service. In an example, each vehicle manufacturer may provide specifications about the models of vehicles that are produced. In another example, the known object data 512 may be crowd-sourced (e.g., volunteers may provide information about various models of vehicles). The known object data 512 may comprise information about traffic signs, traffic signals, map data (e.g., the locations of roads and intersections), etc. The data stored in the known object data 512 may be similar to information stored in the object data 352. The type of data and/or amount of data stored in the known object data 512 may be varied according to the design criteria of a particular implementation.

The re-creation interface 502 may be generated in response to the signal RSCENE. In one example, a computing device (e.g., a desktop computer, a laptop computer, a smartphone, etc.) may be configured to generate the re-creation interface 502 and/or receive input from an end user that interacts with the re-creation interface 502. In one example, the re-creation interface 502 may be implemented using one of the subscriber devices 110a-110n. In another example, the re-creation interface may be implemented using one of the communication devices 112a-112n. The re-creation interface 502 may be stored in computer readable instructions and a processor of the computing device may be configured to execute the computer readable instructions to display the re-creation interface 502. The signal RSCENE may provide data that may be used by the re-creation interface 502 in order to determine what information to display on the re-creation interface 502. For example, the app 114a executed by the subscriber devices 110a-110n may be the re-creation interface 502. In some embodiments, the subscriber devices 110a-110n may be configured to generate the signal REQ and then receive the computer readable instructions in the signal RSCENE and the local processing components (e.g., a CPU and/or GPU) of the subscriber devices 110a-110n may generate the 3D geometry and/or render textures to apply to the 3D geometry in order to generate a re-created scene and/or animation. The types of computing devices used to implement the re-creation interface 502 may be varied according to the design criteria of a particular implementation.

The re-creation interface 502 may comprise an animation 520 and/or a data input section 522. The animation 520 may comprise 3D rendered geometry of a particular scene. The 3D rendered geometry of the animation 520 may be generated from the metadata 158 provided in the signal RSCENE and the settings selected in the data input section 522. The data input section 522 may comprise various data input fields. The data input fields in the data input section 522 may enable the end user to adjust settings that may be used to modify the 3D rendered geometry in the animation 520. For example, signal RSCENE may comprise dynamic parameters and the data input fields of the data input section 522 may select particular values for the dynamic parameters.

In the example shown, the animation 520 may comprise a rendering of 3D geometry that corresponds to the video frame 400 shown in association with FIG. 6. The animation 520 may comprise the 3D geometry rendering of the scene in the video frame 400, but may not comprise the captured pixel data from the video frame 400. For example, the animation 520 may appear similar to the video frame 400, but may not be the video frame 400.

In the example shown, the animation 520 may be a 3D view of the re-created scene 450 shown in association with FIG. 7. The re-created scene 450 may provide a top-down view, while the animation 520 may provide a 3D view from the perspective of one of the camera systems 100a-100n implemented in the vehicle 200. While the 3D view shown in the animation 520 may be from the perspective of the vehicle 200, other 3D views may be selected. In an example, the re-creation interface 502 may enable the user to interact with the animation 520 (e.g., click and drag, swipe, pinch and zoom, scroll a mousewheel, use a joystick/gamepad, etc.) in order to adjust the perspective of the animation 520. For example, interacting with the interface 502 may be similar to moving a free floating 'camera' in a 3D environment. In some embodiments, the free floating camera and/or the 3D environment may be rendered using a 3D graphics engine (e.g., pre-visualization software) and/or a video game rendering engine. In one example, the 3D perspective may be selected from the perspective of another vehicle that captured metadata of the same location and at the same time. In another example, the 3D perspective may be from a user-selected location and angle. For example, the end-user may freely move the 3D perspective to any desired location and/or angle.

The 3D perspective shown in the animation 520 may be similar to, but not necessarily an exact re-creation of the video frame 400. In the example shown, the re-created vehicles 460a-460c, re-created road markings 462, re-created traffic signals 464a-464c and/or re-created pedestrians 466a-466b may be shown. The re-created vehicles 460a-460c may not comprise every detail that may be captured in the video data of the video frame 400. For example, dents, scratches, dirt, reflections, etc. may not be visible in the animation 520. The details that are shown or not shown may depend upon the data recorded in the metadata 158 and/or the settings selected in the data input section 522.

In the example shown, a blank spot 530 is shown on the re-created vehicle 460a. The reflections shown in the video frame 400 may have been determined by the video analytics module 330 to not be a detail of interest. For example, the reflections on the vehicle 200 may not have been stored in the object data 380e for the metadata 372 that corresponded to the video frame 400 and may not have been stored in the database 130 as the metadata 158, resulting in the blank spot 530. In the example shown, a blank spot 532 is shown on the animation 520 at a location that corresponds to the shrub 416 in the video frame 400. The shrub 416 may have been determined by the video analytics module 330 to not be a detail of interest (e.g., not stored in the metadata 158). Without details about the shrub 416, the animation 520 may display the blank spot 532 instead of a 3D rendering of the shrub 416.

The data input section 522 may comprise a confidence level selector 540 and/or variable settings 542a-542n. In the example shown, the confidence level selector 540 may be implemented as a slider for selecting a probability from 0 to 100%. In the example shown, the variable settings 542a-542n may comprise selection boxes configured to enable the end-user to toggle particular settings on/off. In some embodiments, the variable settings 542a-542n may be selected using drop-down menus, radio button, text input, sliders, color selectors, etc. The type, arrangement and/or method of interacting with the confidence level selector 540 and/or the variable settings 542a-542n may be varied according to the design criteria of a particular implementation.

The confidence level selector 540 may be configured to adjust the details of the various objects shown in the animation 520. For example, each of the objects stored in the metadata 158 may comprise characteristics and each of the characteristics may have a confidence level value. The confidence level value may indicate a probability (e.g., determined by the video analytics module 330 and the re-creation processor 510) that the particular characteristic has been detected accurately. For example, a color of a vehicle may be detected with a high level of confidence (e.g., near certainty), while small text on a bumper sticker may be detected with a lower level of confidence. The particular details of the confidence level may be described in association with FIG. 10.

The confidence level selector 540 may enable selecting a minimum threshold value for the confidence level for rendering a particular detail in the animation 520. Setting the confidence level selector 540 to a lower probability value may enable more details to be displayed (e.g., high confidence objects and low confidence objects may be displayed), but may risk displaying inaccurate details. Setting the confidence level selector 540 to a higher probability value may result in fewer details being displayed and/or more generic interpolated information being displayed (e.g., data from the known object data 512), but may be less likely to present potentially inaccurate information. In one example, the shrub 416 may have been detected by the video analytics module 330 and stored as part of the metadata 158 but with a low confidence value. In one example, with the probability value set higher on the confidence level selector 540 than the confidence level in the metadata 158 for the shrub 416, the blank spot 532 may be displayed instead of the shrub 416. In another example, with the probability value set lower on the confidence level selector 540 than the confidence level in the metadata 158 for the shrub 416, the 3D geometric rendering of the shrub 416 may be displayed in the animation 520 instead of the blank spot 532.

The variable setting 542a may comprise a 3D view toggle. For example, the 3D view toggle for the variable setting 542a may enable the end-user to select between the 3D perspective view shown in the animation 520 and the top-down view shown in the re-created scene 450.

The variable setting 542b may comprise a weather effects toggle. The weather effects selected by the variable setting 542b may enable the animation 520 to display detected weather effects. For example, the metadata 158 may indicate that the weather at the time the video frame 400 was captured was rainy, foggy, sunny, etc. Enabling the weather effects may provide an estimate of what visibility conditions may have been like (e.g., for an accident re-creation). The weather effects may be turned off to provide a clear sky view. The weather effects may be a modeled approximation of what the visibility may have been like, but may be unlikely to provide an exact re-creation of the actual visibility at the time. In an example, heavy fog or rain may be added or removed from the scene in order to provide a rendering of the scene clearly with no weather distorting the view or provide a rendering of the scene similar to the real-world situation captured (e.g., with weather obscuring some detail).

The variable setting 542n may comprise a driver ID value. The driver ID value in the variable setting 542n may enable the end-user to select which vehicle (e.g., one of the camera systems 100a-100n) to provide the 3D perspective from. Changing the driver ID value may enable the end-user to switch to the 3D perspective from a viewpoint of another vehicle (e.g., provide the 3D view from the perspective of the vehicle object 410a, provide a 3D view from the perspective of a vehicle that does not have one of the camera systems 100a-100n installed, etc.).

Other variable settings 542a-542n may be implemented. In an example, the camera location, angle and/or rotation may be set using the variable settings 542a-542n. In another example, the time of day and/or date of the metadata 158 to use for the animation 520 may be selected using the variable settings 542a-542n. The options available for the variable settings 542a-542n may be varied according to the design criteria of a particular implementation.

In some embodiments, reflections may be important but not captured in the metadata 158. The re-creation processor 510 may be configured to calculate reflection locations and/or render an approximation of reflections based on time of day, time of year, weather conditions, etc. In an example, a reflection of the sun off of a building and/or another vehicle may cause a driver to be temporarily blinded or result in a field of view being impaired. In some embodiments, the variable settings 542a-542n may comprise an option to add shadows and/or reflections. Adding shadows and/or reflections may consume more CPU power for the end-user device running the re-creation interface 502 (e.g., may not always be desirable from a usability point of view). For example, a high-powered desktop device running the re-creation interface 502, such as the subscriber devices 110a-110n, may have the processing capabilities to calculate and/or render shadows and/or reflections while a lower powered device such as the communications devices 112a-112n may not have the processing capabilities. The reflectivity of a particular object might be associated with known attributes in the known object data 512. In an example, the building materials of a particular building (e.g., a glass exterior) or the shine of a vehicle that has a high probability of being kept sparkling clean by the owner may have a high reflectivity. Other factors that may affect how the shadows and/or reflections are rendered may comprise the geometry of the vehicles and/or objects (e.g., angles of rear windows, angles of the vehicle body, the selected perspective viewpoint of the animation 520, etc.).

Figure 9:
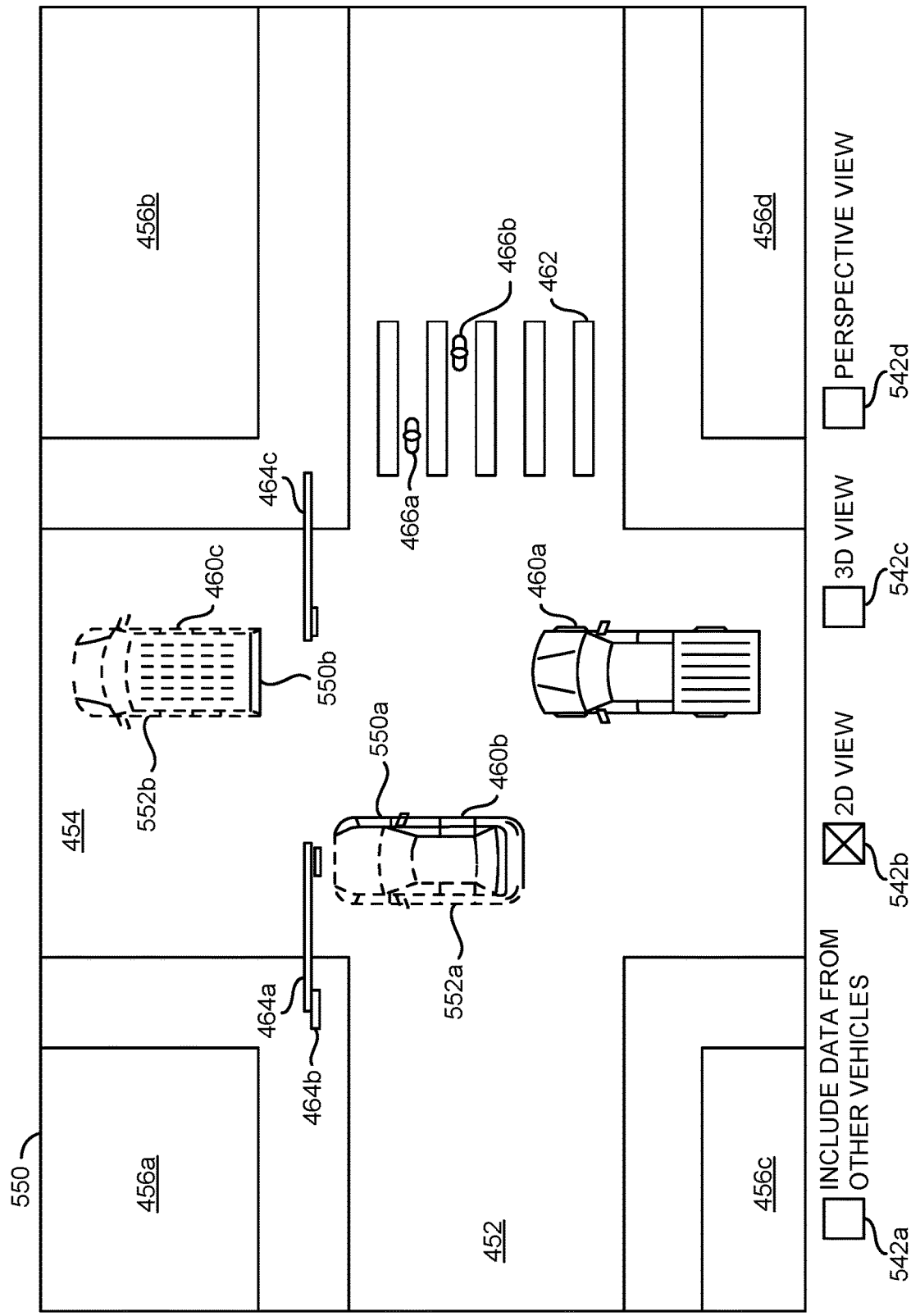
FIG. 9 is a diagram illustrating an example animation generated for a scene re-creation providing a top-down view with interpolated results.

Referring to FIG. 9, a diagram illustrating an example animation generated for a scene re-creation providing a top-down view with interpolated results is shown. A re-created scene 550 is shown. The re-created scene 550 may be a still image of an animation created by the re-creation processor 510 and/or rendered in the re-creation interface 502 using one of the subscriber devices 110a-110n. In some embodiments, the re-created scene 550 may be generated using cloud computing resources and presented to a display. The re-created scene 550 may be similar to the re-created scene 550 shown in association with FIG. 7. The re-created scene 550 may be displayed on the re-creation interface 502. For example, the re-creation interface 502 may comprise the re-created scene 550 and the variable settings 542a-542d.

The re-created scene 550 may be generated in response to the metadata 158 stored in the database 130 in response to the cameras 100a-100n uploading the metadata 372 associated with the video files 350a-350n via the signal META. Similar to the re-created scene 450, the re-created scene 550 may comprise the rendering of the road 452, the road 454, the buildings 456a-456d, the re-created vehicles 460a-460c, the re-created road markings 462, the re-created traffic signals 464a-464c and the re-created pedestrians 466a-466b. In an example, the top-down view of the re-created scene 550 may be one scene of the animation 520 generated based on the signal RSCENE generated by the re-creation processor 510.

The variable setting 542a may toggle on/off an option to include data from other vehicles. In the example shown, the data from other vehicles may be toggled off (e.g., the metadata may comprise only information from a single vehicle, such as the vehicle 200). The variable settings 542b-542c may select between a 2D view and a 3D view. In the example shown, the variable setting 542b may be selected for the 2D view, which provides the top down view of the re-created scene 550. If the variable setting 542c were selected, the re-created scene 550 may provide a 3D view (e.g., a free floating 'camera' that may be moved around the scene in order to view the captured scenario from other angles). The top view (2D) may be shown with the option to toggle to the 3D mode, which may enable and/or allow the user to adjust the viewpoint and angle of view. The variable setting 542d may toggle on/off an option to provide the re-created scene 550 from a perspective view of a particular vehicle. For example, activating the variable setting 542d may provide a view from the perspective of the vehicle 200 as shown in the example animation 520 shown in association with FIG. 8. Which vehicle (or which of the camera systems 100a-100n, or which vehicle in the scene that does not have a camera installed) is used for the perspective view may be determined according to one of the variable settings 542a-542n that selects the camera ID. The perspective view may re-create the scene from the viewpoint of the "primary" camera that captured the scene. In some embodiments, the perspective view created may add in additional details such as car pillars framing the scene on the left and right in order to simulate the scene as viewed from the windshield of the vehicle with the dash camera mounted.

Since the variable setting 542a is set to not include data from other vehicles, the re-created scene 550 may be rendered using only the metadata that corresponds to the vehicle 200 (e.g., from the perspective of the re-created vehicle 460a). Since the vehicle 200 is located behind the re-created vehicles 460b-460c, the re-created scene may not have information about all sides of the re-created vehicles 460b-460c. The re-creation processor 510 may provide the information to create the re-created scene 550 and may fill in some details from the known object data 512 based on the selected settings.

The re-created vehicle 460b may comprise a detailed side 550a and an estimated side 552a. Similarly, the re-created vehicle 460c may comprise a detailed side 550b and an estimated side 552b. The detailed sides 550a-550b may be portions of the re-created vehicles 460b-460c that may be rendered with the characteristics stored in the metadata 158. For example, the detailed side 550a may comprise a right and rear side of the re-created object 460b since the vehicle 200 was behind and to the right of the detected object 410a when the video frame 400 was captured (e.g., the sides visible in the viewpoint of the video frame analyzed using the video analytics module 330). In another example, the detailed side 550b may comprise a rear side of the re-created object 460c since the vehicle 200 was behind the detected object 410b when the video frame 400 was captured. The amount of animation details shown (e.g., dents, scratches, bumper stickers, ornaments, people inside the vehicles, etc.) on the detailed sides 550a-550b may depend upon the confidence level associated with the details in the metadata 158 and the probability level selected using the confidence level selector 540.

In the example shown, the estimated side 552a may be a front and left side of the re-created vehicle 460b since the vehicle 200 may have only been able to capture the rear and right side of the detected object 410a (e.g., the sides not visible in the viewpoint of the video frame analyzed using the video analytics module 330). In the example shown, the estimated side 552b may be a front, right side and left side of the re-created vehicle 460c since the vehicle 200 may have only been able to capture the rear of the detected object 410a. For illustrative purposes, the estimated sides 552a-552b are shown as dashed lines to indicate the estimated sides 552a-552b may comprise incomplete data. In some embodiments, the re-creation processor 510 may fill in some details of the estimated sides 552a-552b based on the known object data 512. For example, the size and/or basic shape of the re-created vehicles 460b-460c may be determined for the estimated sides 552a-552b based on previously stored information about particular makes/models/years of the re-created vehicles 460b-460c in the known object data 512. For example, the re-created object 460b may be rendered based on the size of a 2018 Ford Taurus.

In some embodiments, the re-creation processor 510 may render the estimated sides 552a-552b using wireframe model (e.g., draw basic lines to represent the unknown shapes). In some embodiments, the re-creation processor 510 may render the estimated sides 552a-552b using the basic shape of the objects based on the known object data 512 (e.g., fill in the estimated sides 552a-552b with the basic shape and apply the vehicle color to the estimated sides 552a-552b). In some embodiments, the re-creation processor 510 may render the estimated sides 552a-552b with a particular texture and/or graphical effect to indicate that the estimated sides 552a-552b were rendered based on estimates (e.g., rendered with a darker texture, with a hatched shading, using dotted lines, etc.). The method of rendering the estimated sides 552a-552b may be varied according to the design criteria of a particular implementation.

The animation details of the estimated sides 552a-552b may be filled in by including the characteristics extracted from the metadata 158 captured by other vehicles implementing the camera systems 100a-100n. Toggling on the variable setting 542a for including data from other vehicles may enable the re-creation processor 510 to use additional entries in the metadata 158 to fill in various animation details in the re-created scene 550. For example, a vehicle traveling on the road 452 may capture video of the right side of the re-created object 460b and the metadata extracted from the video may provide details of the estimated side 552a. In another example, a vehicle traveling in front of the re-created object 460c may have a rear-mounted camera (or a camera mounted overhead on the traffic lights) that may capture video of the front of the re-created object 460c and the metadata extracted from the video may provide details of the estimated side 552b. The re-creation processor 510 may be configured to aggregate the metadata 158 generated from multiple sources to fill in the estimated sides 552a-552b. Aggregating the metadata 158 generated from multiple sources to fill in the estimated sides 552a-552b may enable the animation 520 to comprise animation details that may not be otherwise available when using metadata generated from one of the camera systems 100a-100n alone.

Figure 10:
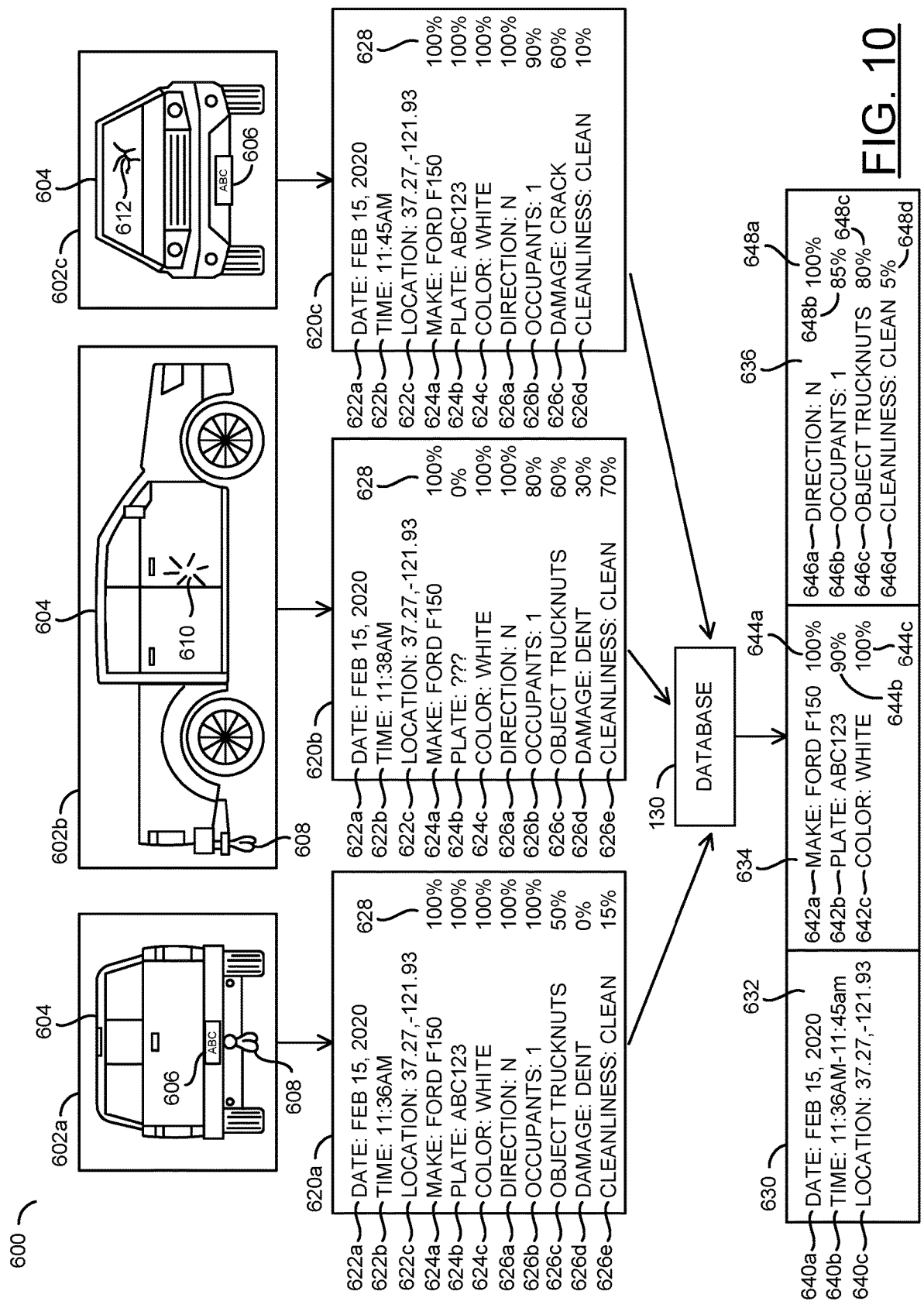
FIG. 10 is a diagram illustrating an aggregation of metadata with confidence levels extracted from multiple camera systems.

Referring to FIG. 10, a diagram illustrating an aggregation of metadata with confidence levels extracted from multiple camera systems is shown. Data aggregation 600 is shown. The data aggregation 600 may comprise video frames 602a-602c of a vehicle 604. In the example shown, the vehicle 604 may be a truck. The video frame 602a may show a rear view of the vehicle 604 captured by the camera system 100a, the video frame 602b may comprise a side view of the vehicle 604 captured by the camera system 100b and the video frame 602c may comprise a front view of the vehicle 604 captured by the camera system 100c. The video frames 602a-602c may comprise various viewpoints of the same vehicle 604 captured generally around the same time from the camera systems 100a-100c that may be implemented in different vehicles.

The rear view of the vehicle 604 in the video frame 602a may comprise a license plate 606 and an ornament 608 (e.g., truck nuts). The video analysis module 330 may perform OCR on the license plate 606, detect the truck nuts 608, determine the color, make, model, year, etc. of the vehicle 604. The video analysis module 330 may generate a metadata entry 620a in response to the computer vision analysis of the video frame 602a.

The side view of the vehicle 604 in the video frame 602b may comprise the truck nuts 608 and vehicle damage 610 (e.g., a passenger side door dent). The side view of the vehicle 604 may not provide a view of the license plate 606. The video analysis module 330 may detect the location of the truck nuts 608, determine the color, make, model, year, etc. of the vehicle 604 and detect the dent 610. The video analysis module 330 may generate a metadata entry 620b in response to the computer vision analysis of the video frame 602b.

The front view of the vehicle 604 in the video frame 602c may show the license plate 606 and vehicle damage 612 (e.g., cracked windshield). The front view of the vehicle 604 may not provide a view of the truck nuts 608. The video analysis module 330 may perform OCR on the license plate 606, detect the location and/or shape of the cracked windshield 612, and determine the color, make, model, year, etc. of the vehicle 604. The video analysis module 330 may generate a metadata entry 620c in response to the computer vision analysis of the video frame 602c.

The metadata entries 620a-620c may each comprise spatiotemporal parameters 622a-622n, static parameters 624a-624n, dynamic parameters 626a-626n and/or confidence values 628. The spatiotemporal parameters 622a-622n, the static parameters 624a-624n and/or the dynamic parameters 626a-626n may each be animation details for the particular object. The spatiotemporal parameters 622a-622n may comprise information that may define when and where the particular object was detected. In the example shown, the spatiotemporal parameters 622a-622n for the entries 620a-620c may indicate that the vehicle 604 was captured on Feb. 15, 2020 at around the time 11:35 AM-11:45 AM at the location 37.27, −121.93. The spatiotemporal parameters 622a-622n may be used by the re-creation processor 510 in order to determine which objects to show in the re-created scene and/or animation at particular times. For example, the vehicle 604 may be included in a re-created scene before noon at the location 37.27, −121.93 on Feb. 15, 2020, but may not be included at other times.

The static parameters 624a-624n may comprise information that may be used to uniquely identify a particular object. The static parameters 624a-624n may be used by the re-creation processor 510 as the animation details to render the re-created objects in the re-created scene and/or animation (e.g., a white truck may be rendered based on the static parameters 624a-624n). The static parameters 624a-624n may generally remain the same for the particular objects (e.g., a white Ford F-150 may generally remain a white Ford F-150 throughout the life of the vehicle, regardless of when and where the vehicle was captured). The static parameters 624a-624n may comprise a make, model, year, license plate, color, VIN, etc. The types of the static parameters 624a-624n may be varied according to the design criteria of a particular implementation.

The re-creation processor 510 may use the static parameters 624a-624n to aggregate the information in the metadata entries 620a-620c for the vehicle 604. In the example shown, the static parameter 624a may be a make of the vehicle detected and each of the video frames 602a-602c may comprise the same vehicle make captured at the same location at the same time, which may increase a confidence level that the vehicle is the same vehicle 604 in each of the video frames 602a-602c. In another example, the static parameter 624b may be a license plate number. Each vehicle on the road may be uniquely identified by the license plate number. The video frame 602a and the video frame 602c may capture the same license plate number, which may greatly increase the confidence level that the vehicle is the same in each video frame. The side view in the video frame 602b may not capture the license plate and the static parameter 624b for the license plate may be blank. The scene re-creation processor 510 may be configured to fill in the license plate for the video frame 602b based on the other characteristics detected. In the example shown, static parameter 624c may be a color of the vehicle 604. Each of the video frames 602a-602b capturing a white vehicle may increase the confidence level that the vehicle 604 is the same in each video frame. However, color may be a weak indicator of an object being the same (since many vehicles can have the same color).

The dynamic parameters 626a-626n may comprise information that may be used as animation details to render specific details about a particular object. The dynamic parameters 626a-626n may comprise details that may not necessarily remain the same throughout the life of the vehicle (e.g., details that do change over time). In an example, the dynamic parameters 626a-626n may comprise ornaments, aftermarket additions, number of occupants of a vehicle, damage and/or dents, cleanliness, bumper stickers, flags, speed, direction of travel, etc. The types of the dynamic parameters 626a-626n may be varied according to the design criteria of a particular implementation.

The dynamic parameters 626a-626n may be used by the re-creation processor 510 to aggregate the information in the metadata entries 620a-620c for the vehicle 604. In one example, a similar make/model/year (e.g., static parameter) of vehicle having the same cleanliness (e.g., dynamic parameter) at the same location (spatiotemporal parameter) may be more likely to be the same vehicle than a similar make/model/year of vehicle having different cleanliness. In the example shown, even though the static parameter 624b for the license plate is missing in the side view of the vehicle 604, the side view may comprise the truck nuts 608, which may increase a confidence level that the vehicle 604 in the video frame 602b is the same as the vehicle 604 with the truck nuts 608 in the video frame 602a. Furthermore, while the truck nuts 608 are not visible in the video frame 602c, the license plate 606 may be used to determine that the vehicle 604 in the video frame 602c is the same as the vehicle 604 in the video frame 602a, which may also be the same as the vehicle 604 in the video frame 602b (e.g., the dynamic parameter may be used to associate two video frames and a static parameter not shared by the two associated video frames may be used to associate the two associated video frames with a third video frame because one of the two associated video frames may share the static parameter with the third video frame). For example, the combination of the spatiotemporal parameters 622a-622n, the static parameters 624a-624n and/or the dynamic parameters 626a-626n (using the confidence values 628 of each) may be cross-referenced by the re-creation processor 510 for similarities in order to fill in gaps and/or missing data (e.g., a missing license plate character not visible in one viewpoint may be filled in based on the animation details captured in another viewpoint that does show the missing license plate character).

In the example shown, the dynamic parameter 626a may comprise a direction of travel of north and the dynamic parameter 626b may comprise one occupant in each of the metadata entries 620a-620c. The metadata entries 620a-620b may comprise the dynamic parameter 626c of the truck nuts 608. The metadata entry 620b may comprise the dynamic parameter 626d of the dent 610, but the dent 610 may not be included in the metadata entry 620a or 620c. The metadata entry 620c may comprise the dynamic parameter 626c comprising the crack 612. Each of the metadata entries 620a-620c may comprise one of the dynamic parameters 626a-626n indicating a state of cleanliness. In the example shown, the dynamic parameters 626a-626n may comprise basic information for illustrative purposes. However, the dynamic parameters 626a-626n may comprise a greater granularity of details. In an example, a size, shape, location of each of the dynamic parameters may be recorded (e.g., text or country on a flag, a location of the truck nuts, a size and shape of a bumper sticker, which bumper the sticker is located on, etc.).

The confidence level values 628 may comprise a value that indicates a likelihood that the particular static parameter or dynamic parameter is accurate. A higher confidence level may indicate a greater certainty that a detected characteristic has been accurately determined, while a lower confidence level may indicate a greater probability that the detected characteristic may be incorrect. In an example, each character of a license plate may have an individual confidence level (e.g., different perspectives may provide angles that are easier to OCR, or a trailer hitch may block a particular character on the license plate). Some characteristics may be easier to identify (e.g., color of a vehicle). Other characteristics may be more difficult (e.g., small text on a bumper sticker, determining a country on a flag, detecting dents, etc.). The confidence level 628 may depend on the quality of the video captured, the libraries installed for use by the video analytics module 330, the distance from the objects, the visibility (e.g., foggy weather, bright reflections, etc.), the relative speed of the objects, etc. In the example shown, the confidence level is shown as a percentage. The method of determining the confidence level may be varied according to the design criteria of a particular implementation.

In the example shown, the confidence level 628 for the vehicle color, the vehicle make, and the direction of travel may be high (e.g., nearly certain). In the example shown, the confidence level 628 for the cleanliness and the dent may be low. The metadata entries 620a-620c may be uploaded to the database 130 for inclusion in the stored metadata 158. The re-creation processor 510 may be configured to aggregate all of the metadata entries 620a-620c to determine all of the animation details. The re-creation processor 510 may use the confidence level 628 to determine a weighted confidence level for each of the static parameters 624a-624n and/or the dynamic parameters 626a-626n for the particular spatiotemporal parameters 622a-622n. The weighted confidence level may be used to create the animation 520.

An aggregated metadata entry 630 is shown. The aggregated metadata entry 630 may be stored as part of the metadata 158. The aggregated metadata entry 630 may be generated in response to a combination of each of the metadata entries 620a-620c. The aggregated metadata entry 630 may comprise spatiotemporal data 632, static data 634 and dynamic data 636. The spatiotemporal data 632, the static data 634 and/or the dynamic data 636 may comprise the animation details used by the re-creation processor 510 to generate the signal RSCENE and/or the animation 520.

The spatiotemporal data 632 may comprise spatiotemporal parameters 640a-640n. In the example shown, the spatiotemporal parameters 640a-640c may be similar to the spatiotemporal parameters 622a-622c of the metadata entries 620a-620c. The spatiotemporal parameters 640a-640n may determine when and where the aggregated metadata entry 630 is applicable to when generating the animation 520. In an example, the aggregated metadata entry 630 may be applicable to the date 640a, at the time 640b at the location 640c. The time 640b may be a range of times. For example, the re-creation processor 510 may be configured to generate the aggregated metadata entry 630 from all metadata entries that may have been captured at a similar time and location.

The static data 634 may comprise aggregated static parameters 642a-642n. The aggregated static parameters 642a-642n may each comprise a respective confidence level 644a-644n. In the example shown, the confidence levels 644a-644c may comprise a weighted average of the static parameters 624a-624n in each of the metadata entries 620a-620c. For example, the make 624a and the color 642c may both have near certain confidence levels 644a and 644c since each of the confidence levels 628 for the particular static parameters 624a-624n were high in all the metadata entries 620a-620c. The confidence level 644b for the license plate 642b may not be certain since one of the video frames 602b may not have captured the license plate 606.

The dynamic data 656 may comprise aggregated dynamic parameters 646a-646n. The aggregated dynamic parameters 646a-646n may each comprise a respective confidence level 648a-648n. In the example shown, the confidence levels 648a-648d may comprise a weighted average of the dynamic parameters 626a-626n in each of the metadata entries 620a-620c. In an example, since the confidence level 628 was high for the direction dynamic parameter 626a, the confidence level 648a may be 100% for the direction dynamic parameter 646a in the aggregated dynamic data 636. Since the confidence level 628 was low for the cleanliness dynamic parameter in the metadata entries 620a-620c, the confidence level 648d may indicate a high uncertainty for the cleanliness aggregated dynamic parameter 646d. For illustrative purposes, only a few of the aggregated static parameters 642a-642n and a few of the aggregated dynamic parameters 646a-646n are shown. The number and/or types of the aggregated static parameters 642a-642n and the aggregated dynamic parameters 646a-646n may be varied according to the design criteria of a particular implementation and/or the particular scenarios captured.

The confidence levels 644a-644n of the aggregated static parameters 642a-642n and the confidence levels 648a-648n for the aggregated dynamic parameters 646a-646n may be used to determine which details to show on the animation 520. The confidence levels 644a-644n and the confidence levels 648a-648n may be used for comparison with the threshold value selected using the confidence level selector 540. For example, if the threshold value for the confidence level selector 540 is set to 90%, then only the direction of travel, the license plate and the color of the vehicle may be re-created in the animation 520. As the threshold value for the confidence level selector 540 is decreased, more details may be shown. For example, lowering the threshold value down to 85% may render one occupant in the re-created vehicle representing the vehicle 604. Further lowering the threshold value down to 80% may further add the detail of the trucknuts to the rendering of the animation 520.

In some embodiments, animation details may accrue over time for a particular object, regardless of a specific location. In an example, a 2021 Nissan Leaf with California license plate HGE-5422 may be encountered in the San Jose region multiple times over a six-month interval by several vehicles in the same fleet that each have one of the dash camera systems 100a-100n installed. The 2021 Nissan Leaf may be captured 90% of the time when the vehicle is quite dirty. On a specific time and date, an incident may occur involving the 2021 Nissan Leaf. The one of the dash cameras 100a-100n capturing the incident may only capture the view from behind, with the license plate tag clearly scanned, but the cleanliness level of the 2021 Nissan Leaf may not be determined with sufficient probability. To enhance the model of the 2021 Nissan Leaf re-created in the animation 520, information in the database 130 may be referenced. The database 130 results may comprise the aggregated dynamic data 636 comprising a sufficient probability of confidence that the particular 2021 Nissan Leaf is dirty. Even though the spatiotemporal parameters 622a-622n may not match, the aggregated dynamic parameters 636 may be used to apply the characteristics from another time and place to the scene re-creation. A dirty overlay (e.g., texture) may be placed on the re-creation of the 2021 Nissan Leaf.

The metadata 158 may be stored in the database 130 and the re-creation processor 510 may continually adjust weightings as new data is received. An administrator (e.g., an end-user) may initiate the 3D modeling to recreate an incident and the signal REQ may be sent from one of the subscriber devices 110a-110n implementing the re-creation interface 502 to the metadata server 120. The aggregated spatiotemporal data 632 may be accessed for the specific location, time and date of the event requested. Models (e.g., re-created objects) may be rendered of the roadway with the vehicles involved using standard data for make, model, year, color of the vehicles involved (e.g., based on the known object data 512). The animation 520 may be enhanced with more granular details of each vehicle. Some of the details may have been logged at times and locations different from the time and location of the incident being recreated (e.g., a dent on the vehicle involved in the incident may be rendered based on the dent 610 captured at an earlier time).

The confidence level selector 540 may enable the user to select how much of the extra details to fill in based on the selected threshold of probability. The confidence level selector 540 provided in the data input section 522 may be used to add extra details that may not have necessarily been visible or may have been viewed with low probability by the dash camera that witnessed the event. When the confidence level selector 540 is set to a low setting more details (e.g., lower confidence animation details) may be visible in the model. However, because the setting is low the probability that the details were present on the re-created vehicles when the incident occurred may be low. When the confidence level selector 540 is set to a higher probability threshold, less of the animation details may become visible but because the probability of the details is higher, the re-created scene may more closely resemble the actual details of the event.

In an example, a white 2010 Ford Fiesta with license plate KPR-4523 may be logged in the database 130 many times over a long interval. Forty percent of the time the 2010 Ford Fiesta may be logged as "dirty", but 90% of the time 2010 Ford Fiesta may be viewed with 2 occupants. When the same vehicle is present during an event that is requested to be re-created, the cleanliness of the vehicle and number of occupants may not have been captured (e.g., not part of the metadata 158). For example, a reflection from one of the rear windows may prevent the details from be logged with any usable probability. When the end-user sets the confidence level selector 540 to 30%, the re-creation processor 510 may render the vehicle with a dirty overlay changing the color of the vehicle from white to a dirty brown and the vehicle may be shown with two occupants. As the confidence level selector 540 is increased beyond 40%, the dirt overlay may disappear (e.g., insufficient confidence), but the two occupants remain in place. As the confidence level selector 540 is moved past 90%, the re-creation of the vehicle may become factory white with only one occupant shown as only the details witnessed with high certainty by the dash camera at the event may be displayed.

The database 130 may store metadata entries 620a-620n keyed from license plate tags. In a fleet scenario with multiple vehicles collecting data, the details observed from a passing vehicle with a given license plate may populate the same database entry. In an example, a database entry may be for a license plate tag: California DHE-5832 with observation details that comprise:

Entry 1:

Date: Feb. 15, 2020, Time: 11:36 AM, Location: 37.272934, −121.932145, Plate OCR (object character recognition), Accuracy—87%, Direction of Travel: Parked, Make: Ford, Model: Fiesta, Year: 2018, Color: Yellow, Occupants: None—Accuracy—92%, Bumper Stickers: Left Bumper—5"×8"—OCR—Trump 2024—Colors Red, White, Blue—Accuracy—84%, Aftermarket Modifications: Roof Rack—Black—Accuracy—98%, Damage: Windshield cracked—Accuracy—74%, Cleanliness—5/10

Entry 2:

Date: Feb. 21, 2020, Time: 9:30 AM, Location: 37.344534, −121.347545, Plate OCR (object character recognition) Accuracy—82%, Direction of Travel: Northbound, Make: Ford, Model: Fiesta, Year: 2018, Color: Yellow, Occupants: Two—Accuracy—62%, Bumper Stickers: Left Bumper—5"×8"—OCR—Trump 2024—Colors Red, White, Blue—Accuracy—74%, Aftermarket Modifications: Roof Rack—Black—Accuracy—98%, Damage: None, Cleanliness—4/10 Entry 3:

Date: Mar. 11, 2020, Time: 1:36 PM, Location: 37.444534, −121.99945, Plate OCR (object character recognition) Accuracy—82%, Direction of Travel: Southbound, Make: Ford, Model: Fiesta, Year: 2018, Color: Yellow, Occupants: Two—Accuracy—82%, Bumper Stickers: Left Bumper—5"×8"—OCR—Trump 2024—Colors Red, White, Blue—Accuracy—64%, Aftermarket Modifications:

Roof Rack—Black—Accuracy—98%, Cargo—Kayaks Orange—Two—Accuracy—94%, Damage: None, Cleanliness—3/10

For example, the static parameters 624a-624n may comprise the make, model, year, license plate, etc. and the dynamic parameters 626a-626n may comprise cleanliness level and damage. A cracked windshield may be repaired over time, bumper stickers may be added or replaced, cargo present may be changed and/or a vehicle may comprise detected aftermarket additions.

When an incident is re-created, the probability of each attribute may be calculated based on previous observations. The re-creation processor 510 may be configured to perform intelligent inferences. For example, the database entry for the license plate tag: California DHE-5832 described may be extended to hundreds of entries. Based on hundreds of entries, the re-creation processor 510 may be configured to deduce, with a high level of probability, using a number of factors about the state of the vehicle at a given time.

In one example, a scenario may involve the vehicle with the license plate tag: California DHE-5832 where an incident occurs on a foggy day with poor visibility. The one of the dash cameras 100a-100n capturing the event may only be able to distinguish basic details about the vehicle and a partial license plate tag due to the poor visibility. The incident may have happened on a Saturday morning on Southbound Highway 17 connecting San Jose and Santa Cruz. The subject vehicle might have been observed and logged many times traveling Southbound with kayaks onboard and multiple occupants in the vehicle during the particular timeframe and approximate location. When the scene is re-created the make and model of the vehicle, along with color and partial plate, may place the particular vehicle at the scene. The number of entries showing the particular vehicle traveling on the same highway with kayaks and multiple occupants on the same day of the week and at the same approximate time would further increase the probability that the attributes were present at the time of the event. In some embodiments, the confidence levels may have a recency bias. For example, a recent high probability sightings of an undamaged windshield would outweigh other previous high probability sightings of damage. The re-creation processor 510 may infer that the windshield had been repaired when the event occurred due to the recency bias.

The camera systems 100a-100n capturing various scenes may identify and log the static parameters 624a-624n and/or the dynamic parameters 626a-626n (e.g., the characteristics). The specifics of the characteristics may then be rendered in the roadway scene by the re-creation processor 510 based on the confidence level threshold value selected. In some scenarios, the position of the camera systems 100a-100n capturing the scene may not allow for the non-standard details (e.g., the dynamic parameters 626a-626n) to be captured. For example, a Canadian flag on a front grille may not be captured by one of the camera systems 100a-100n that was following the subject vehicle from behind. In a scenario where the vehicle with the Canadian flag embedded in the grille is the subject of a lawsuit or investigation, not including the embedded flag may be confusing or considered as inaccurate if the model rendered with the captured data is missing the embedded flag or other distinguishing and differentiating details.

While the example data aggregation 600 is shown based on the video frames 602a-602c captured from multiple camera systems 100a-100c, the re-creation processor 510 may be configured to aggregate data captured by the same one of the camera systems 100a-100n at different times. For example, the captured video of the objects used to generate the metadata 158 may comprise perspectives captured from different viewpoints captured by one of the camera systems 100a-100n generated at a different time. For example, at a first time, the camera system 100i may generate metadata that does not provide a clear reading of all the characters of a license plate (e.g., read as ABC 12?). At a later time, the same camera system 100i may capture the same vehicle from a different viewpoint and perform OCR again on the license plate that may fill in the details of the license plate (e.g., read as ?BC 123). Combining the confidence levels of the characters of each license plate captured by the same camera system 100i at different times, the re-creation processor 510 may fill in the blanks and/or missing data (e.g., combine the first reading of ABC 12? with the second reading of ?BC 123 to determine that the license plate is ABC 123). For example, the re-creation processor 510 may aggregate the confidence levels of the metadata using metadata entries from one of the camera systems 100a-100n at different times, using metadata entries from multiple of the camera systems 100a-100n at the same time and/or using metadata entries from multiple of the camera systems 100a-100n at different times.

Figure 11:
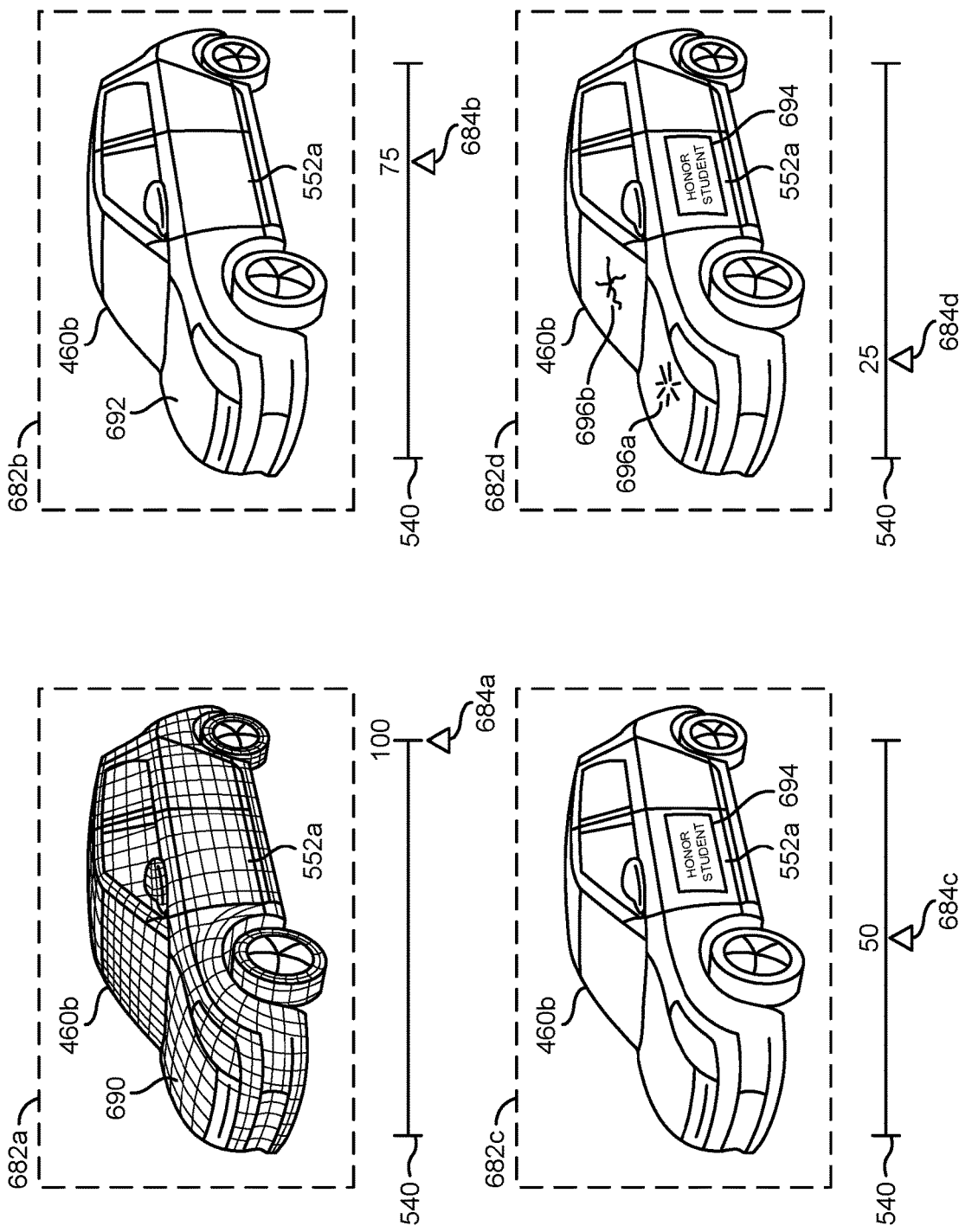
FIG. 11 is a diagram illustrating a portion of a re-created scene rendered based on a confidence level of animation details.

Referring to FIG. 11, a diagram illustrating a portion of a re-created scene rendered based on a confidence level of animation details is shown. An example of re-created scenes 680 is shown. The example of re-created scenes 680 may comprise four example perspectives 682a-682d of the animation 520 for the re-creation interface 502.

Each of the example perspectives 682a-682d may comprise a 3D view of the re-created vehicle 460b and the confidence level selector 540. Each of the example perspectives 682a-682d may provide an example of the rendering of the estimated side 552a of the re-created vehicle 460b. The estimated side 552a in each of the example perspectives 682a-682d may be rendered with animation details shown based on the respective confidence input value 684a-684d selected on the confidence level selector 540. In an example, the animation 520 may be rendered with the animation details shown on the detailed side 550a as described in association with FIG. 9. The end-user may use the variable settings 542a-542n to select a 3D view and/or interact with the re-creation interface 502 in order to rotate the perspective (e.g., move a free-roaming camera for the animation 520) in order to show the estimated side 552a of the re-created vehicle 460b.

For the example perspective 682a, the confidence input value 648a for the confidence level selector 540 may be set to 100 (e.g., 100% confidence level). The re-creation processor 510 may be configured to analyze the confidence levels 644a-644n of the aggregated static parameters 642a-642n and/or the confidence levels 648a-648n of the aggregated dynamic parameters 646a-646n in order to determine which animation details meet the 100% threshold of the confidence input value 648a of the confidence level selector 540. The re-creation processor 510 and/or the processor implemented by the subscriber devices 110i implementing the re-creation interface 502 may render the estimated side 552a according to the animation details that meet the 100% threshold.

A wireframe texture and/or model 690 of the estimated side 552a is shown in the example perspective 682a. The wireframe texture and/or model 690 may represent a placeholder interpolation of the estimated side 552a of the re-created vehicle 460b. The 100% threshold of the confidence input value 648a may be a very high threshold (e.g., near certainty of the animation details). For example, a clear video from another of the camera systems 100a-100n from an angle that directly shows the real-world vehicle that corresponds to the re-created vehicle 460b may provide metadata with animation details that have a confidence level of 100%. For example, if the confidence level of the metadata 158 used to determine the color of the re-created vehicle 460b is not at 100% confidence level and/or the cleanliness of the re-created vehicle 460b is not at 100% confidence level, then the wireframe texture and/or model 690 may be used. In some embodiments, the wireframe texture and/or model 690 may be used as a placeholder when the make/model/year of the re-created vehicle 460b is uncertain and/or the user has selected that the known object data 512 is not used. The wireframe texture and/or model 690 may be used to interpolate the 3D geometric model of the re-created objects when there is a high amount of uncertainty.

For the example perspective 682b, the confidence input value 648b for the confidence level selector 540 may be set to 75 (e.g., 75% confidence level). The re-creation processor 510 may be configured to analyze the confidence levels 644a-644n of the aggregated static parameters 642a-642n and/or the confidence levels 648a-648n of the aggregated dynamic parameters 646a-646n in order to determine which animation details meet the 75% threshold of the confidence input value 648b of the confidence level selector 540. The re-creation processor 510 and/or the processor implemented by the subscriber devices 110i implementing the re-creation interface 502 may render the estimated side 552a according to the animation details that meet the 75% threshold.

A solid color texture and/or model 692 of the estimated side 552a is shown in the example perspective 682b. The solid color texture and/or model 692 may represent a placeholder interpolation of the estimated side 552a of the re-created vehicle 460b. The 75% threshold of the confidence input value 648b may be a high threshold, which may prevent a number of animation details from being shown. For example, the solid color texture and/or model 692 may comprise a smooth texture and/or model of the make/model/year of the vehicle (e.g., one of the aggregated static parameters 642a-642n) without additional flourishes and/or details such as dents, cracks, bumper stickers, flags, decals, etc. For example, if the confidence level of the metadata 158 used to determine the color of the re-created vehicle 460b is greater than or equal to the 75% confidence level and/or the cleanliness of the re-created vehicle 460b is not at the 75% confidence level, then the solid color texture and/or model 692 may be used. In some embodiments, the solid color texture and/or model 692 may be used as a placeholder when the make/model/year and/or the color of the re-created vehicle 460b is certain and/or the user has selected that the known object data 512 is used, but there is a low level of confidence level for other animation details. The solid color texture and/or model 692 may be used to interpolate the 3D geometric model of the re-created objects when there is a high amount of uncertainty for various animation details.

For the example perspective 682c, the confidence input value 648c for the confidence level selector 540 may be set to 50 (e.g., 50% confidence level). The re-creation processor 510 may be configured to analyze the confidence levels 644*a*-644*n* of the aggregated static parameters 642*a*-642*n* and/or the confidence levels 648*a*-648*n* of the aggregated dynamic parameters 646*a*-646*n* in order to determine which animation details meet the 50% threshold of the confidence input value 648*c* of the confidence level selector 540. The re-creation processor 510 and/or the processor implemented by the subscriber devices 110*i* implementing the re-creation interface 502 may render the estimated side 552*a* according to the animation details that meet the 50% threshold.

A bumper sticker animation detail 694 on the estimated side 552*a* is shown in the example perspective 682*c*. The bumper sticker animation detail 694 may represent an animation detail on the estimated side 552*a* of the re-created vehicle 460*b*. The 50% threshold of the confidence input value 648*c* may be a medium threshold, which may enable a number of fairly uncertain animation details to be shown. For example, the re-created vehicle 460*b* may be rendered with the solid color texture and/or model 692 and the additional animation detail of the bumper sticker animation detail 694. In the example shown, the bumper sticker animation detail 694 may comprise the text "honor student", which may be provided in the metadata 158 based on OCR performed by the video analytics module 330. The metadata 158 may further comprise location coordinates of the bumper sticker animation detail 694. The bumper sticker animation detail 694 may be used to interpolate additional details and/or characteristics of the re-created objects when there is some level of uncertainty for various animation details. The details of the particular animation detail may not be reliable.

For the example perspective 682*d*, the confidence input value 648*d* for the confidence level selector 540 may be set to 25 (e.g., 25% confidence level). The re-creation processor 510 may be configured to analyze the confidence levels 644*a*-644*n* of the aggregated static parameters 642*a*-642*n* and/or the confidence levels 648*a*-648*n* of the aggregated dynamic parameters 646*a*-646*n* in order to determine which animation details meet the 25% threshold of the confidence input value 648*d* of the confidence level selector 540. The re-creation processor 510 and/or the processor implemented by the subscriber devices 110*i* implementing the re-creation interface 502 may render the estimated side 552*a* according to the animation details that meet the 25% threshold.

Damage animation details 696*a*-696*b* may be shown in addition to the bumper sticker animation detail 694 on the estimated side 552*a* is shown in the example perspective 682*d*. Since the bumper sticker animation detail 694 already met the 50% threshold, the bumper sticker animation detail 694 may also meet the 25% confidence level threshold. The damage animation details 696*a*-696*b* may be details that may be difficult to properly detect (e.g., dents may be difficult to distinguish due to reflections and/or the available light). The 25% threshold of the confidence input value 648*d* may be a relatively low threshold, which may enable a lot of uncertainty in the animation details to be shown. For example, the re-created vehicle 460*b* may be rendered with the solid color texture and/or model 692 and the additional animation details of the bumper sticker animation detail 694 and the damage animation details 696*a*-696*b*. In the example shown, the damage animation detail 696*a* may be a dent on a hood of the vehicle and the damage animation detail 696*b* may be a crack in the windshield. The metadata 158 may further comprise location coordinates of the damage animation details 696*a*-696*b* as well as the type of damage detected. The damage animation details 696*a*-696*b* may be used to interpolate additional details and/or characteristics of the re-created objects when there is a high level of uncertainty for various animation details. While the addition of the damage animation details 696*a*-696*b* (and other low certainty details) may enable the re-created object 460*b* to appear in the animation 520 close to what the real-world vehicle would have looked like in the captured video data, the details may be unreliable.

Figure 12:
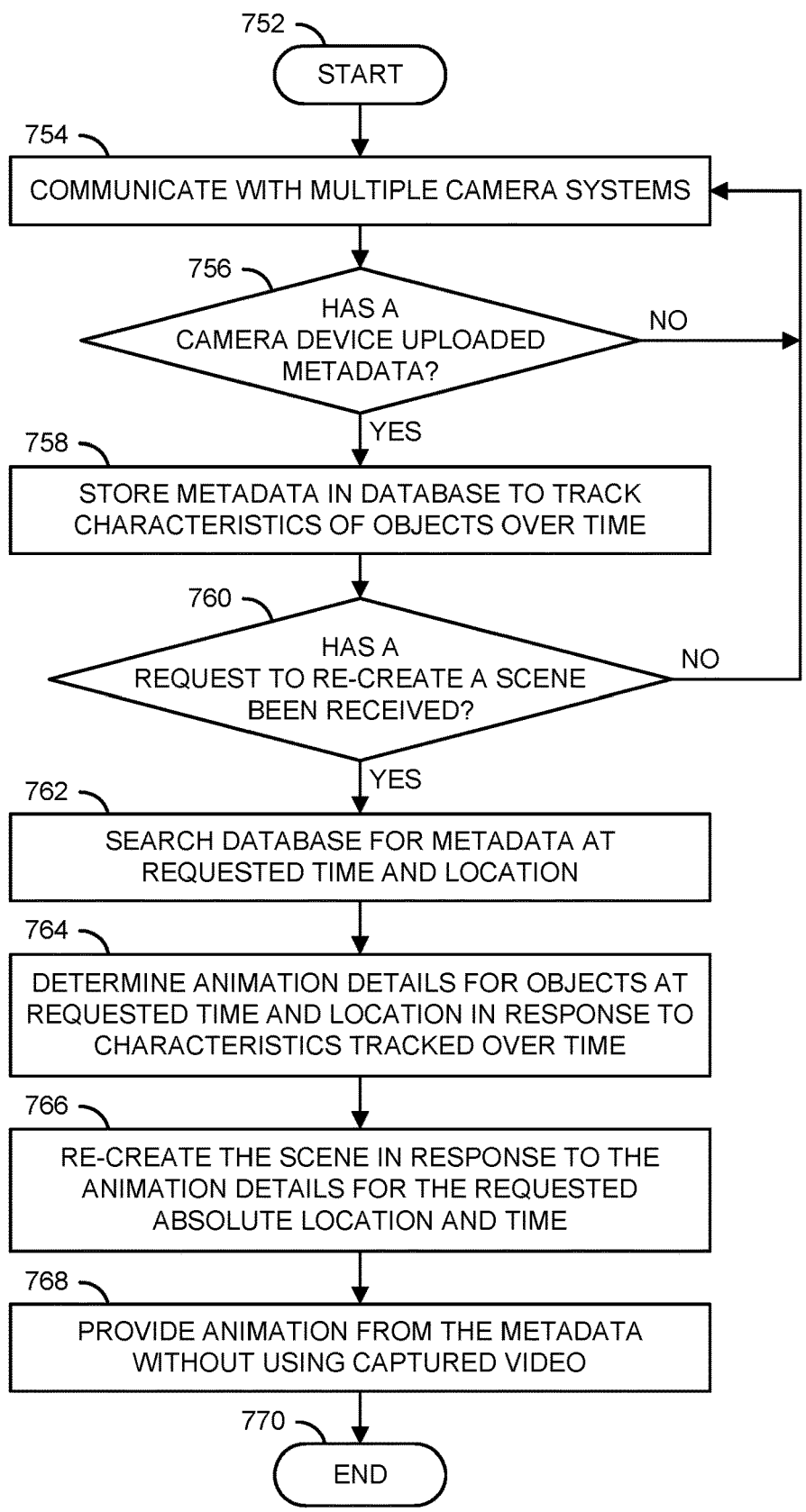
FIG. 12 is a flow diagram illustrating a method for dynamic roadway scene re-creation using video analytics, metadata and interpolation.

Referring to FIG. 12, a method (or process) 750 is shown. The method 750 may enable dynamic roadway scene re-creation using video analytics, metadata and interpolation. The method 750 generally comprises a step (or state) 752, a step (or state) 754, a decision step (or state) 756, a step (or state) 758, a decision step (or state) 760, a step (or state) 762, a step (or state) 764, a step (or state) 766, a step (or state) 768, and a step (or state) 770.

The step 752 may start the method 750. In the step 754, the metadata server 120 may communicate with multiple of the camera systems 100*a*-100*n*. Next, in the decision step 756, the metadata server 120 may determine whether one or more of the camera systems 100*a*-100*n* have uploaded the metadata (e.g., the signals META_A-META_N). If the camera systems 100*a*-100*n* have not provided any metadata, then the method 750 may return to the step 754. If the camera systems 100*a*-100*n* have provided the metadata, then the method 750 may move to the step 758. In the step 758, the metadata server 120 may store the metadata in the database 130 and the re-creation processor 510 may track the various characteristics of objects in the metadata 158 over time. Next, the method 750 may move to the decision step 760.

In the decision step 760, the metadata server 120 may determine whether there has been a request to re-create a scene. For example, an end-user may use one of the subscriber computing devices 110*a*-110*n* implementing the re-creation interface 502 to generate the signal REQ. If there has been no request, then the method 750 may return to the step 754. If there has been a request, then the method 750 may move to the step 762. In the step 762, the re-creation processor 510 may search the database 130 for the metadata 158 that is associated with the requested time and location. Next, the method 750 may move to the step 764.

In the step 764, the re-creation processor 510 may determine the animation details for objects that were present at the requested time and/or the absolute location. For example, the spatiotemporal parameters 640*a*-640*n* may indicate when and where various objects were located. Next, in the step 766, the re-creation processor 510 may generate the signal RSCENE to enable the re-creation interface 502 to re-create the scene in response to the animation details for the requested absolute location and time. In the step 768, the re-creation interface 502 may provide the animation 520 based on the metadata 158 without using any of the captured video data. Next, the method 750 may move to the step 770. The step 770 may end the method 750.

Figure 13:
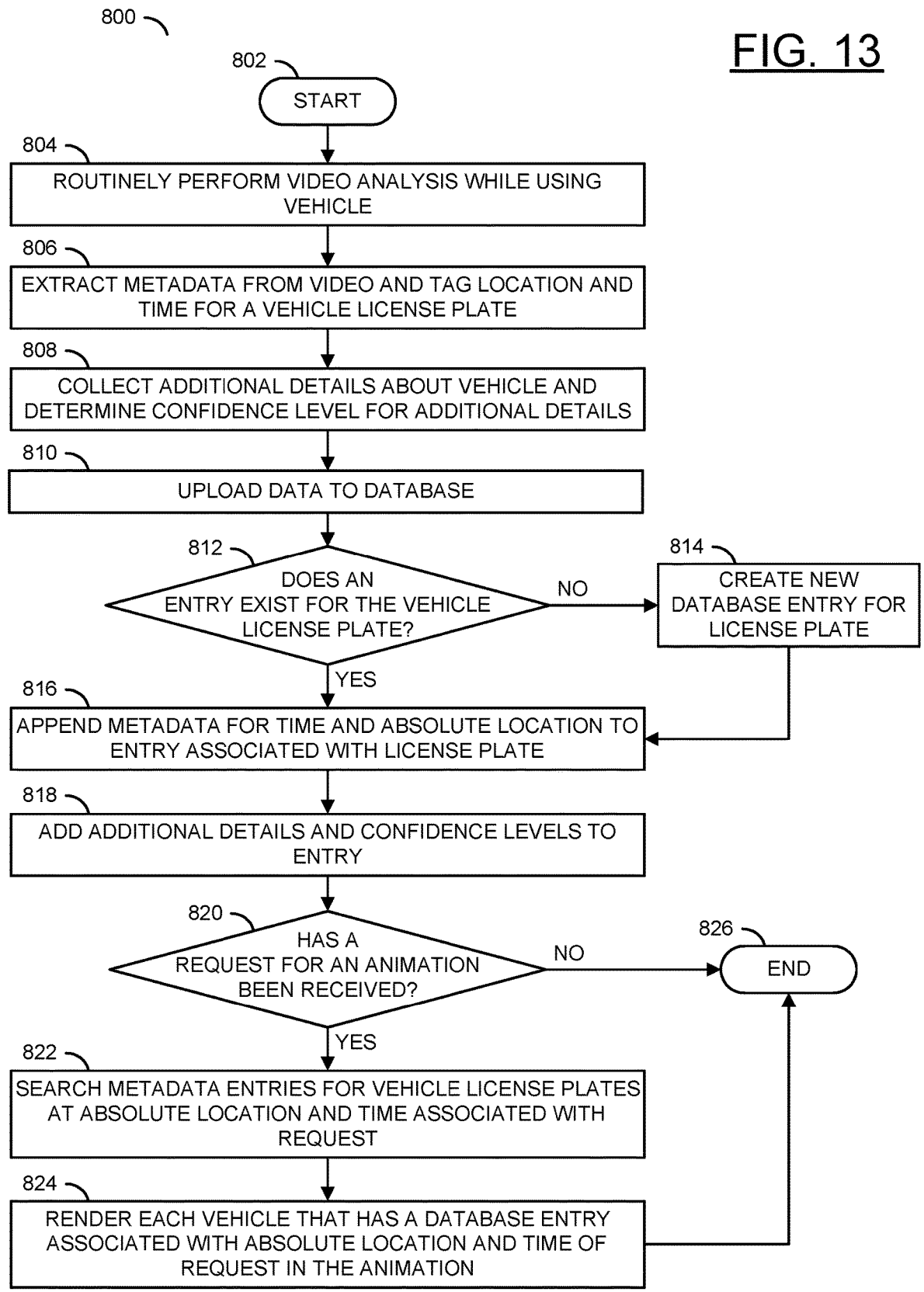
FIG. 13 is a flow diagram illustrating a method for adding entries to a metadata database based on an identified vehicle.

Referring to FIG. 13, a method (or process) 800 is shown. The method 800 may add entries to a metadata database based on an identified vehicle. The method 800 generally comprises a step (or state) 802, a step (or state) 804, a step (or state) 806, a step (or state) 808, a step (or state) 810, a decision step (or state) 812, a step (or state) 814, a step (or state) 816, a step (or state) 818, a decision step (or state) 820, a step (or state) 822, a step (or state) 824, and a step (or state) 826.

The step 802 may start the method 800. In the step 804, the camera systems 100*a*-100*n* may routinely perform video analysis (e.g., using the video analytics module 330) while the vehicles 200*a*-200*n* are being used. Next, in the step 806, the video analytics module 330 may extract the metadata 372 from the video data 370 and tag the absolute location 380g, the time stamp 380b and/or the license plate (e.g., in the object data 380e). In the step 808, the video analytics module 330 may collect additional details about the vehicle (s) in the object data 380e and determine confidence levels for the additional details. Next, in the step 810, the metadata may be uploaded to the database 130. Next, the method 800 may move to the decision step 812.

In the decision step 812, the re-creation processor 510 may determine whether an entry exists for the particular vehicle license plate (or other object identifier) in the uploaded metadata. For example, the object data 184a-184n may store information about various objects in the metadata 158 as the aggregated metadata entry 630. The license plate may be part of the static parameters 642a-642n. If the aggregated metadata entry 630 corresponding to the license plate entry does not exist, then the method 800 may move to the step 814. In the step 814, the re-creation processor 510 may create a new entry for the object data 184a-184n for the license plate. Next, the method 800 may move to the step 816. In the decision step 812, if the license plate entry does exist, then the method 800 may move to the step 816.

In the step 816, the re-creation processor 510 may append the new metadata (e.g., one of the metadata entries 620a-620n) into the aggregated metadata entry 630 for the absolute time and location for the associated license plate metadata. Next, in the step 818, the re-creation processor 510 may add any additional details in the new metadata and the confidence levels to the entry. For example, the new metadata entry may be similar to the metadata entries 620a-620c. Next, the method 800 may move to the decision step 820.

In the decision step 820, the re-creation processor 510 may determine whether a request for the animation 520 has been received. If no request has been received, then the method 800 may move to the step 826. If the request has been received, then the method 800 may move to the step 822. In the step 822, the re-creation processor 510 may search the metadata entries 620a-620n for vehicle license plates that were present at the absolute location and time associated with the request. Next, in the step 824, the re-creation processor 510 may provide the signal RSCENE with the requested metadata to the particular subscriber device 110a-110n implementing the re-creation interface 502 in order to enable the re-creation interface 502 to render each vehicle that has a database entry associated with the absolute location and time of the request for the animation 520. Next, the method 800 may move to the step 826. The step 826 may end the method 800.

Figure 14:
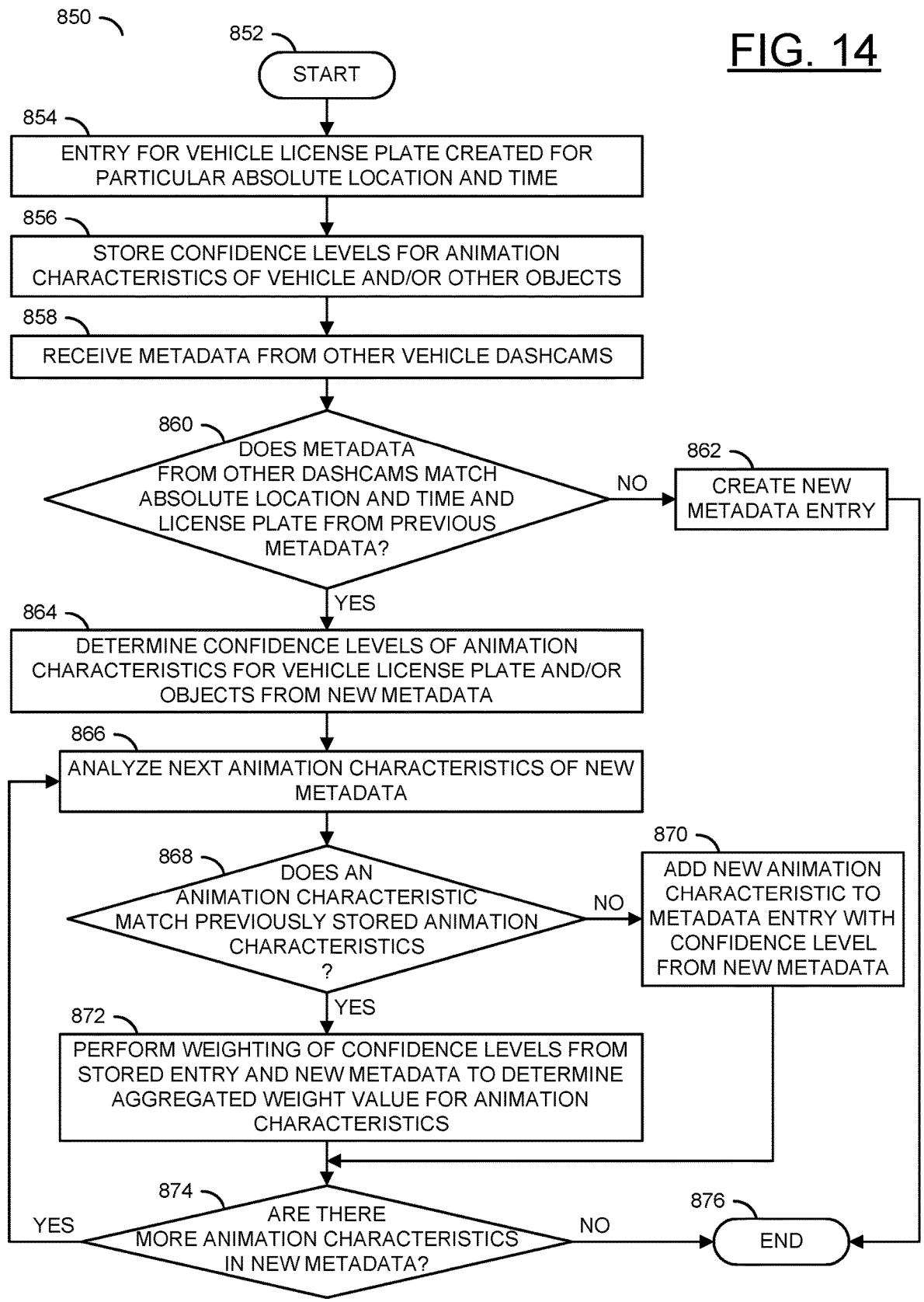
FIG. 14 is a flow diagram illustrating a method for determining aggregated confidence values for animation details in response to metadata from multiple camera systems.

Referring to FIG. 14, a method (or process) 850 is shown. The method 850 may determine aggregated confidence values for animation details in response to metadata from multiple camera systems. The method 850 generally comprises a step (or state) 852, a step (or state) 854, a step (or state) 856, a step (or state) 858, a decision step (or state) 860, a step (or state) 862, a step (or state) 864, a step (or state) 866, a decision step (or state) 868, a step (or state) 870, a step (or state) 872, a decision step (or state) 874, and a step (or state) 876.

The step 852 may start the method 850. In the step 854, the aggregated metadata entry 630 may be created for a vehicle license plate at a particular absolute location and time. Next, in the step 856, the database 130 may store confidence levels for the animation characteristics (e.g., the aggregated static parameters 642a-642n and/or the aggregated dynamic parameters 646a-646n) of vehicles and/or other objects. In the step 858, the metadata server 120 may receive the incoming metadata entries 620a-620n from other of the camera systems 100a-100n (e.g., from the signal META_A-META_N). Next, the method 850 may move to the decision step 860.

In the decision step 860, the re-creation processor 510 may determine whether the metadata entries 620a-620n received from other of the camera systems 100a-100n match the absolute location, time and/or comprise vehicle license plates the correspond with previously stored metadata entries. If there are no matches, then the method 850 may move to the step 862. In the step 862, the re-creation processor 510 may create a new aggregated metadata entry 630 in the database 130. Next, the method 850 may move to the step 876. In the decision step 860, if there is a match, then the method 850 may move to the step 864.

In the step 864, the re-creation processor 510 may determine the confidence levels 628 of the animation characteristics for the particular vehicle license plate (e.g., identified objects) from the new metadata entry 620i. Next, in the step 866, the re-creation processor 510 may analyze a next one of the animation details of the new metadata entry 620i. Next, the method 850 may move to the decision step 868.

In the decision step 868, the re-creation processor 510 may determine whether an animation characteristic in the new metadata entry 620i matches a previously stored animation characteristic for the particular object. If there is no match, then the method 850 may move to the step 870. In the step 870, the re-creation processor 510 may add a new animation characteristic to the aggregated metadata entry 630 with a confidence level from the new metadata entry 620i (e.g., a different perspective may capture a bumper sticker that was previously unknown). Next, the method 850 may move to the decision step 874.

In the decision step 868, if there is a match, then the method 850 may move to the step 872. In the step 872, the re-creation processor 510 may perform a weighting of the confidence levels from the stored aggregated metadata entry 630 for the animation detail and the new confidence level from the new metadata entry 620i in order to update the aggregated weight value for the particular animation characteristic (e.g., update the aggregated static confidence levels 644a-644n and/or the aggregated dynamic confidence levels 648a-648n). Next, the method 850 may move to the decision step 874.

In the decision step 874, the re-creation processor 510 may determine whether there are more animation characteristics in the new metadata entry 620i. If there are more animation characteristics, then the method 850 may return to the step 866. If there are no more animation characteristics, then the method 850 may move to the step 876. The step 876 may end the method 850.

Figure 15:
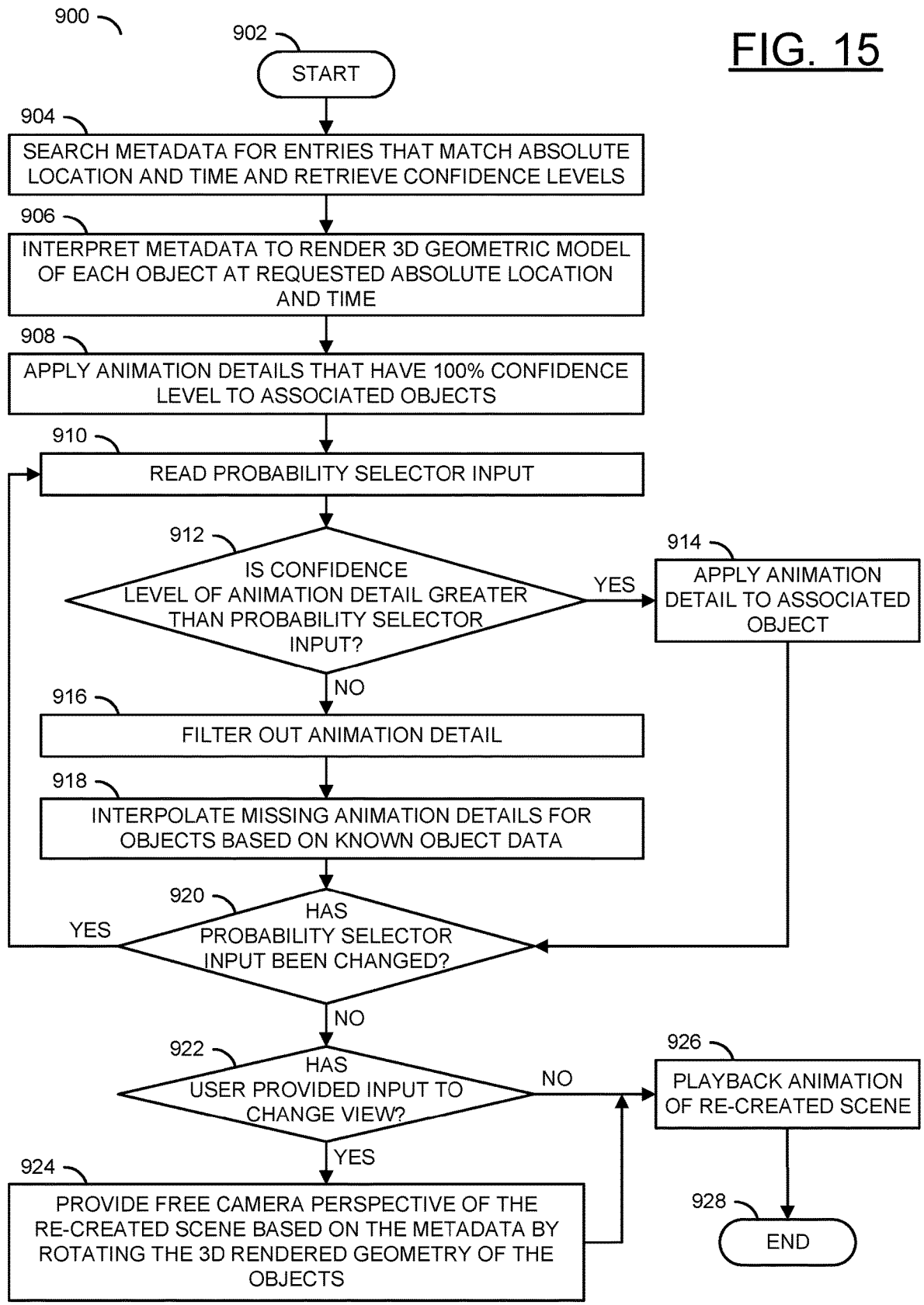
FIG. 15 is a flow diagram illustrating a method for rendering animation details in response to metadata without using video data.

Referring to FIG. 15, a method (or process) 900 is shown. The method 900 may render animation details in response to metadata without using video data. The method 900 generally comprises a step (or state) 902, a step (or state) 904, a step (or state) 906, a step (or state) 908, a step (or state) 910, a decision step (or state) 912, a step (or state) 914, a step (or state) 916, a step (or state) 918, a decision step (or state) 920, a decision step (or state) 922, a step (or state) 924, a step (or state) 926, and a step (or state) 928.

The step 902 may start the method 900. In the step 904, the re-creation processor 510 may search the metadata 158 for entries 630 that match the absolute location and time and retrieve confidence levels (e.g., the confidence levels 644a-644n of the aggregated static parameters 642a-642n and the confidence levels 648a-648n of the aggregated dynamic parameters 646a-646n). Next, in the step 906, the re-creation processor may interpret the metadata 158 to render the 3D geometric model of each object at the requested absolute location and time (e.g., render each object with an aggregated metadata entry 630). In the step 908, the re-creation interface 502 may apply animation details that have a 100% confidence level to the associated objects. Generally, details with 100% confidence level may be displayed regardless of the confidence level selector 540 (unless excluded by the variable settings 542a-542n). Next, in the step 910, the re-creation interface 502 may read the input value from the confidence level selector 540. Next, the method 900 may move to the decision step 912.

In the decision step 912, the re-creation interface 502 may determine whether the confidence level of the animation detail is greater than (or equal to) the input value of the confidence level selector 540. If the confidence level is greater than or equal to the input value of the confidence level selector 540, then the method 900 may move to the step 914. In the step 914, the re-creation interface 502 may apply the animation detail to the associated object. Next, the method 900 may move to the decision step 920.

In the decision step 912, if the confidence level of the animation detail is less than the input value of the confidence level selector 540, then the method 900 may move to the step 916. In the step 916, the re-creation interface 502 may filter out the animation detail (e.g., the animation detail may not be applied to the object). Next, in the step 918, the re-creation interface 502 may interpolate missing animation details for the re-created objects based on the known object data 512. For example, the re-creation processor 510 may search the known object data 512 and present matching generic details via the signal RSCENE. Next, the method 900 may move to the decision step 920.

In the decision step 920, the re-creation interface 502 may determine whether the input value for the confidence level selector 540 has changed. If the input value has changed, then the method 900 may return to the step 910. For example, animation details may be added or filtered out depending on whether the input value for the confidence level threshold has decreased or increased, respectively. If the input value has not changed, then the method 900 may move to the decision step 922.

In the decision step 922, the re-creation interface 502 may determine whether the user has provided input to change the view. For example, the user may interact with the re-creation interface 502 to freely move a 'camera view' within the re-created scene 520. If the user has provided input to change the view, then the method 900 may move to the step 924. In the step 924, the re-creation interface 502 may provide a free camera perspective of the re-created scene based on the metadata 158 by rotating the 3D rendered geometry (and the animation details) of the re-created objects. Next, the method 900 may move to the step 926. In the decision step 922, if the user has not provided input to change the view, then the method 900 may move to the step 926. In the step 926, the re-creation interface 502 may playback the animation 520 of the re-created scene. Next, the method 900 may move to the step 928. The step 928 may end the method 900.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
   a database configured to (i) communicate with a plurality of capture devices, (ii) store metadata received from said plurality of capture devices and (iii) track characteristics of objects in said metadata received over time; and
   a processor configured to (i) determine animation details for said objects in response to said characteristics tracked over time in said metadata, (ii) re-create a scene in response to said animation details and an absolute location of objects in said metadata at a particular time range, (iii) generate an animation based on said scene and (iv) apply said animation details to a re-created version of said objects in said animation, wherein
   (a) said metadata is communicated by said capture devices without captured video,
   (b) said animation provides a visualization similar to said captured video using only said metadata, and
   (c) each of said animation details comprises a confidence level configured to indicate a probability that each of said animation details is accurate.

2. The system according to claim 1, wherein said animation details comprise (i) static parameters about said objects that do not change and (ii) dynamic parameters about said objects that do change over time.

3. The system according to claim 2, wherein said static parameters are used by said processor to uniquely identify each of said objects.

4. The system according to claim 3, wherein one of said static parameters used to uniquely identify each of said objects is a license plate.

5. The system according to claim 2, wherein said static parameters comprise a make, a model, a year and a color of a vehicle.

6. The system according to claim 2, wherein said dynamic parameters are used by said processor to render granular details about said objects in said animation.

7. The system according to claim 2, wherein said dynamic parameters comprise one or more of damage to said objects, stickers, decals, ornaments, and flags.

8. The system according to claim 2, wherein (i) said animation details further comprise spatiotemporal parameters and (ii) said spatiotemporal parameters are used to define said scene.

9. The system according to claim 2, wherein (i) said processor is configured to cross-reference said dynamic parameters between said metadata received from a plurality of sources and (ii) cross-referencing said dynamic parameters enables said processor to uniquely identify said objects that are common between said plurality of sources.

10. The system according to claim 1, wherein (i) said processor is configured to receive a probability threshold and (ii) said processor does not apply said animation details if said confidence level of said animation details are below said probability threshold.

11. The system according to claim 1, wherein each of said plurality of capture devices are configured to (i) capture video, (ii) perform video analysis on said captured video to (a) identify said characteristics about said objects in said captured video and (b) determine said absolute location of said objects, (iii) store said metadata separate from said captured video in response to said video analysis and (iv) communicate with said database.

12. The system according to claim 1, wherein said plurality of capture devices are each configured to communicate with a respective wireless communication device, (ii) said metadata is communicated from said capture devices to said wireless communication devices and (iii) said database receives said metadata from said capture devices via said wireless communication devices.

13. The system according to claim 1, wherein (i) a plurality of confidence level values corresponding to each of said animation details for said objects is received, (ii) each of said confidence level values is generated by one of said capture devices and (iii) said processor is configured to determine aggregated confidence level values for said animation details in response to said plurality of confidence level values.

14. A system comprising:
   a database configured to (i) communicate with a plurality of capture devices, (ii) store metadata received from said plurality of capture devices and (iii) track characteristics of objects in said metadata received over time; and
   a processor configured to (i) determine animation details for said objects in response to said characteristics tracked over time in said metadata, (ii) re-create a scene in response to said animation details and an absolute location of objects in said metadata at a particular time range and (iii) generate an animation based on said scene, wherein
   (a) said metadata is communicated by said capture devices without captured video,
   (b) said animation provides a visualization similar to said captured video using only said metadata,
   (c) a plurality of confidence level values corresponding to each of said animation details for said objects is received,
   (d) each of said confidence level values is generated by one of said capture devices, and
   (e) said processor is configured to determine aggregated confidence level values for said animation details in response to said plurality of confidence level values.

15. The system according to claim 14, wherein said processor is configured to apply said animation details to a re-created version of said objects in said animation.

16. The system according to claim 15, wherein (i) said processor is configured to apply said animation details based on known object data and (ii) said known object data is used when said metadata is unavailable for a portion of said objects.

17. The system according to claim 14, wherein (i) said plurality of confidence level values are generated by said capture devices in response to performing video analysis on captured video of said objects and (ii) said captured video of said objects comprises perspectives captured from different viewpoints by said capture devices.

18. The system according to claim 17, wherein capturing said perspectives from said different viewpoints enables said metadata to comprise said animation details that would not be visible from one of said perspectives alone.

19. The system according to claim 17, wherein (i) said metadata is stored in response to a plurality of metadata entries, (ii) said metadata entries comprise said animation details from said different viewpoints and (iii) said processor is configured to determine which of said metadata entries to use to generate said aggregated confidence level values in response to an absolute location and time in said metadata entries.

20. The system according to claim 14, wherein (i) said plurality of confidence level values are generated by said capture devices in response to performing video analysis on captured video of said objects and (ii) said captured video of said objects comprises perspectives captured from different viewpoints by one of said capture devices generated at a different time.

* * * * *